(12) United States Patent
Selsam

(10) Patent No.: US 6,616,402 B2
(45) Date of Patent: Sep. 9, 2003

(54) SERPENTINE WIND TURBINE

(75) Inventor: Douglas Spriggs Selsam, 2600 Porter Ave. Unit B, Fullerton, CA (US) 92833

(73) Assignee: Douglas Spriggs Selsam, Fullerton, CA (US)

(*) Notice: Subject to any disclaimer, the term of this patent is extended or adjusted under 35 U.S.C. 154(b) by 0 days.

(21) Appl. No.: 09/881,511

(22) Filed: Jun. 14, 2001

(65) Prior Publication Data

US 2002/0192068 A1 Dec. 19, 2002

(51) Int. Cl.[7] ................................................ F03D 1/02
(52) U.S. Cl. ...................................... 415/3.1; 416/132 B
(58) Field of Search ........................ 416/132 B–132 R, 416/131, 134 R, 135, 139, 141, 148, 176, 177, 227 R, 85, 84, 81

(56) References Cited

U.S. PATENT DOCUMENTS

| | | | | | |
|---|---|---|---|---|---|
| 1,025,929 A | * | 5/1912 | Snook | ........................ | 416/176 |
| 1,371,836 A | * | 3/1921 | Antz | ........................... | 416/85 |
| 4,165,468 A | * | 8/1979 | Fry et al. | ..................... | 416/121 |
| 4,207,026 A | * | 6/1980 | Kushto | ....................... | 416/176 |
| 4,522,600 A | * | 6/1985 | Jost | ................................ | 440/8 |
| 4,547,124 A | * | 10/1985 | Kliatzkin et al. | ....... | 416/132 B |
| 4,708,592 A | * | 11/1987 | Krolick et al. | .............. | 416/176 |
| 4,832,571 A | * | 5/1989 | Carrol | .................... | 416/132 B |
| 5,669,758 A | * | 9/1997 | Williamson | ................. | 416/189 |
| D395,419 S | * | 6/1998 | Armanno, Sr. | ............. | D12/300 |

* cited by examiner

Primary Examiner—Edward K. Look
Assistant Examiner—Igor Kershteyn

(57) ABSTRACT

Multiple horizontal axis type rotors are coaxially attached along the upper section of an elongate torque transmitting tower/driveshaft, The tower/driveshaft projects upward from a cantilevered bearing means, and is bent downwind, until the rotors become sufficiently aligned with the wind to rotate the entire tower/driveshaft, Power is drawn from the shaft at the base. Surface mount, subsurface mount, and marine installations, including a sailboat, are disclosed. Blade-to-blade lashing, and vertical axis rotor blades may also be included. Vertical and horizontal axis type rotor blades may be interconnected along the length of the tower/driveshaft to form a structural lattice, and the central shaft may even be eliminated. Aerodynamic lifting bodies or tails, buoyant lifting bodies, buoyant rotor blades, and methods of influencing the tilt of the rotors, can help elevate the structure. This wind turbine can have as few as one single moving part.

63 Claims, 51 Drawing Sheets

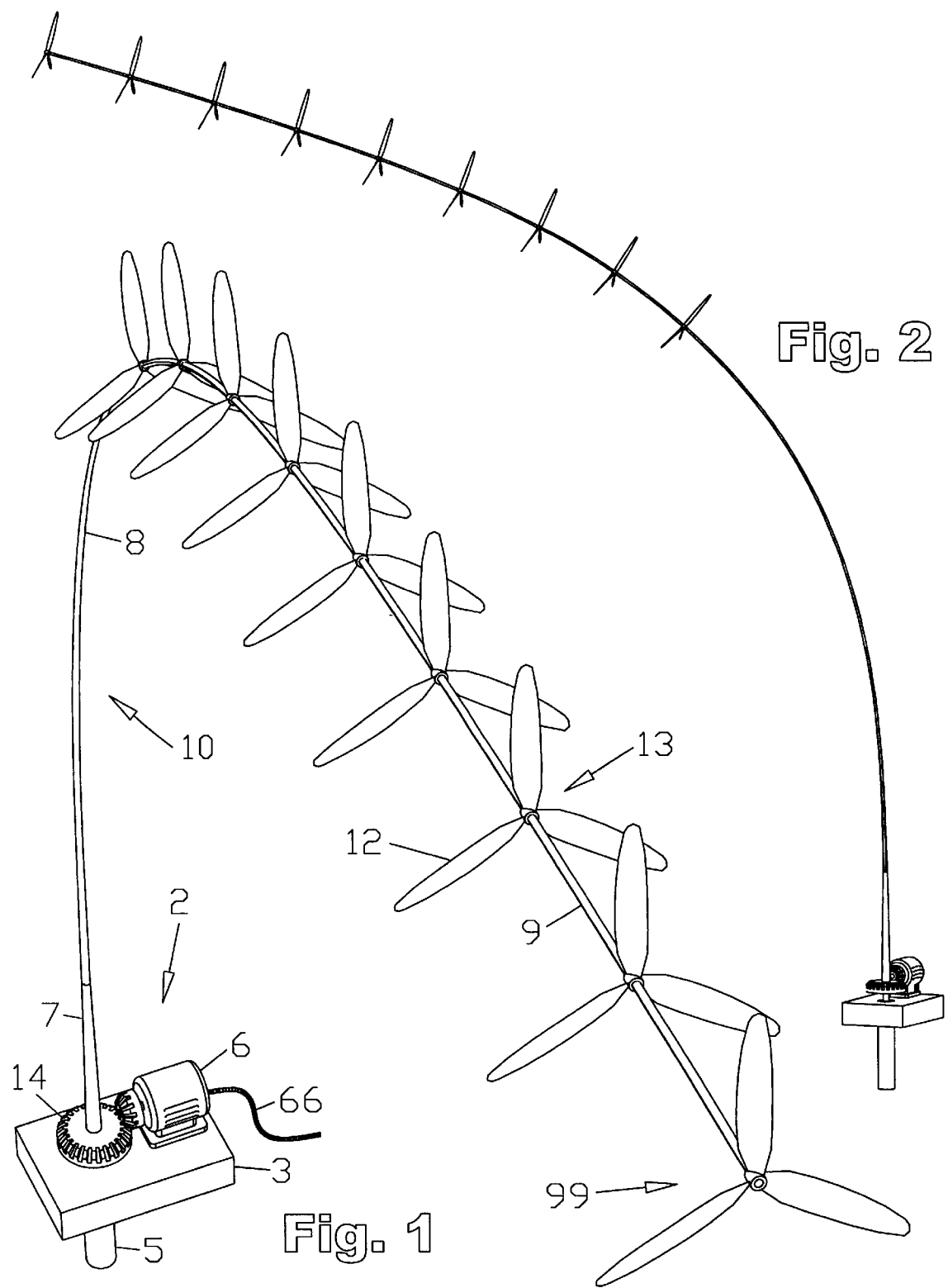

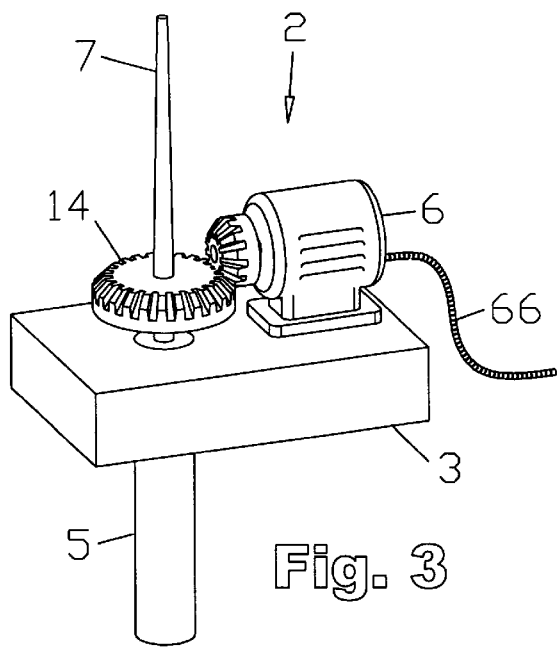
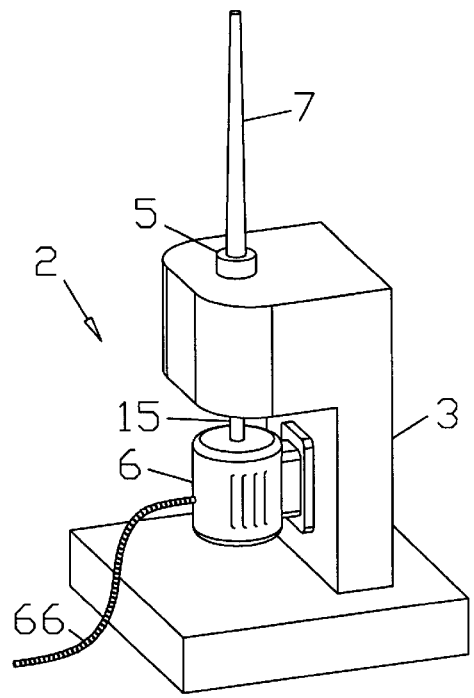
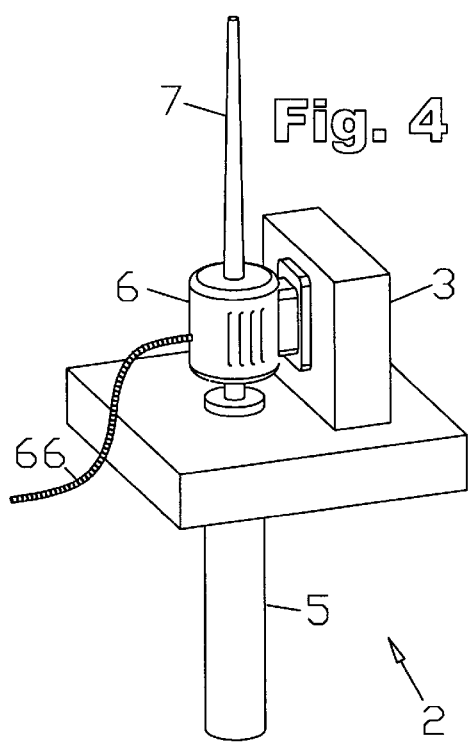
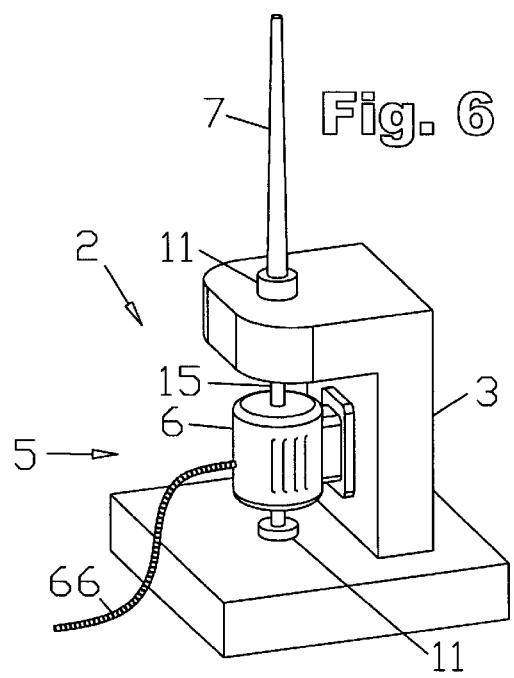

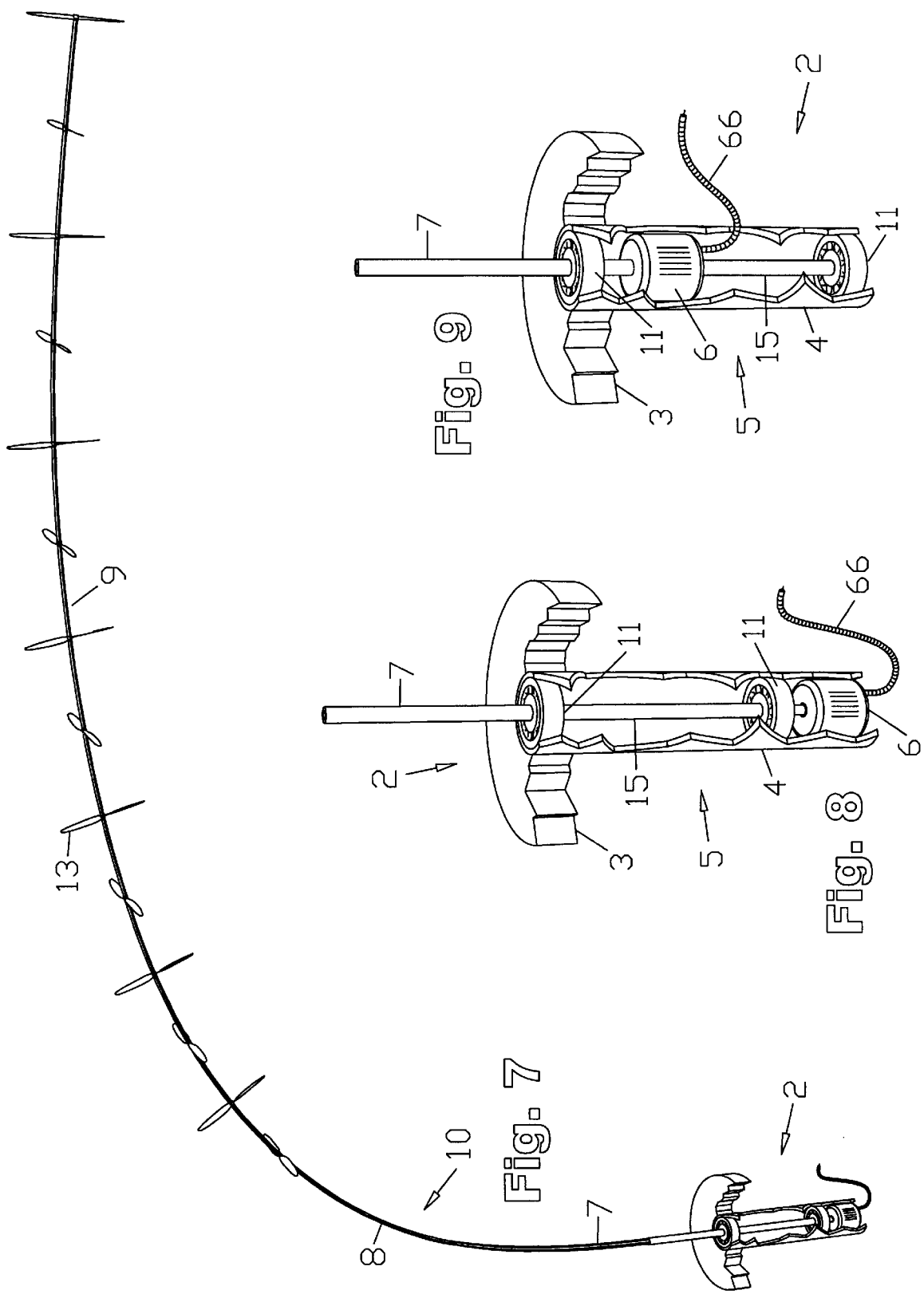

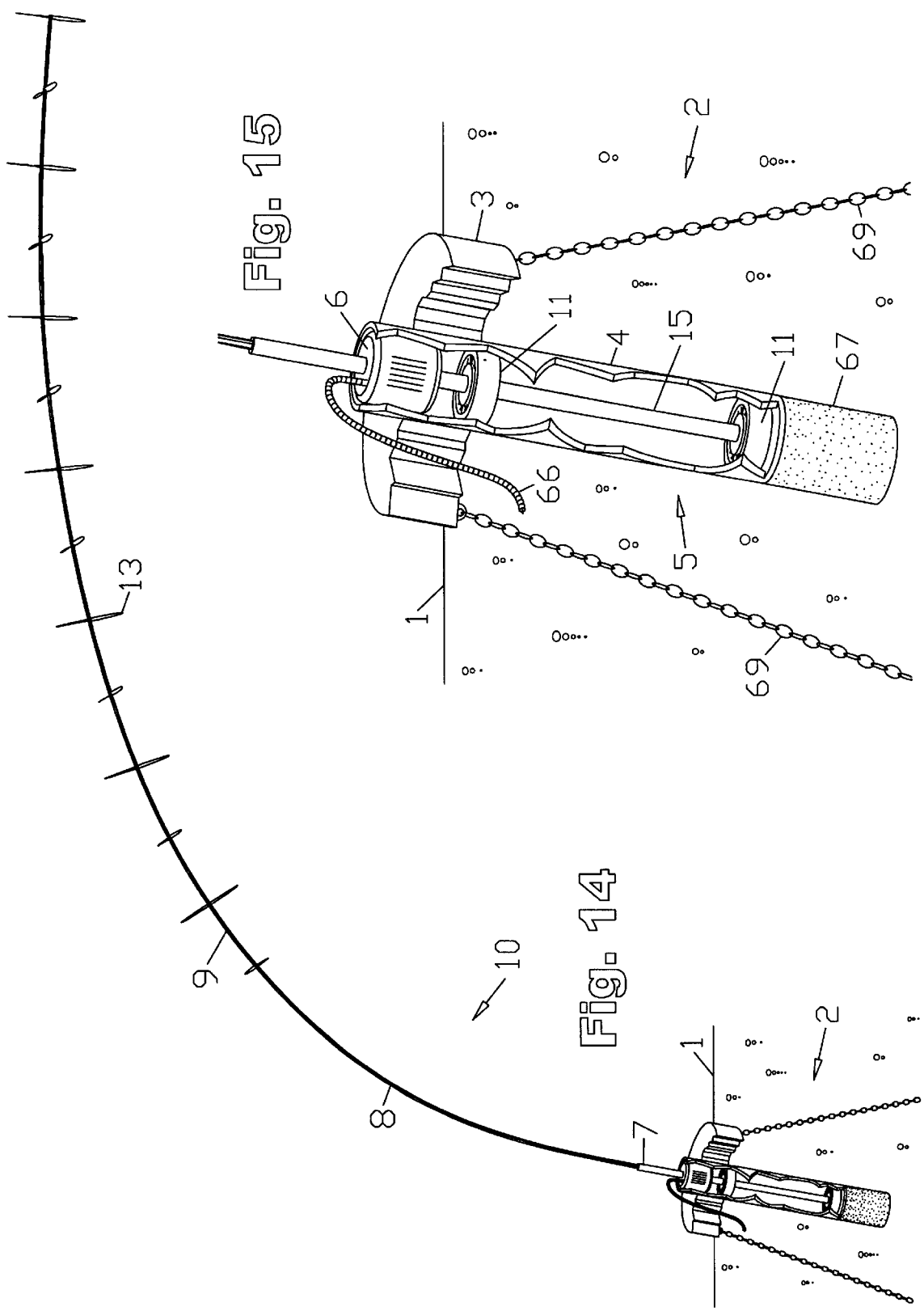

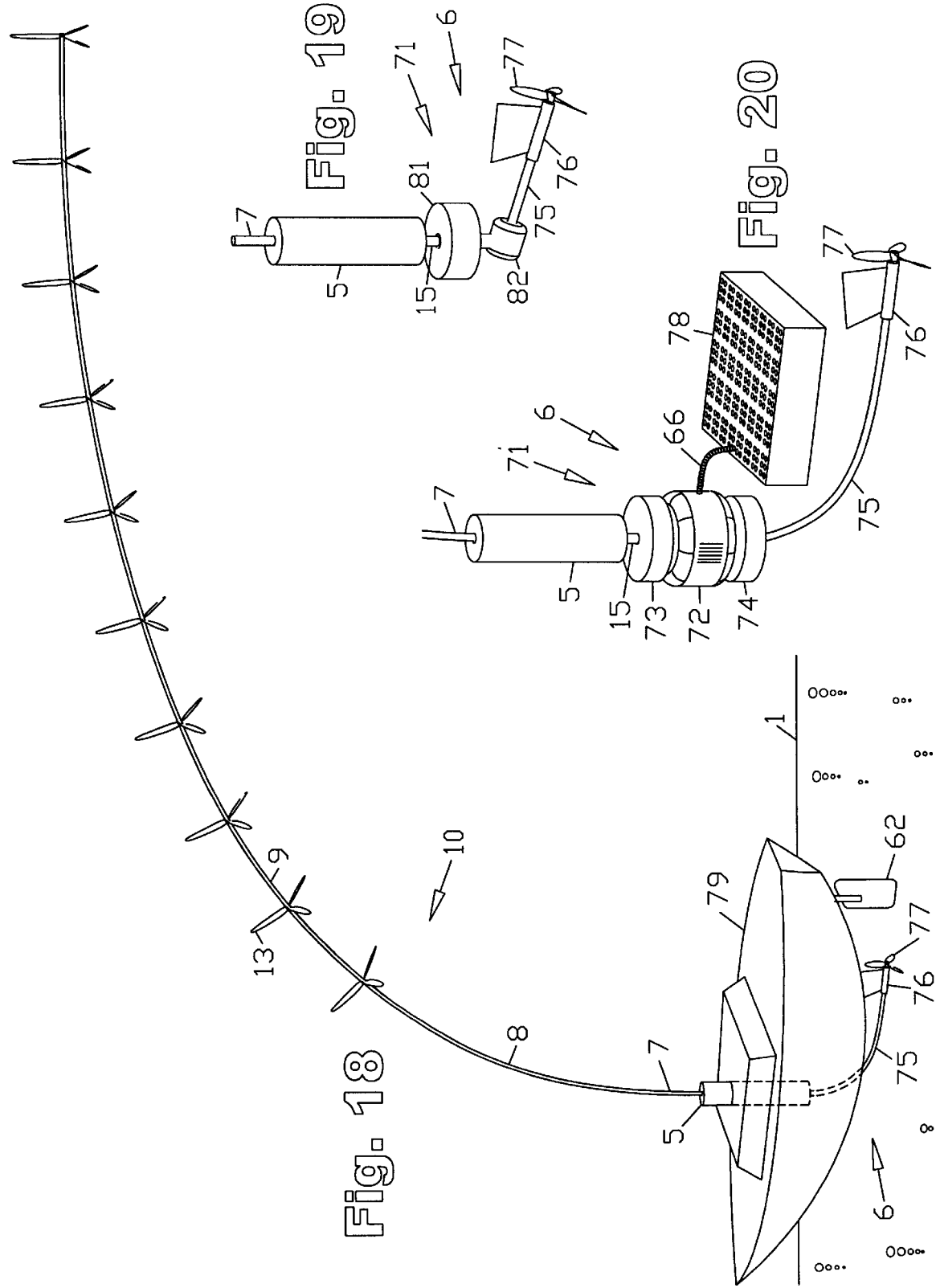

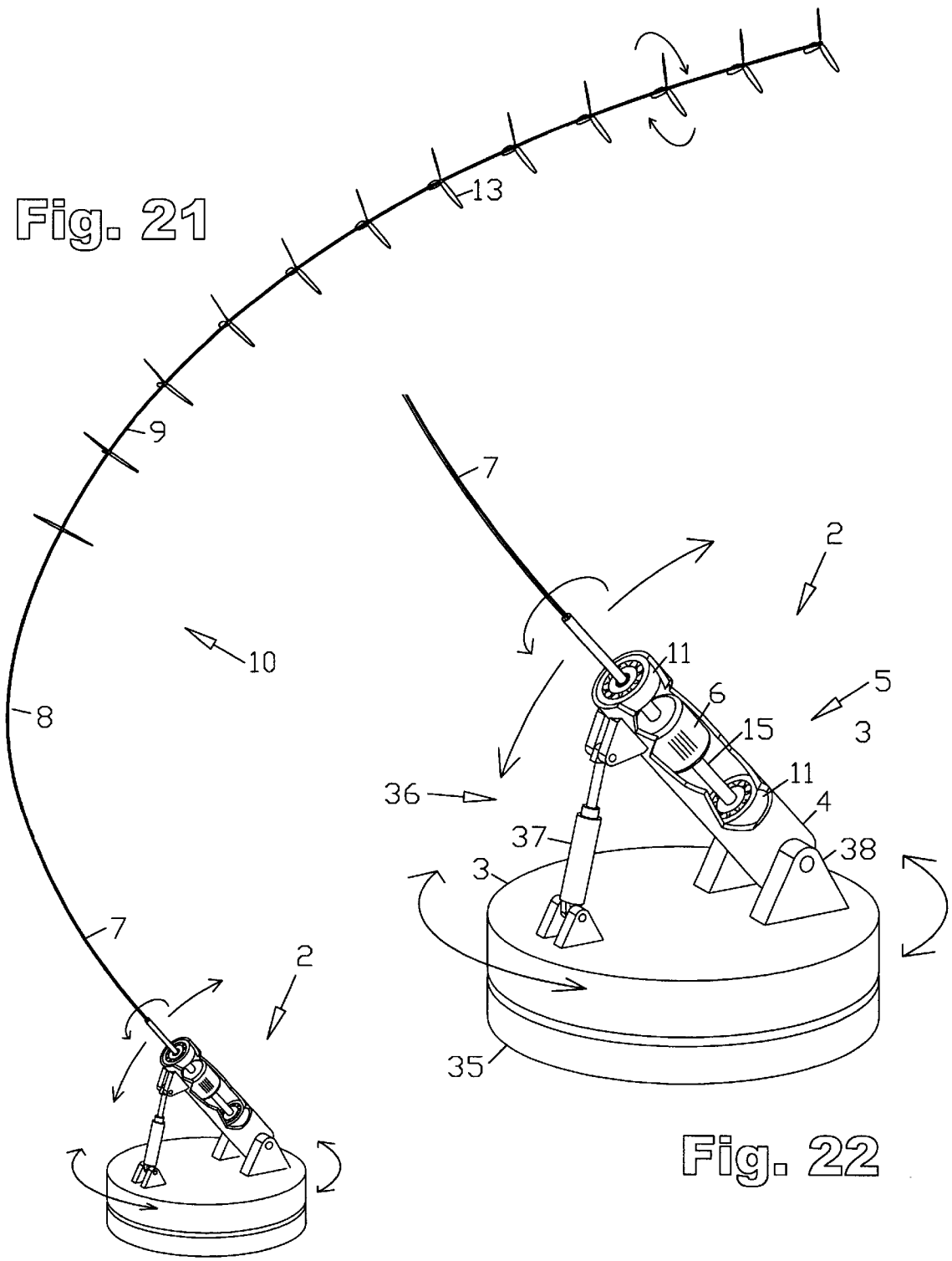

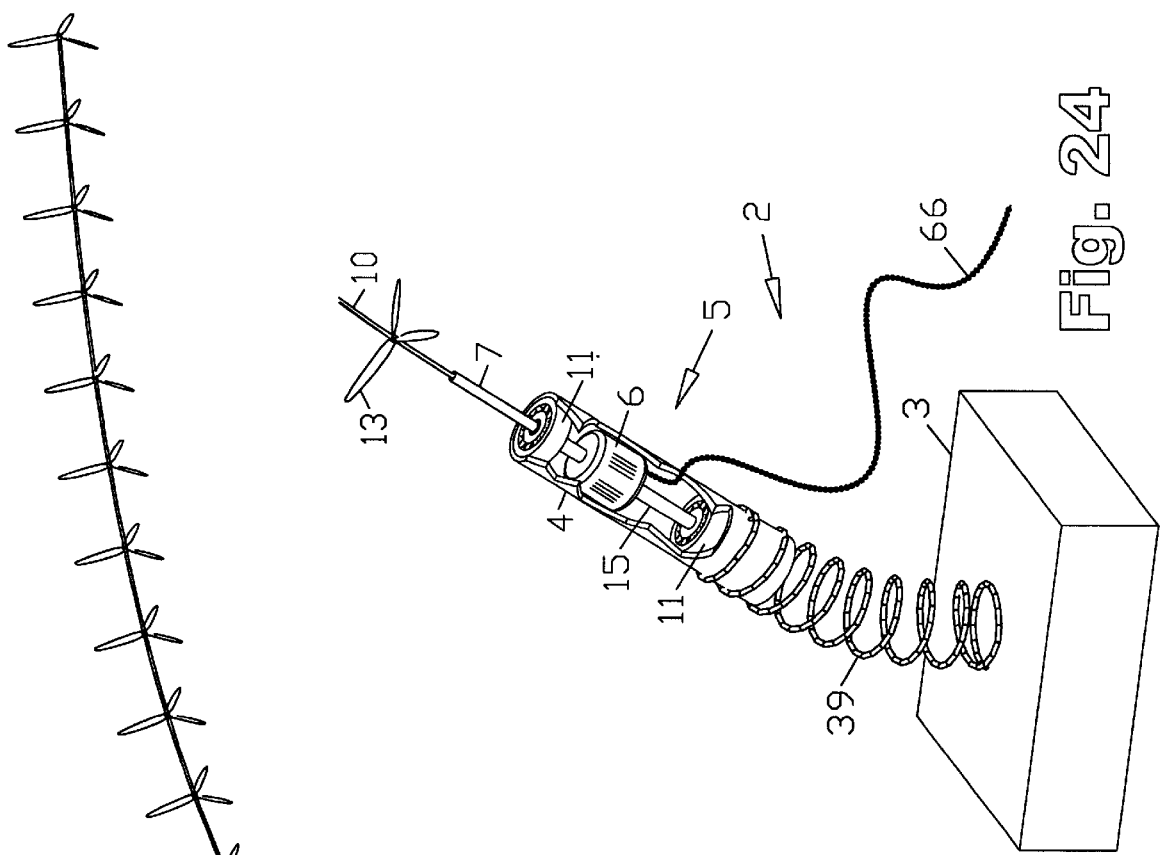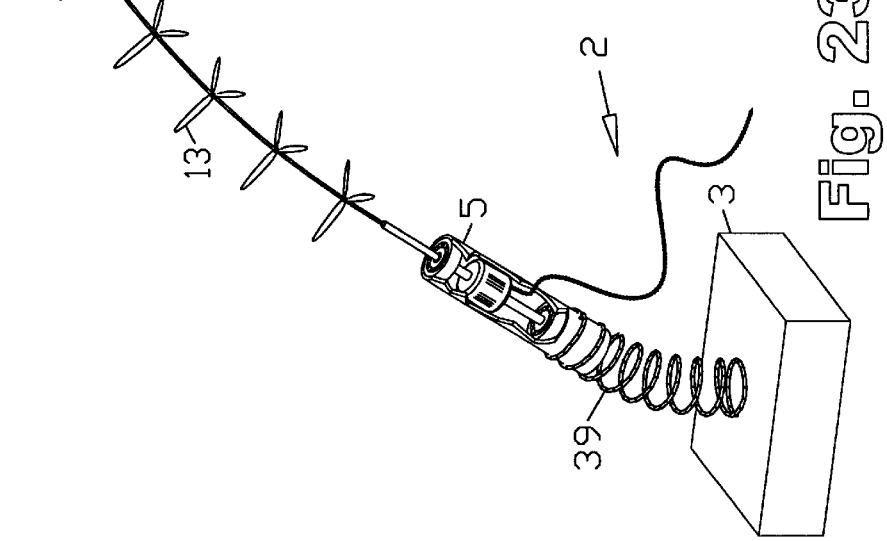

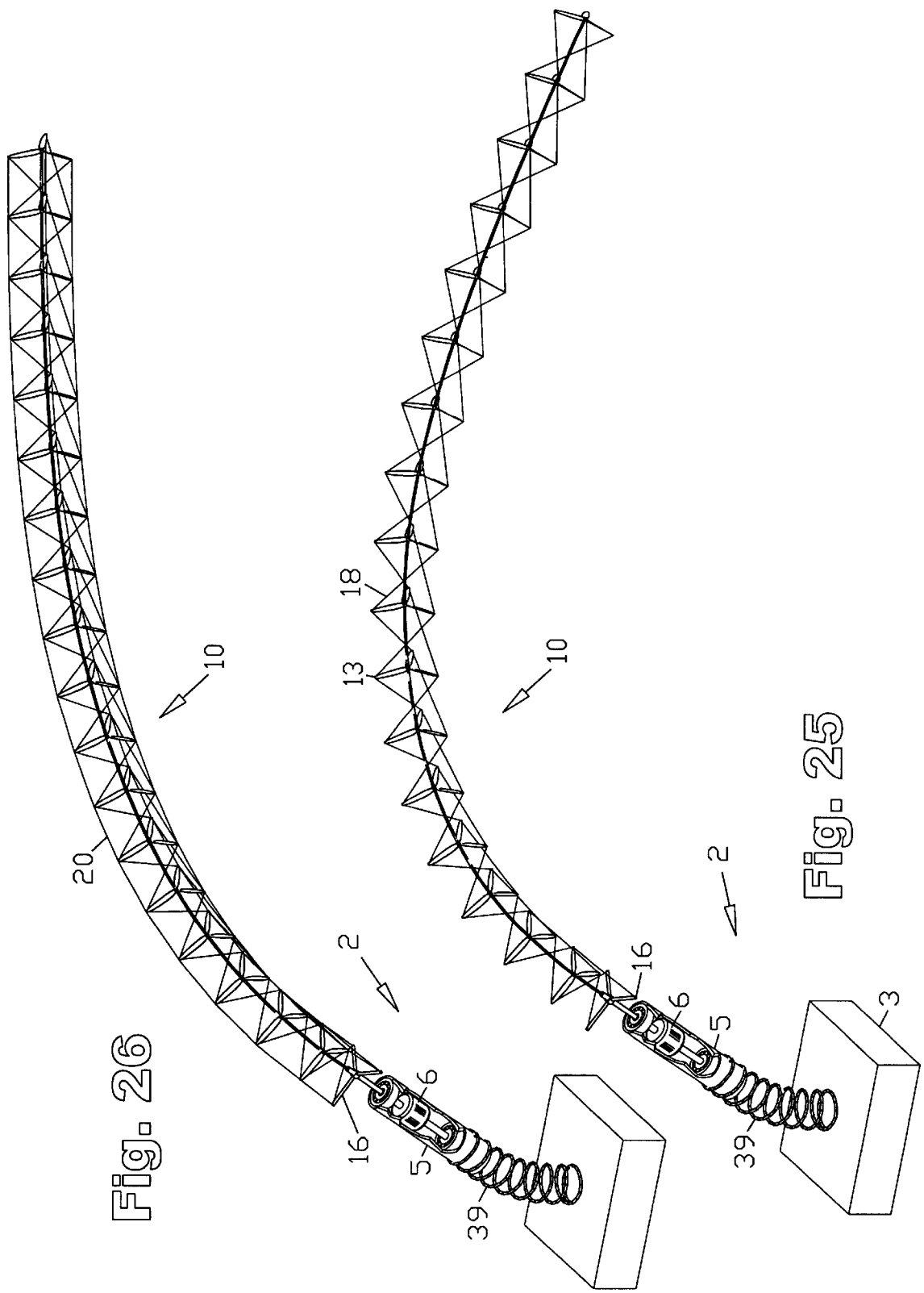

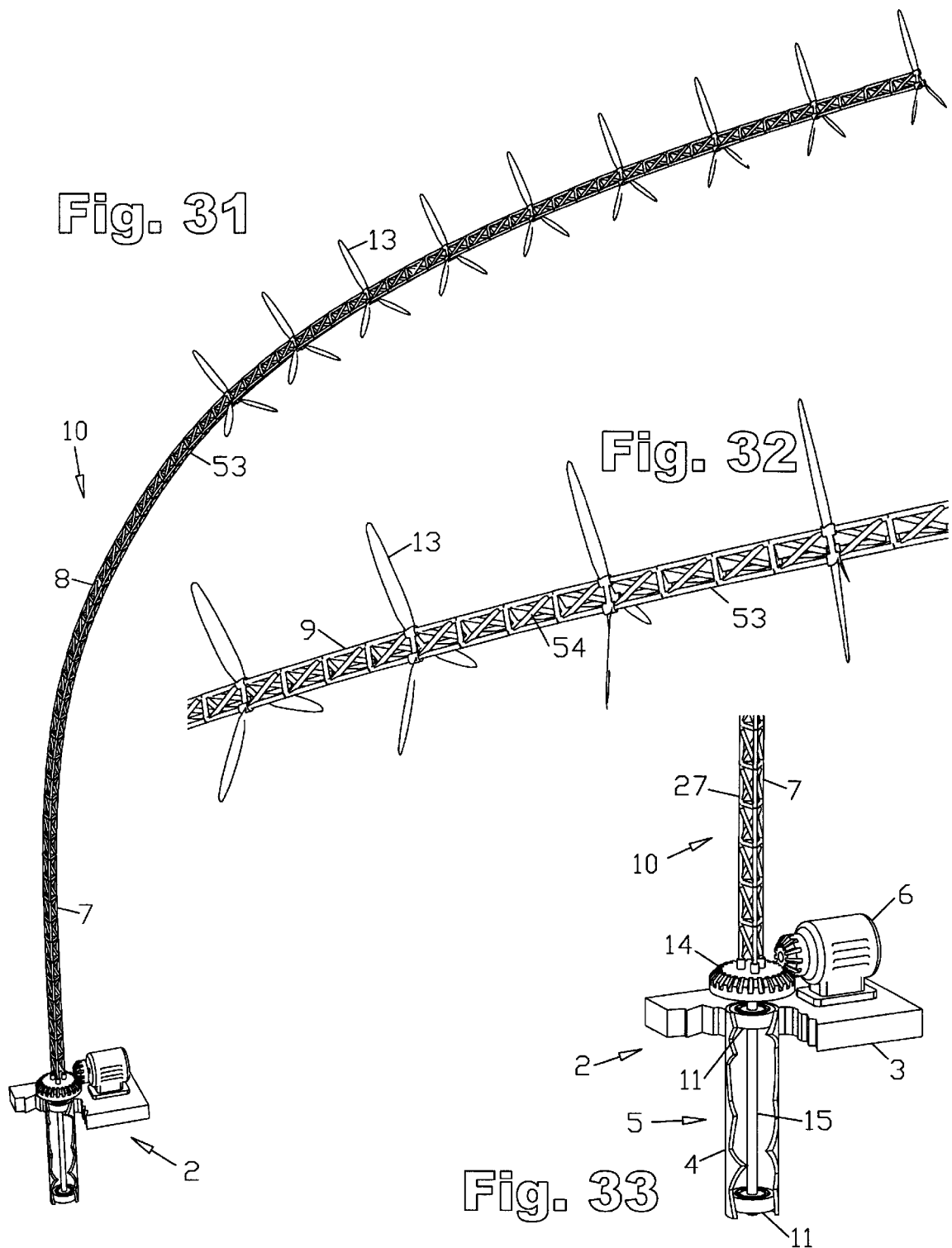

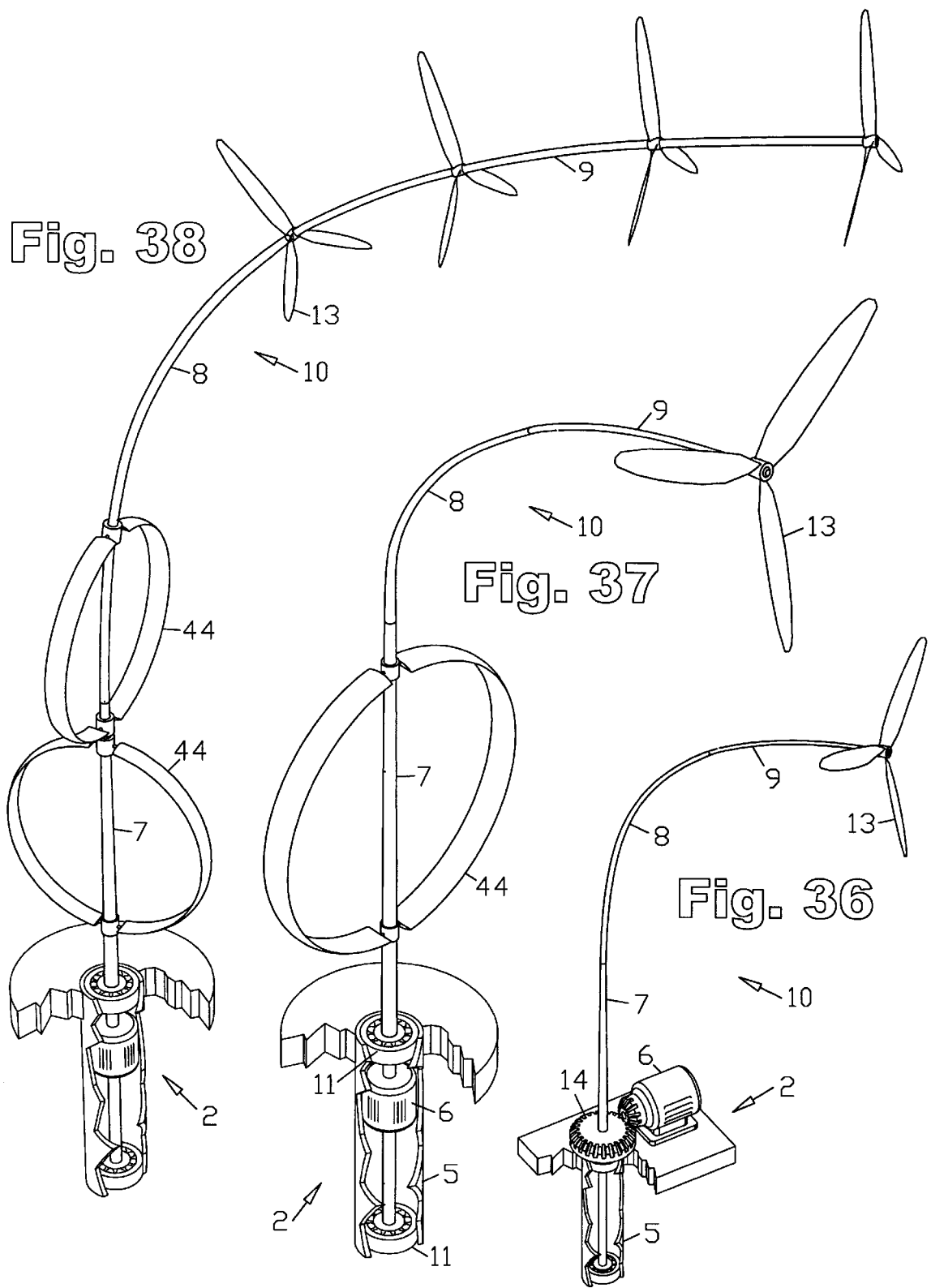

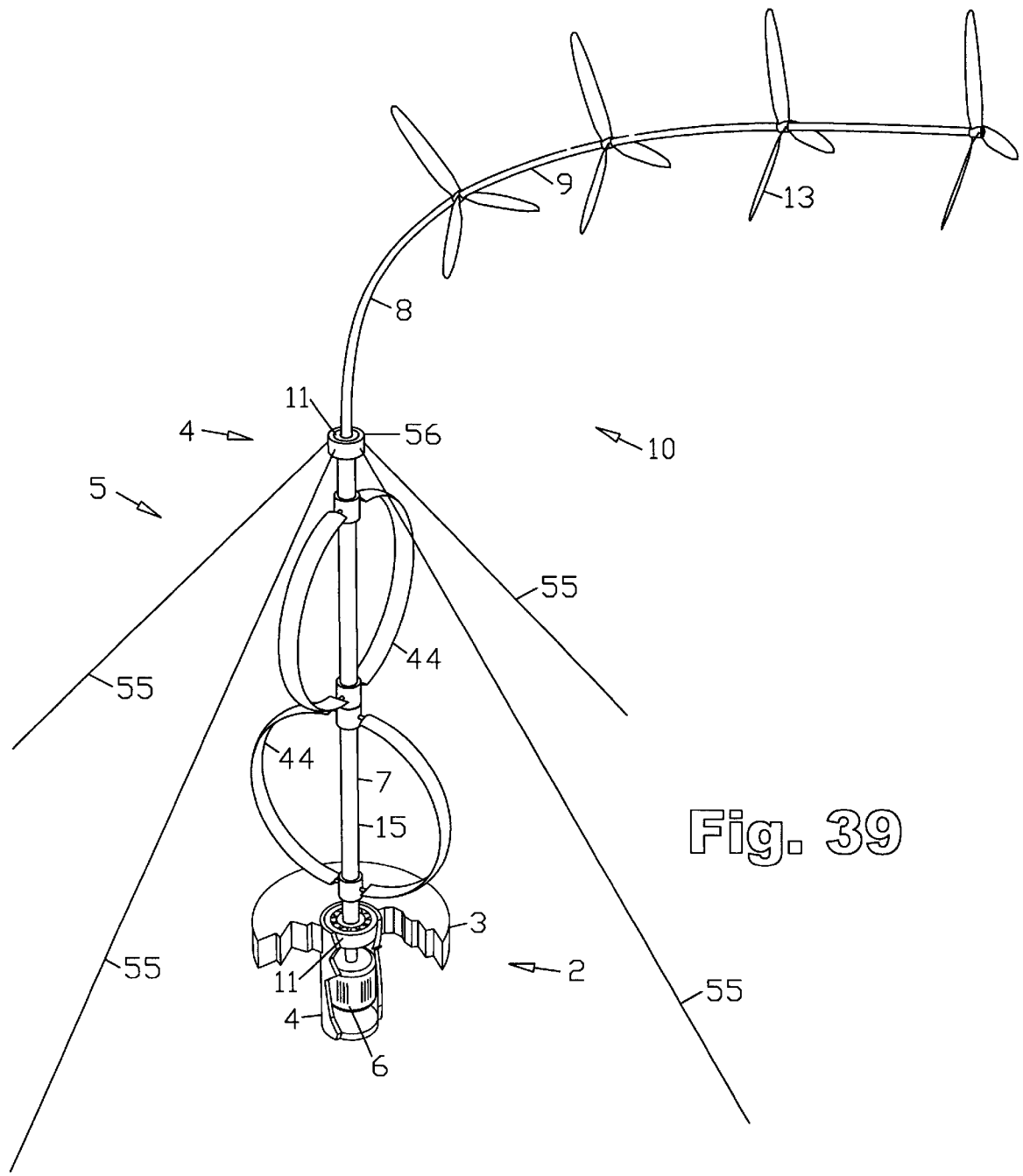

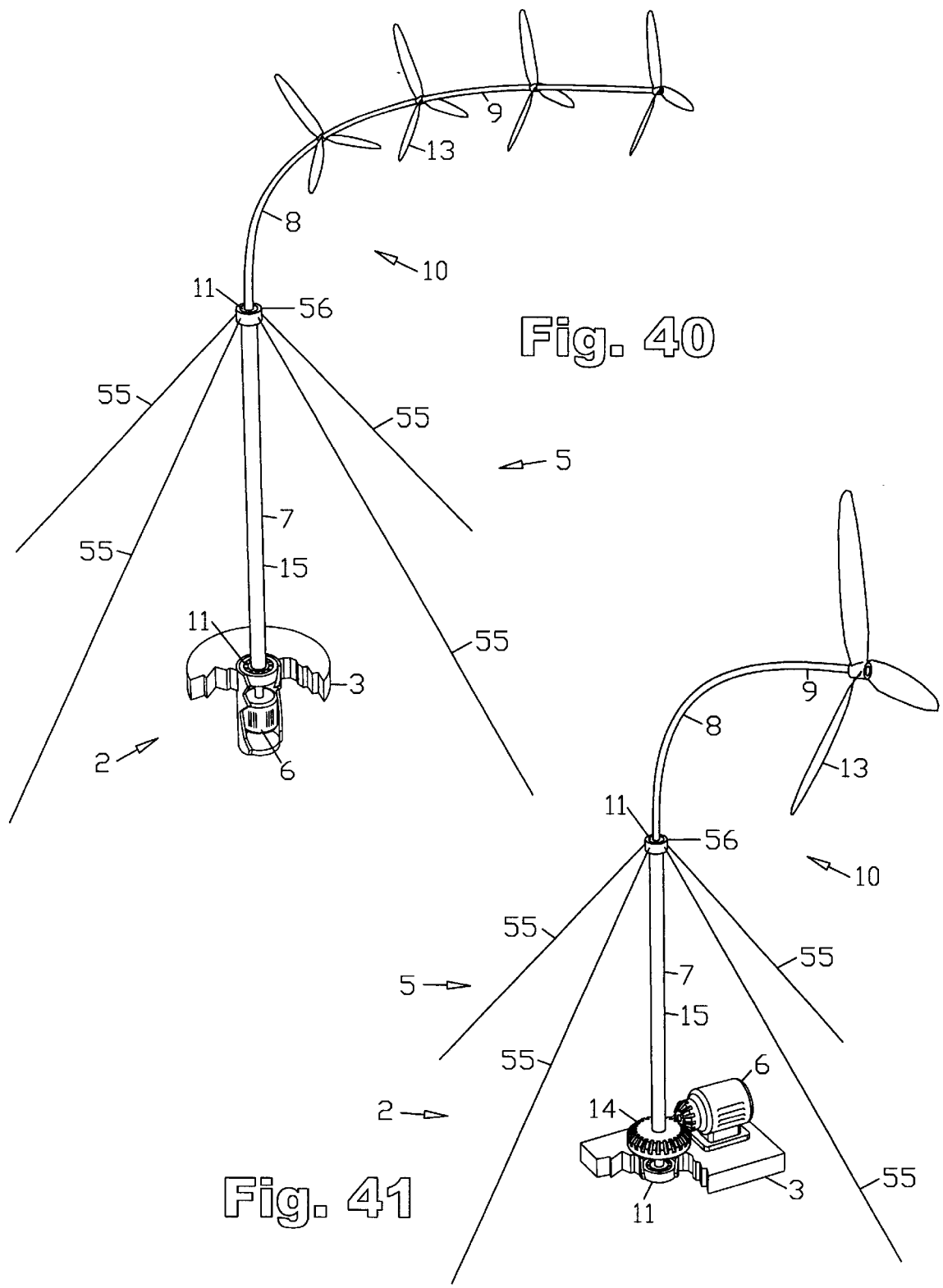

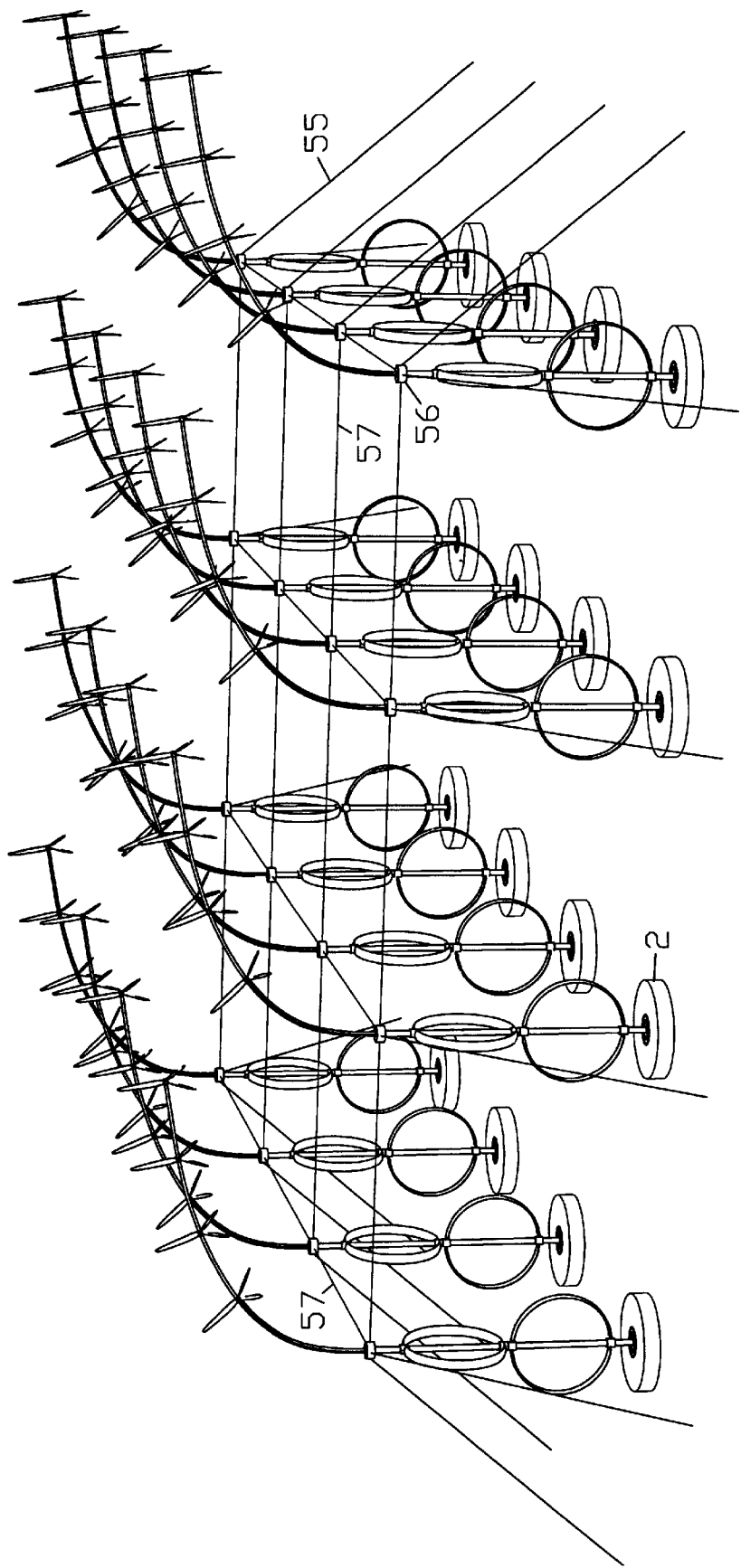

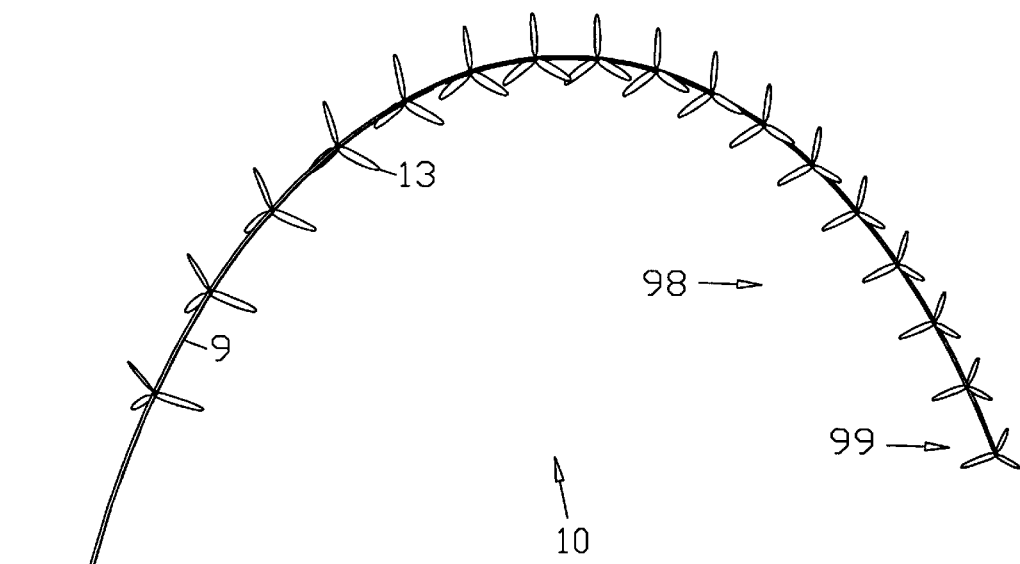
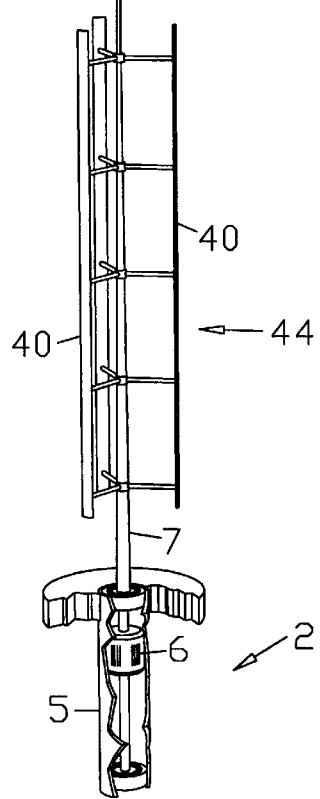
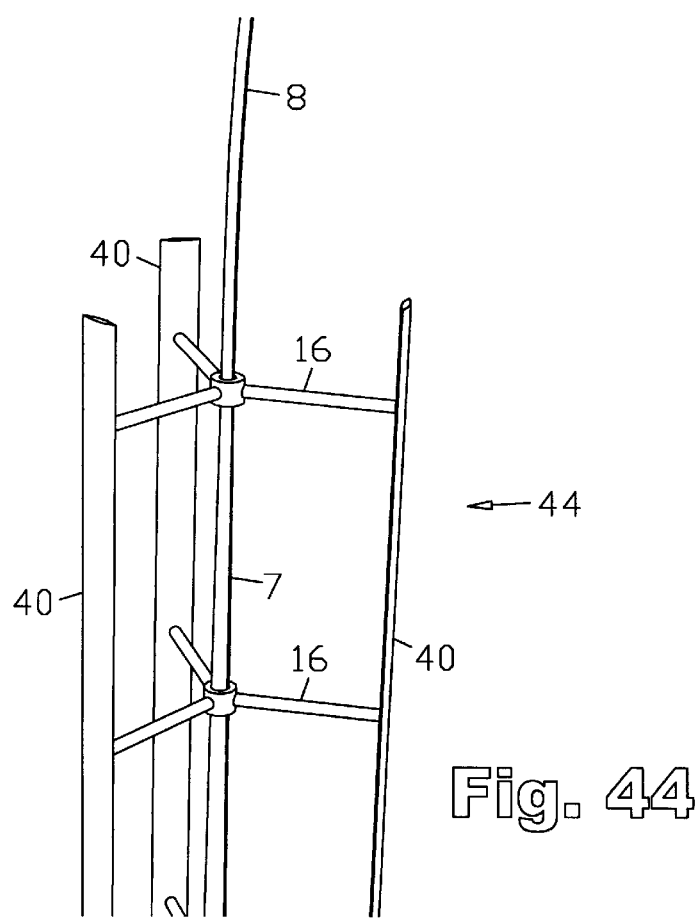

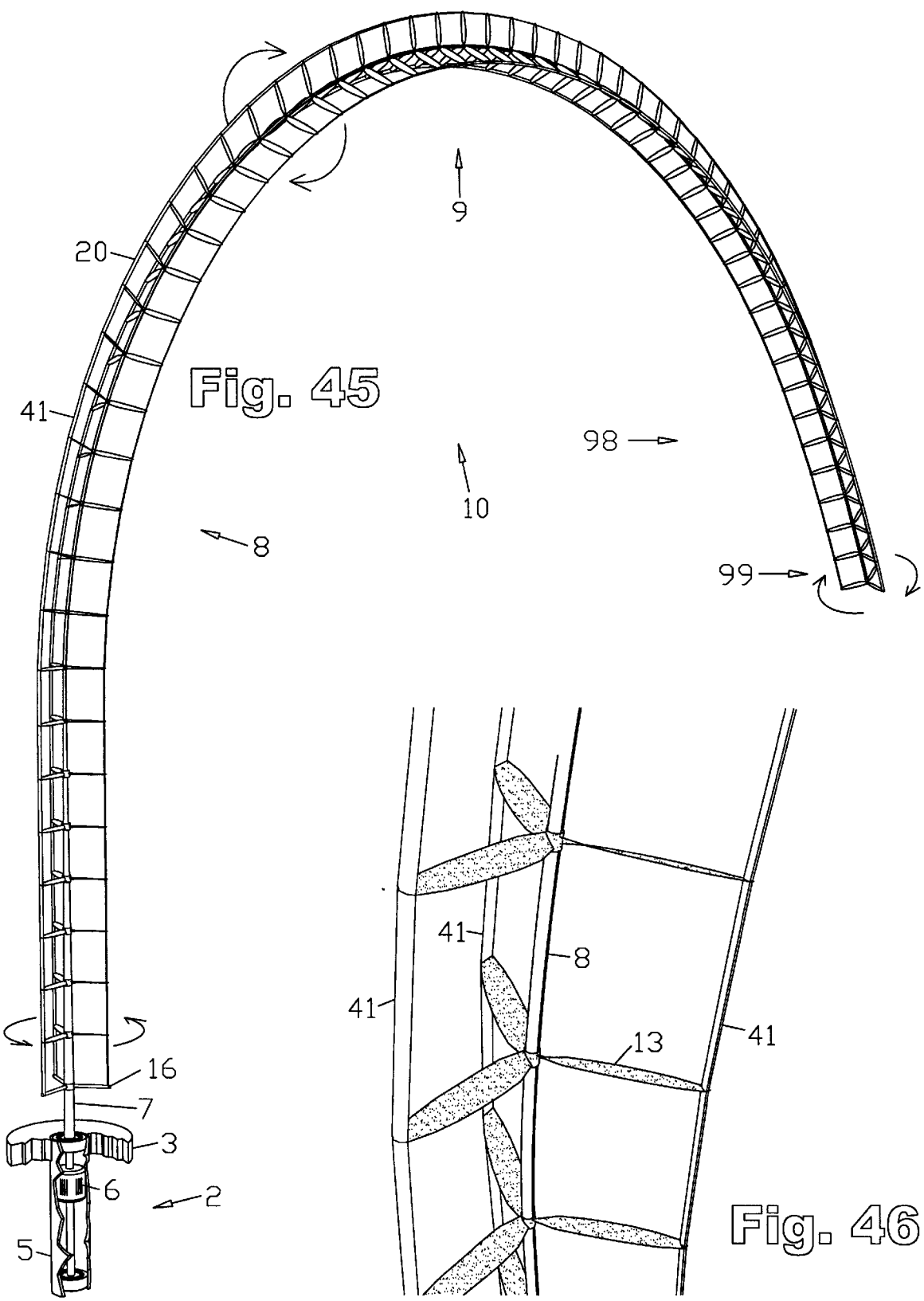

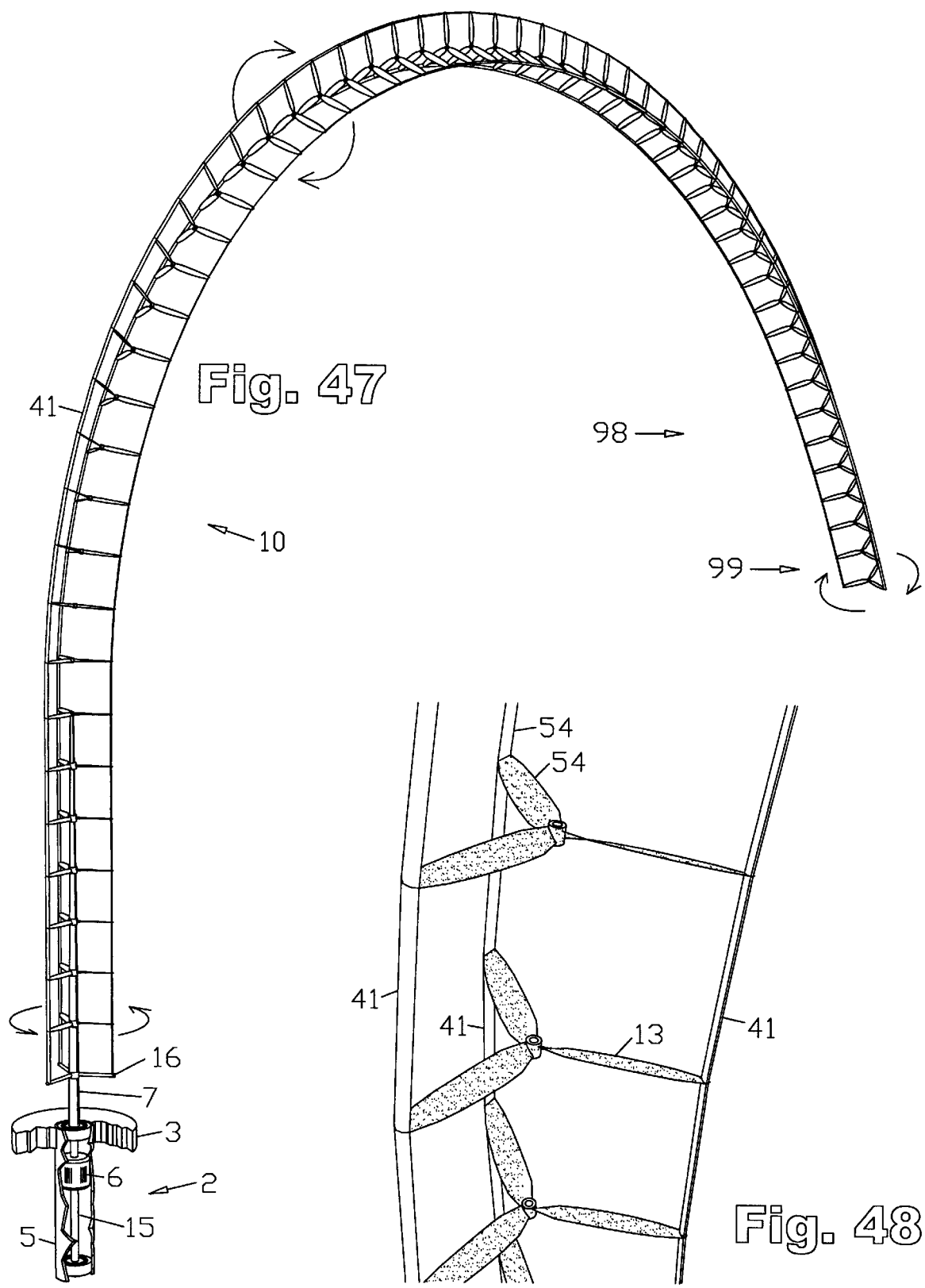

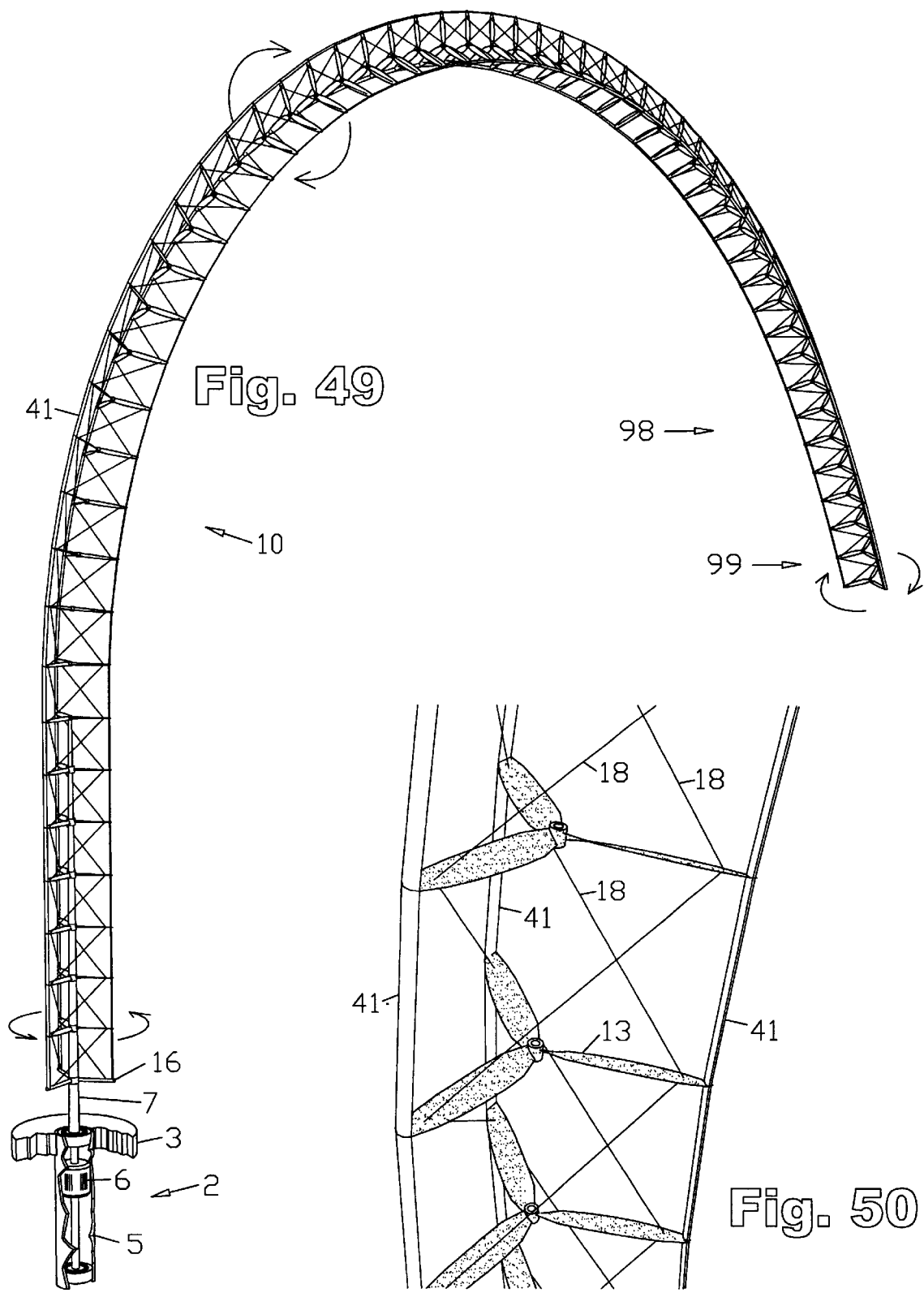

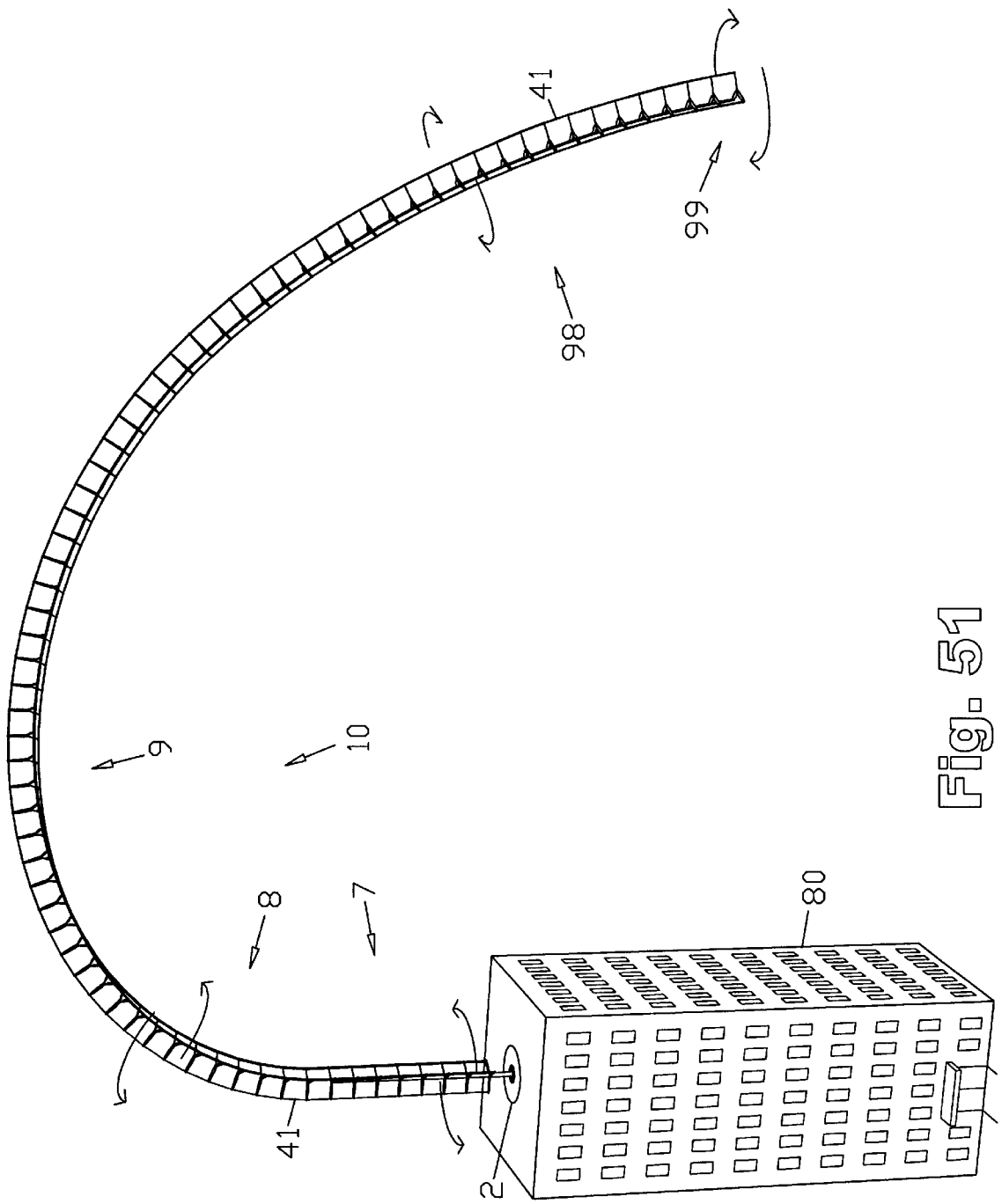

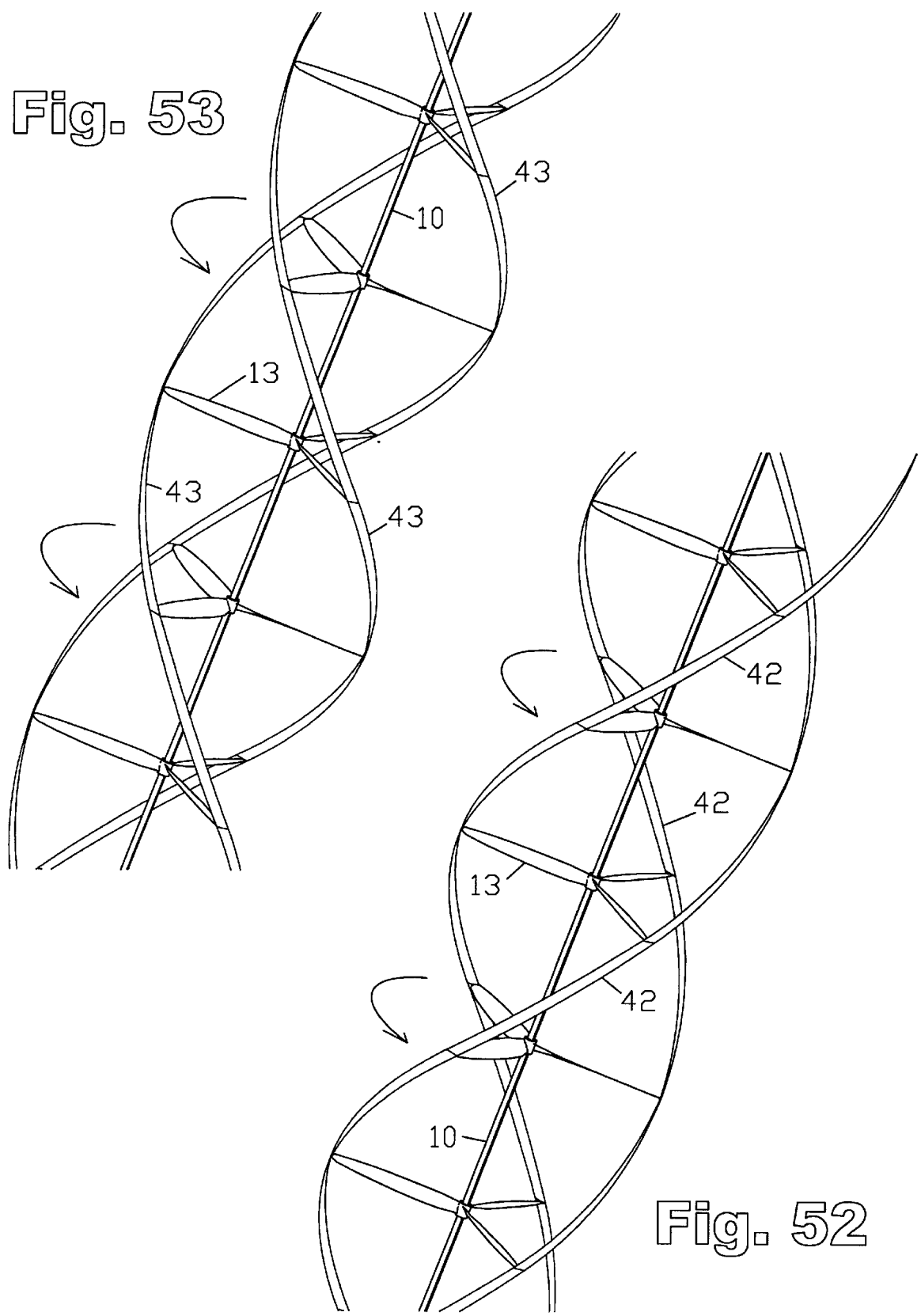

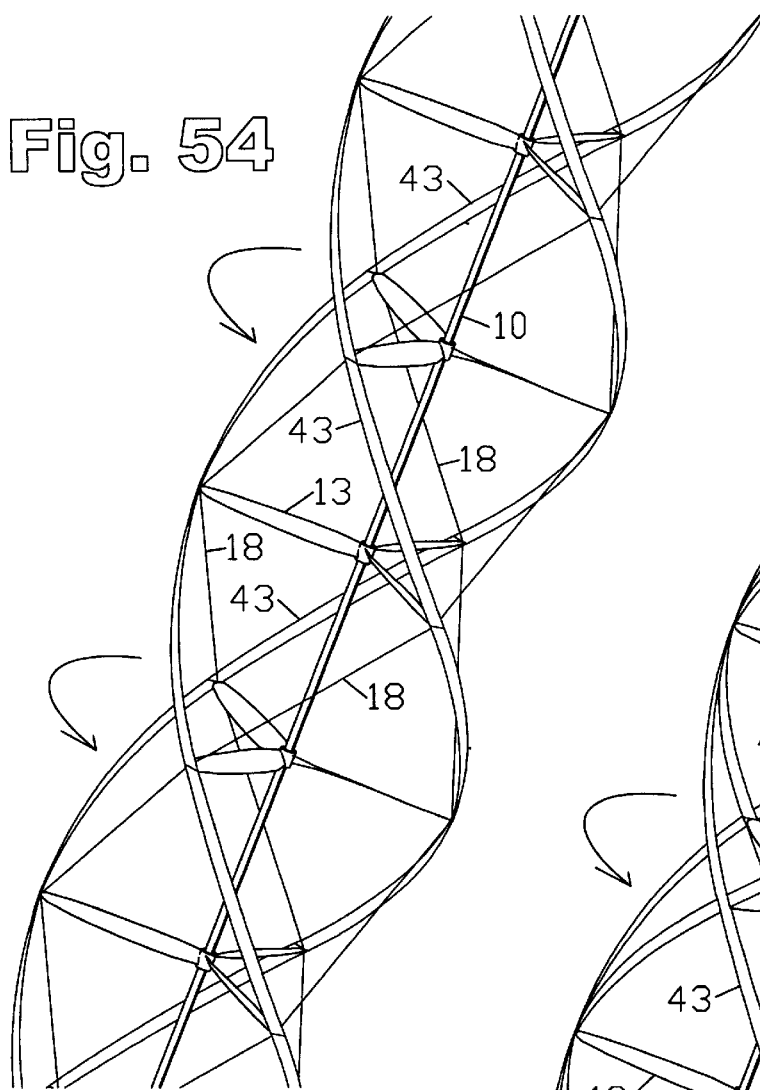
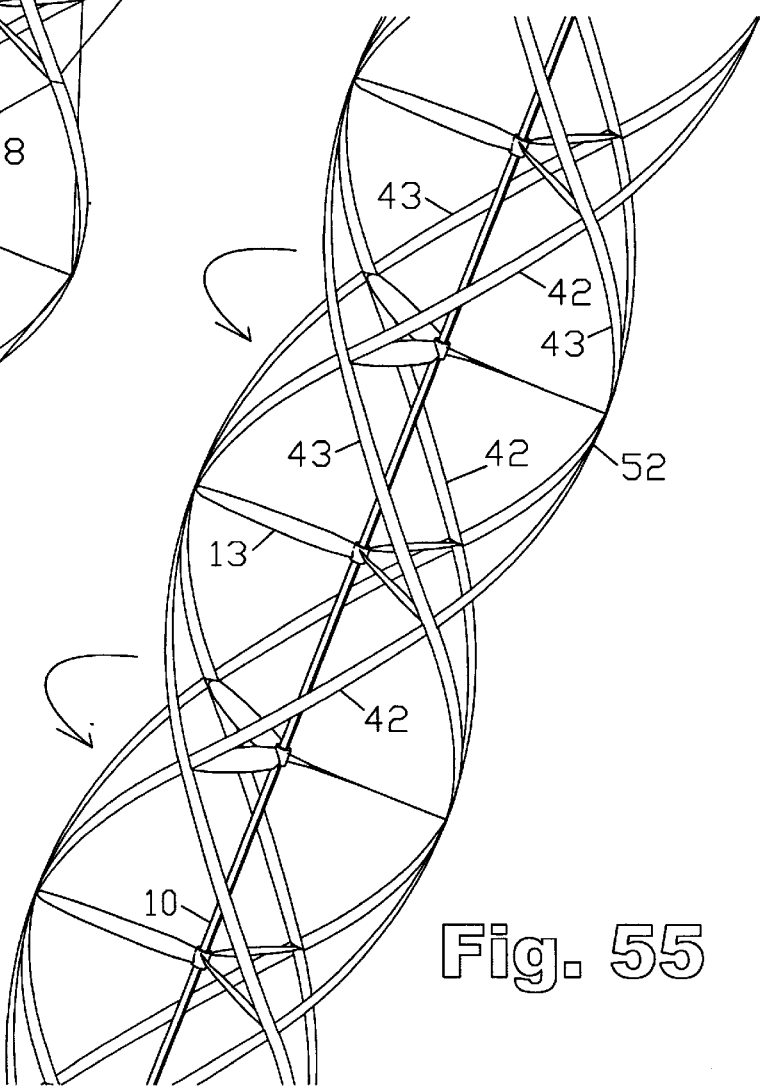

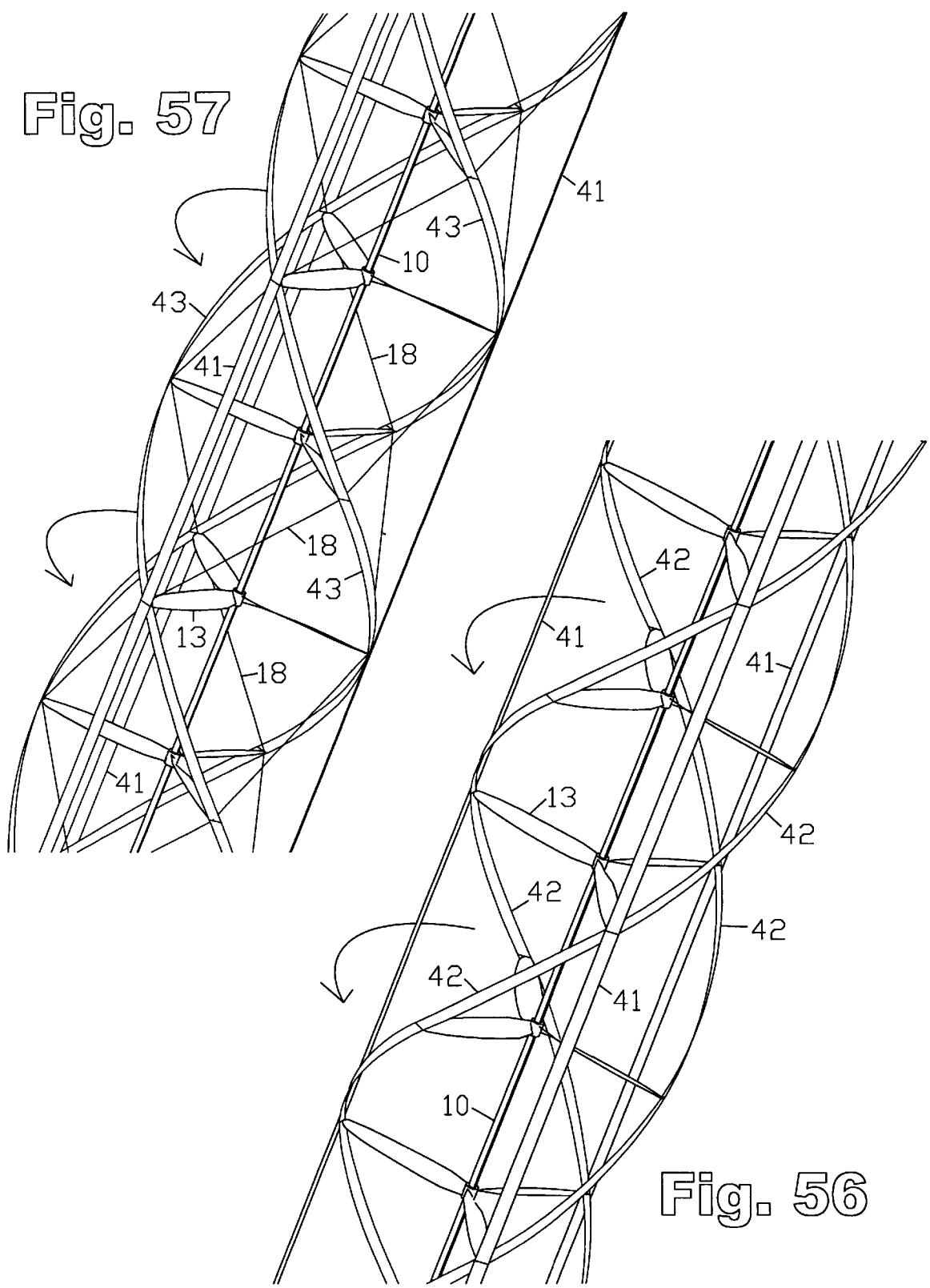

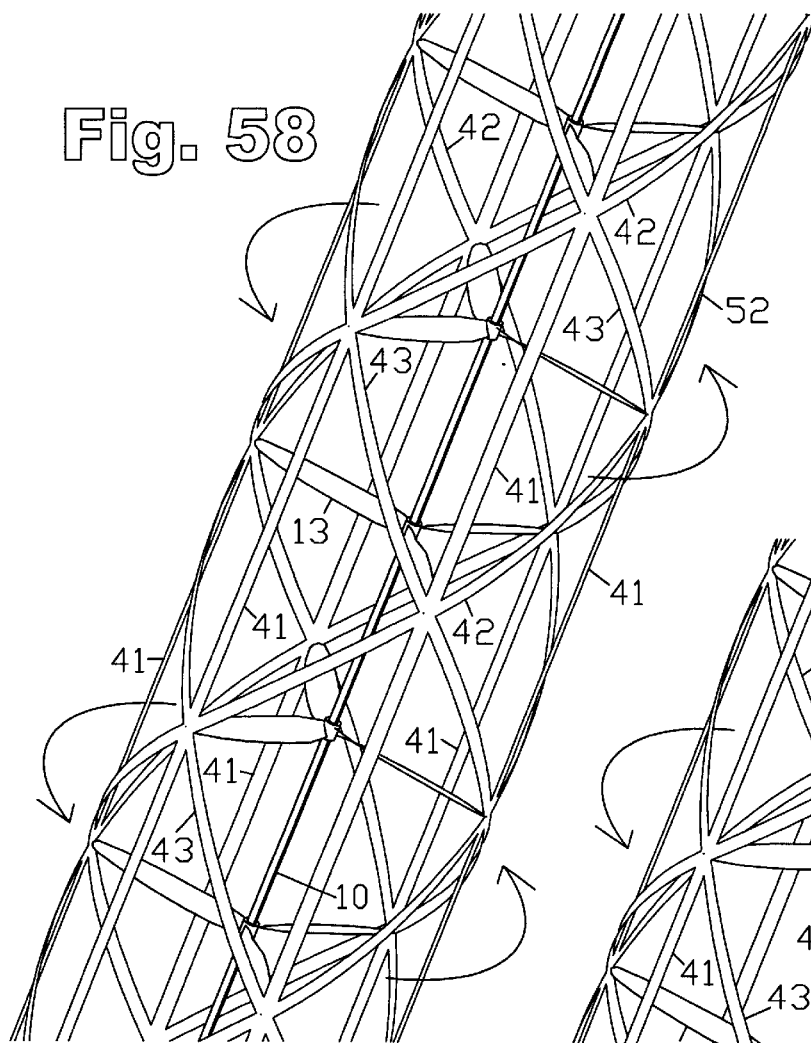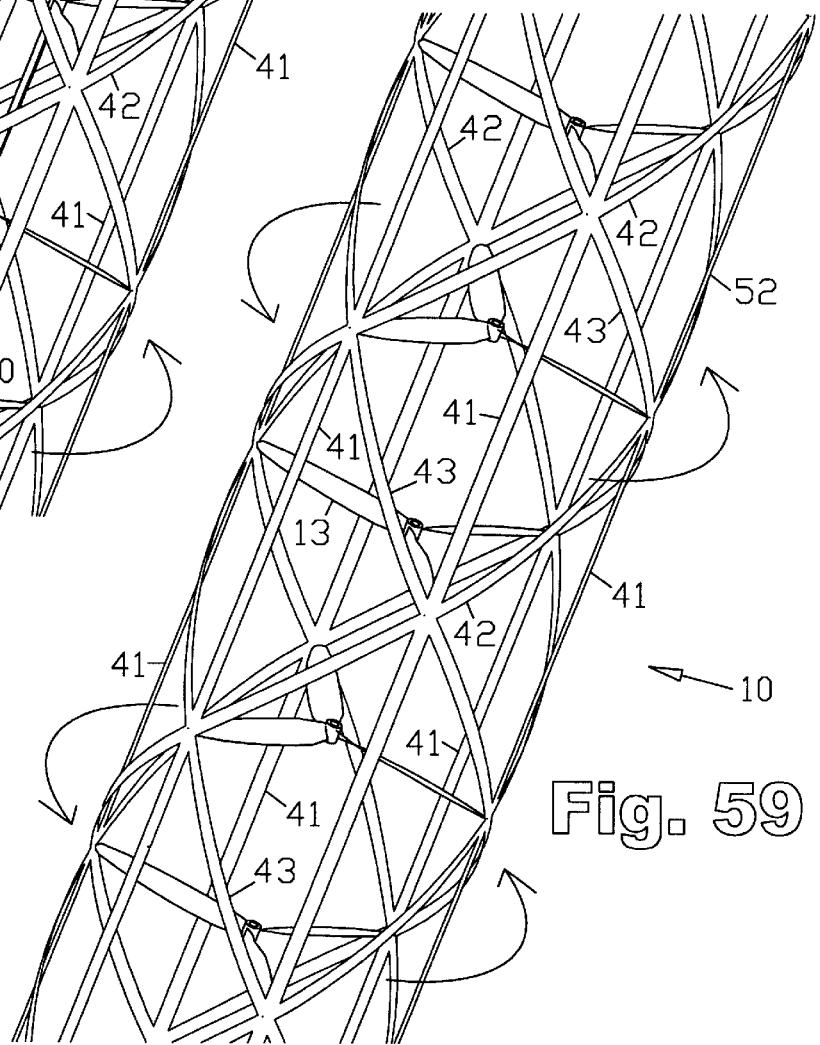

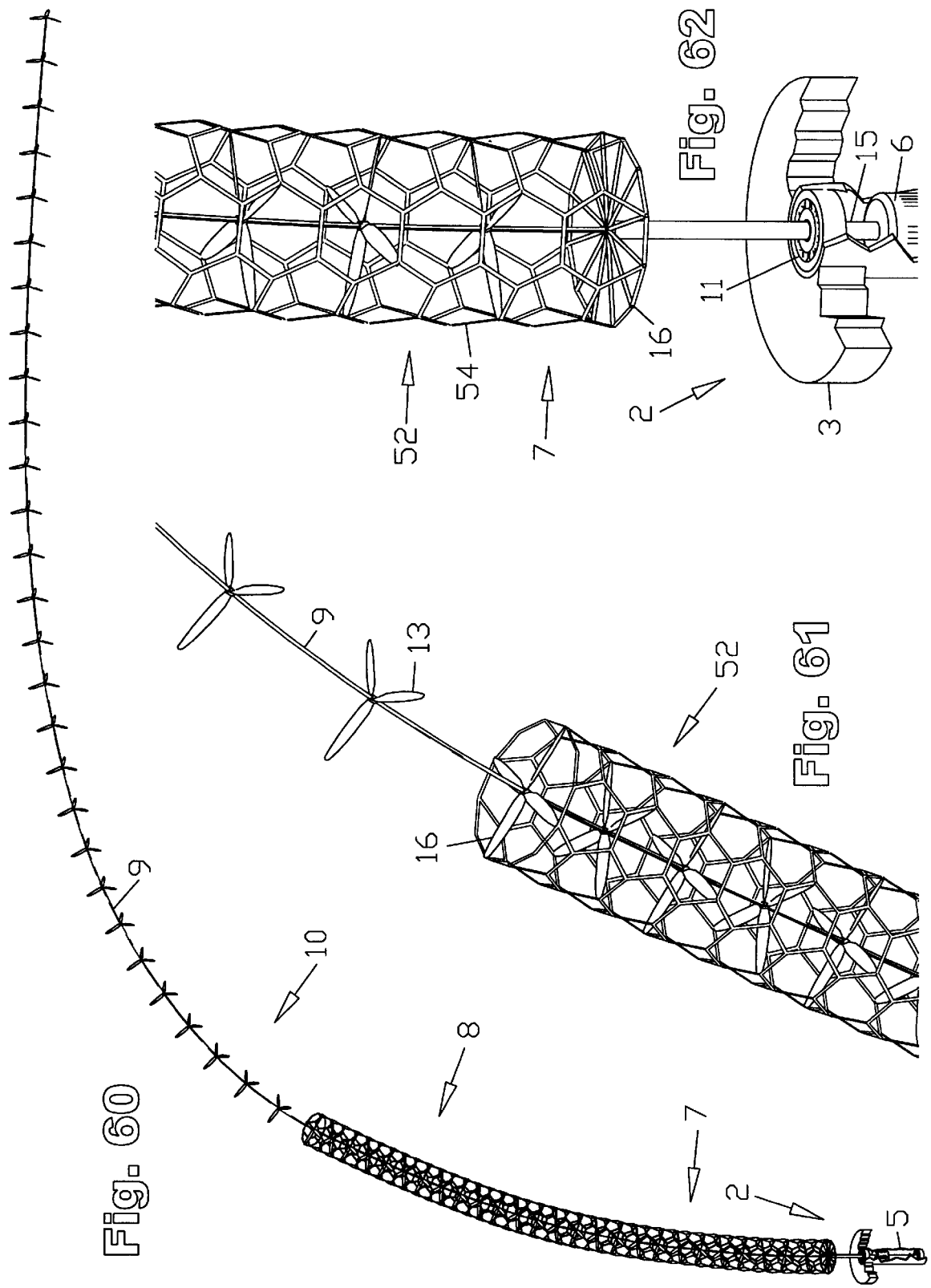

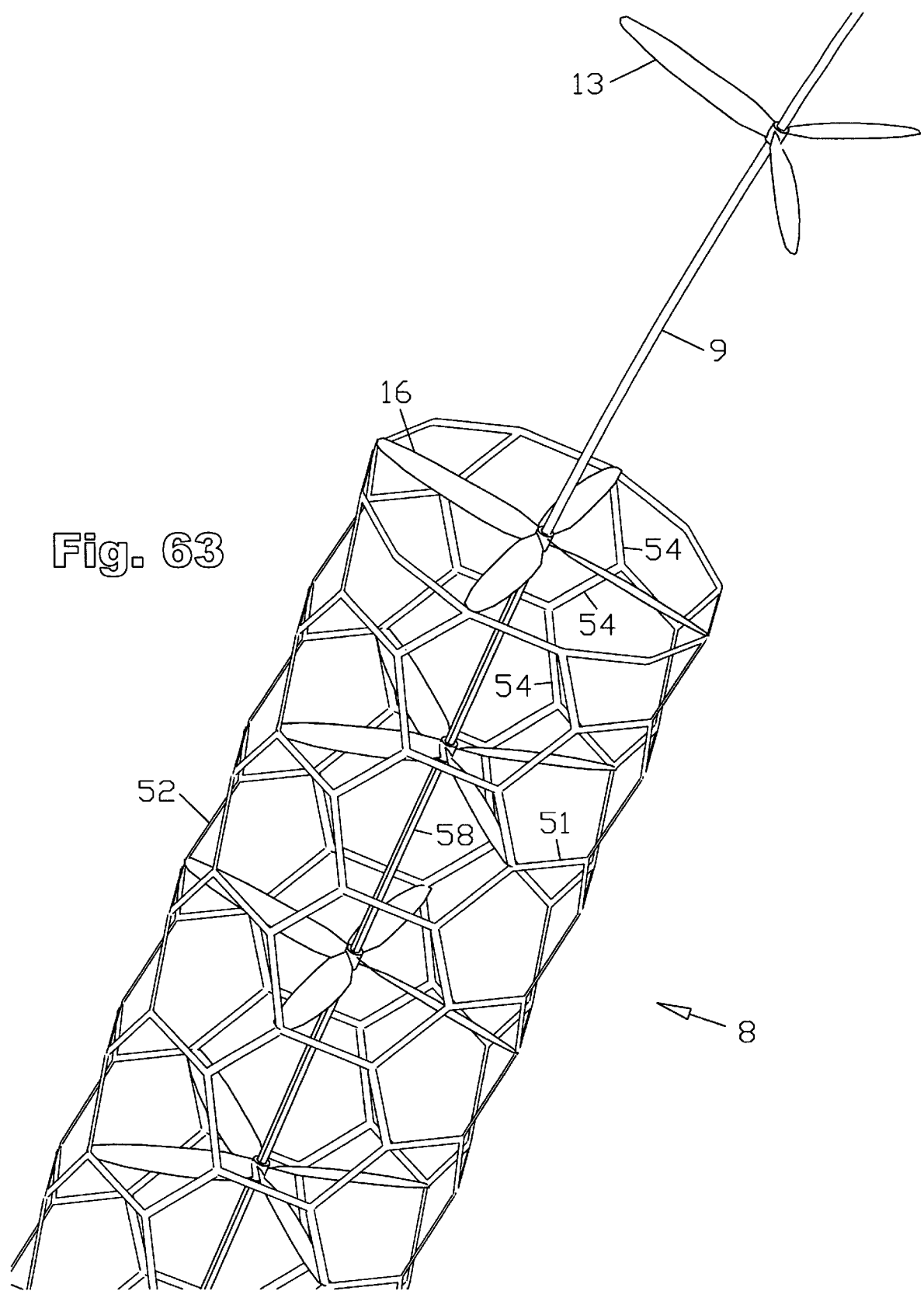

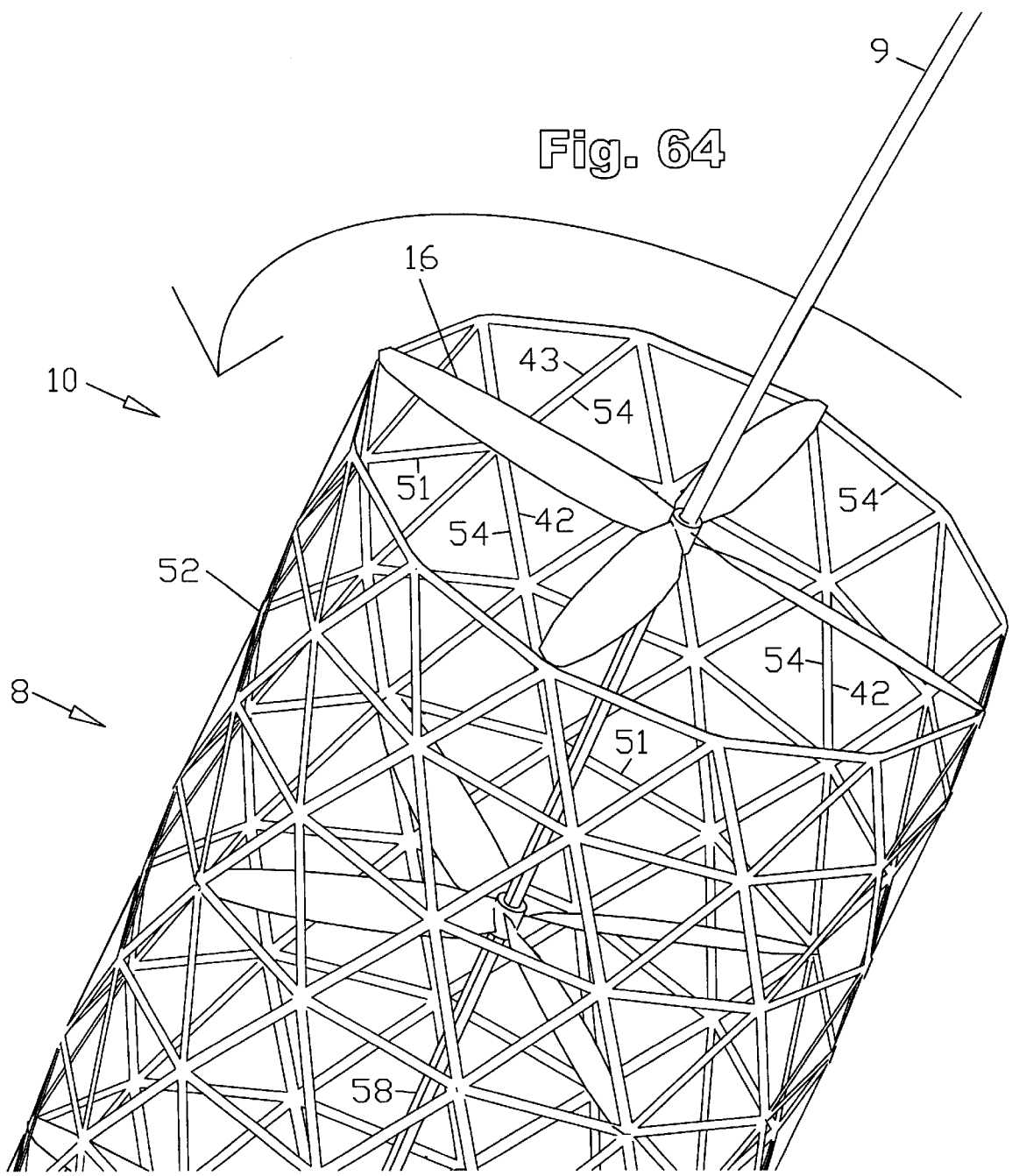

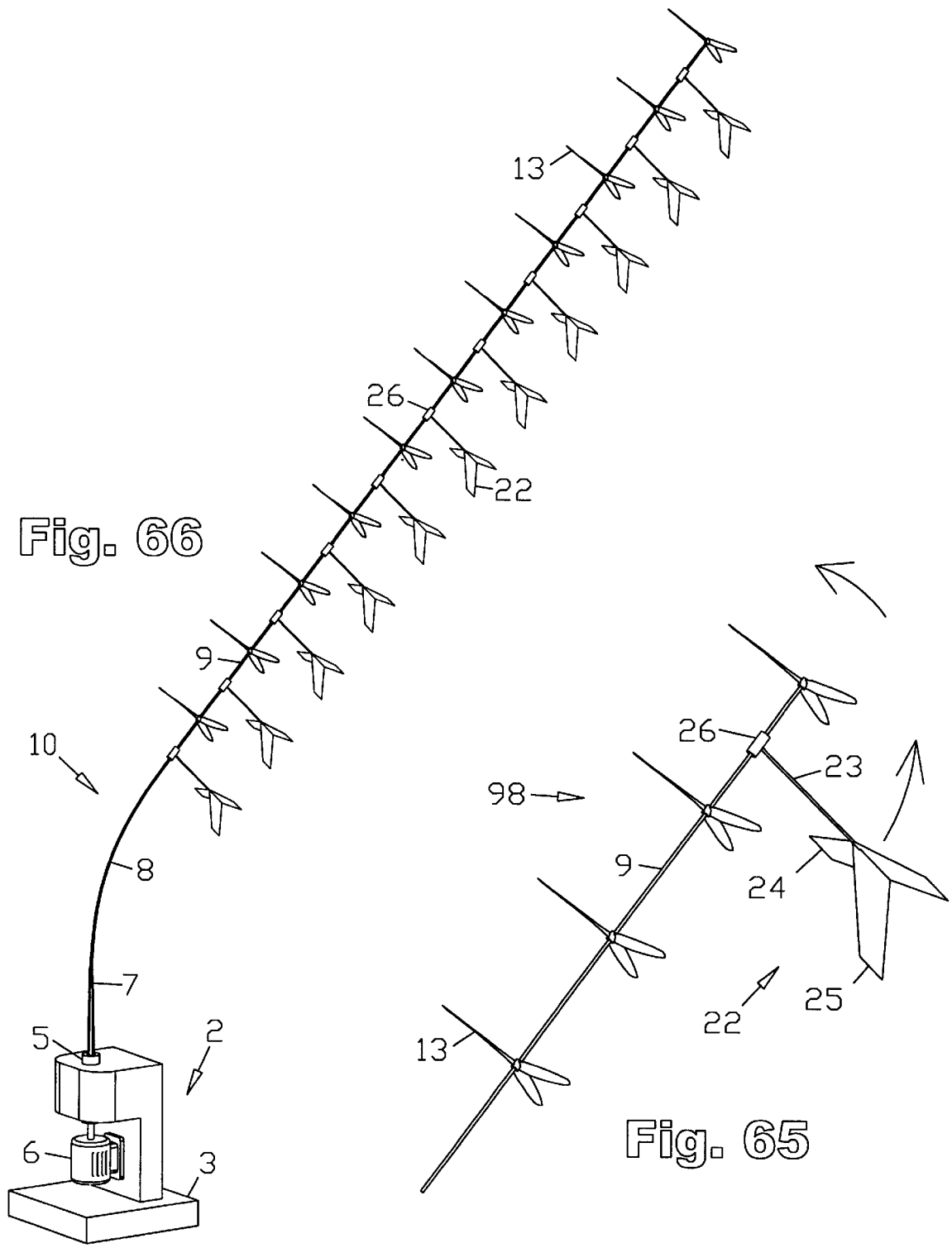

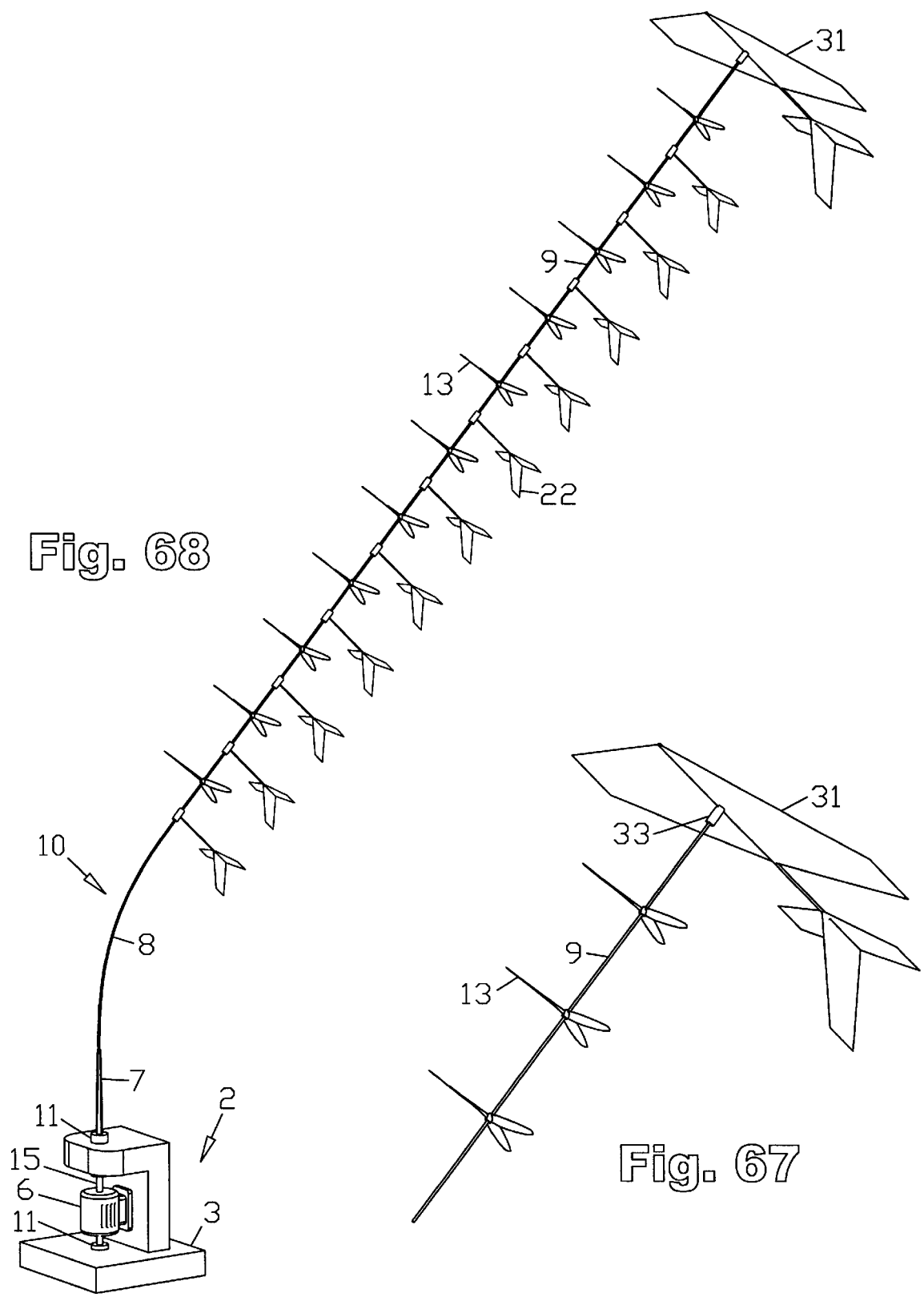

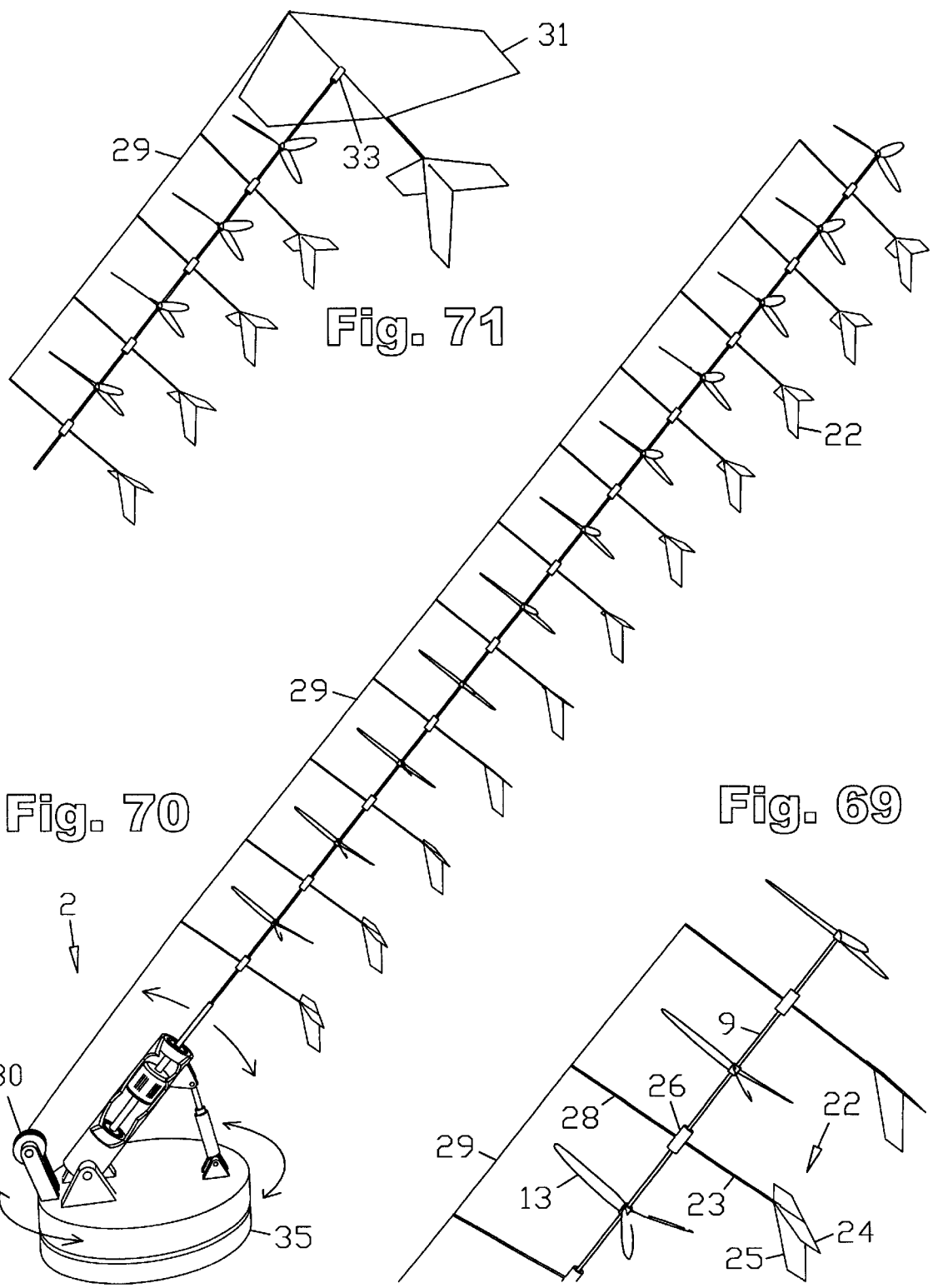

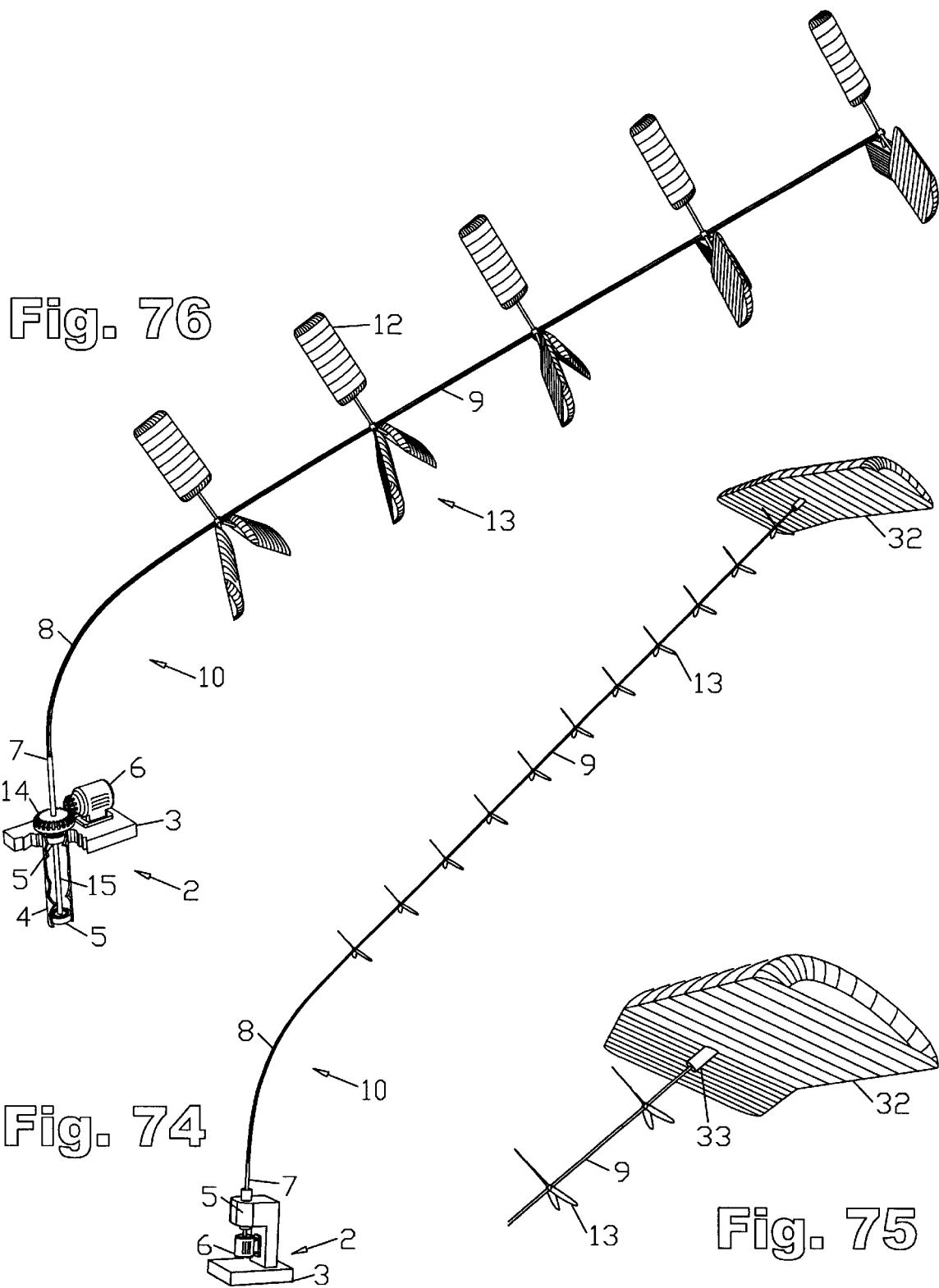

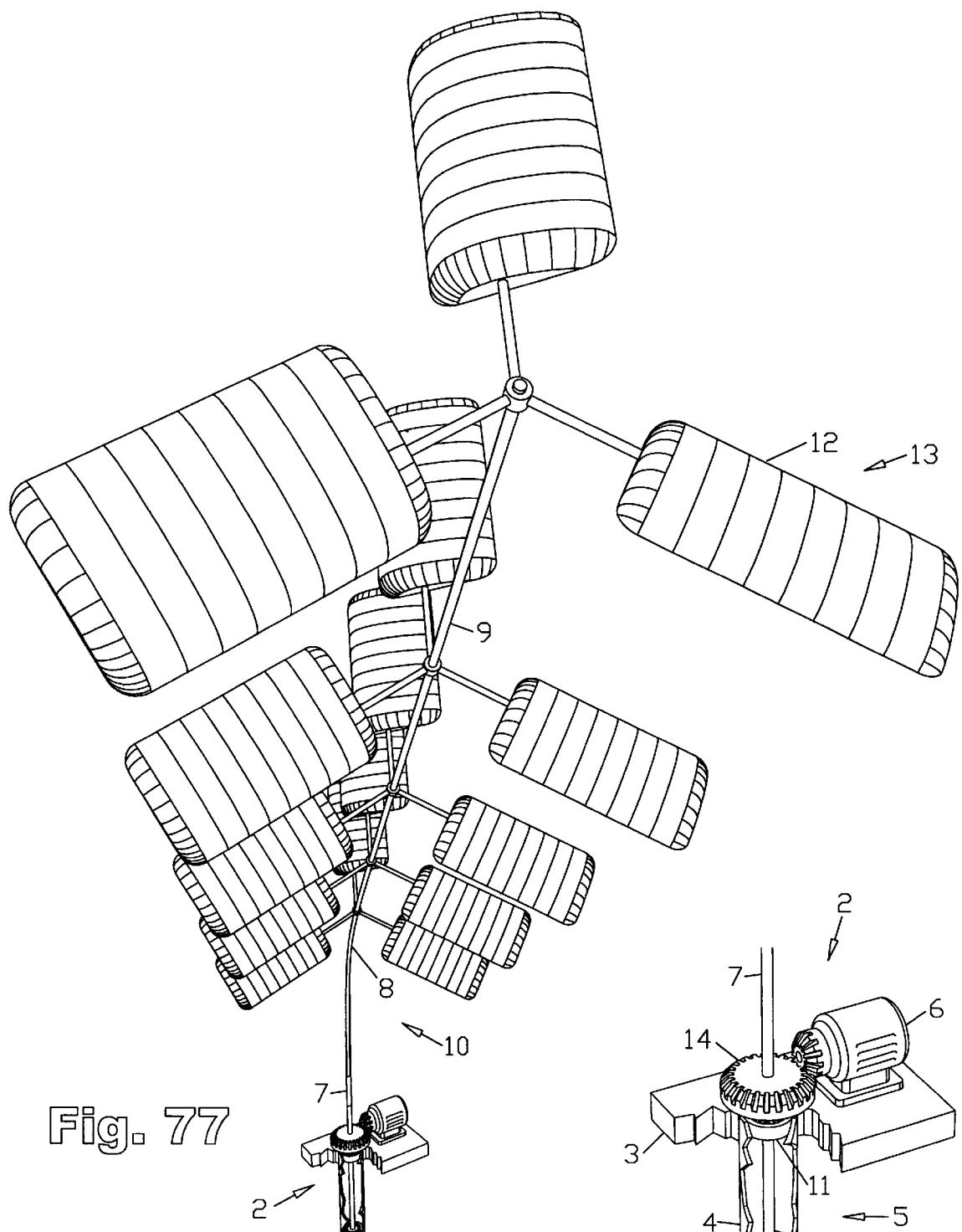

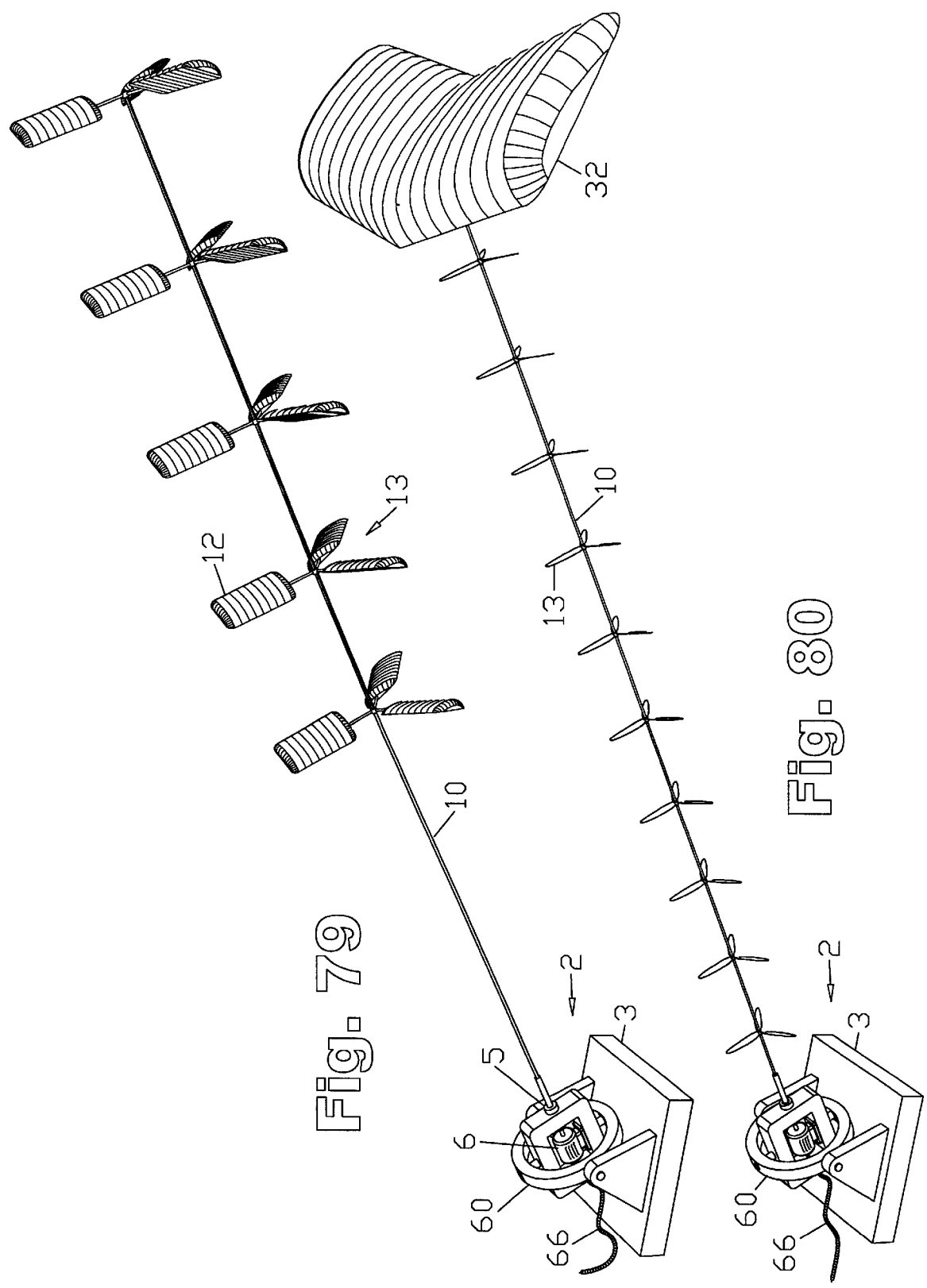

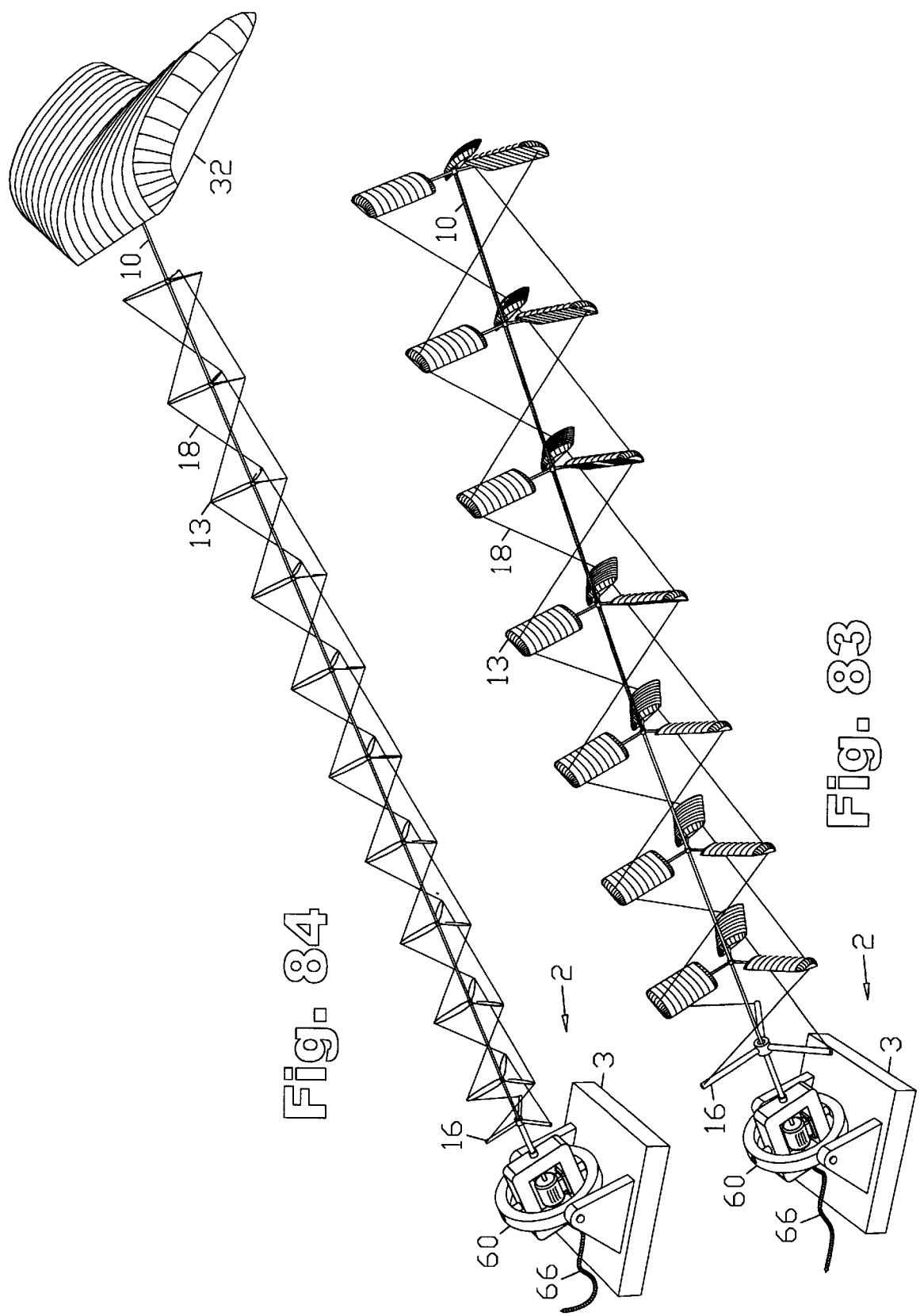

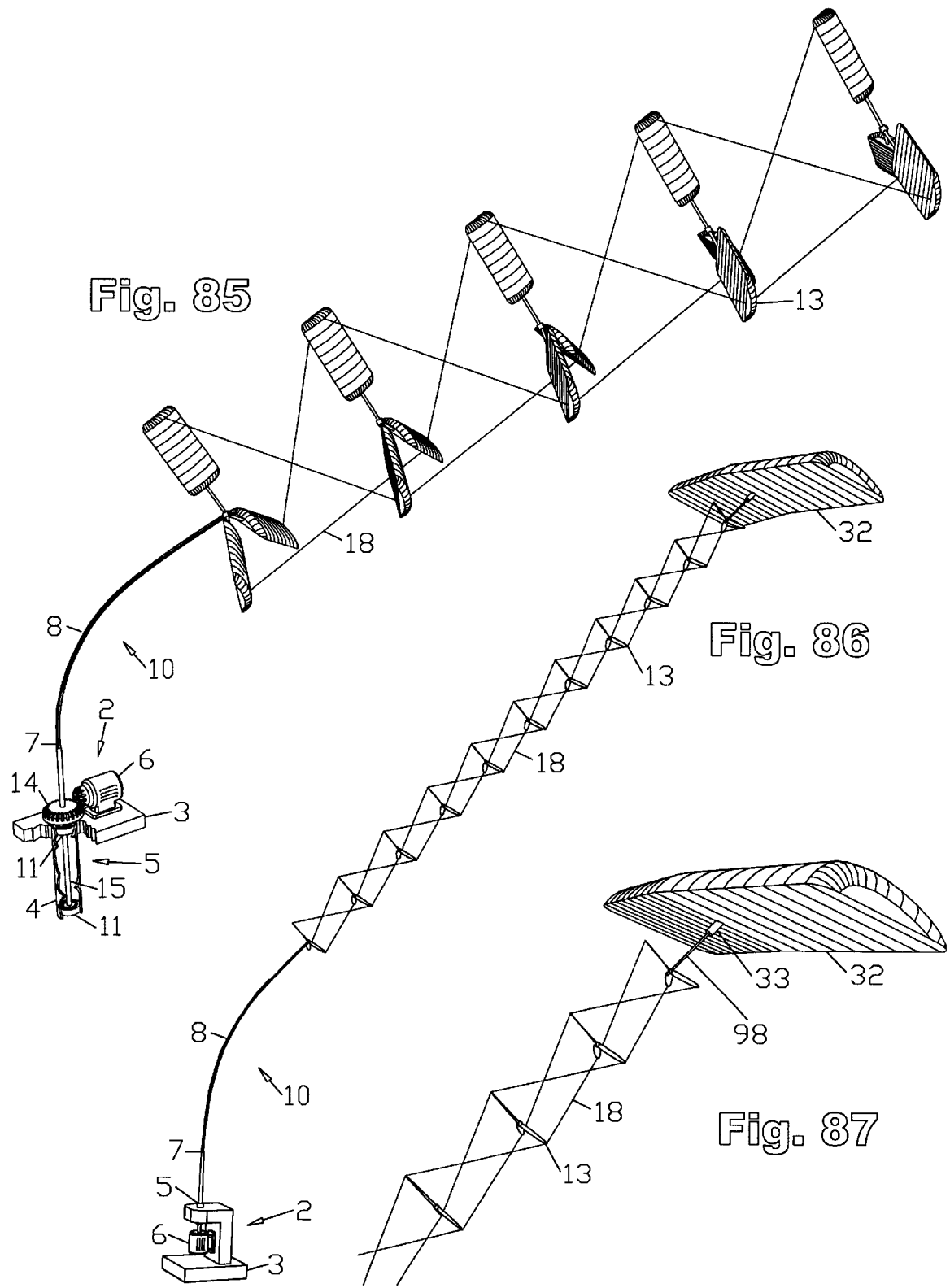

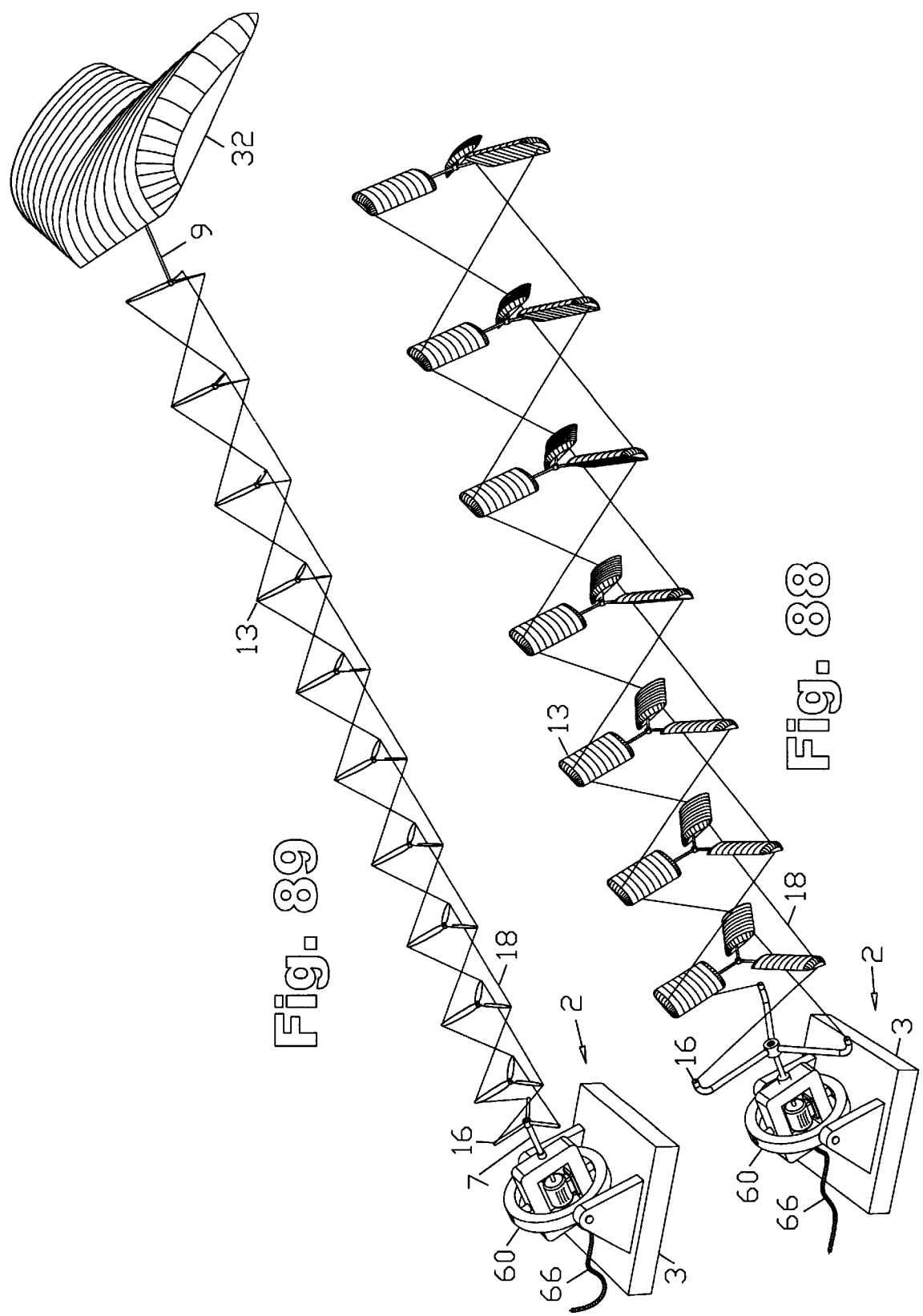

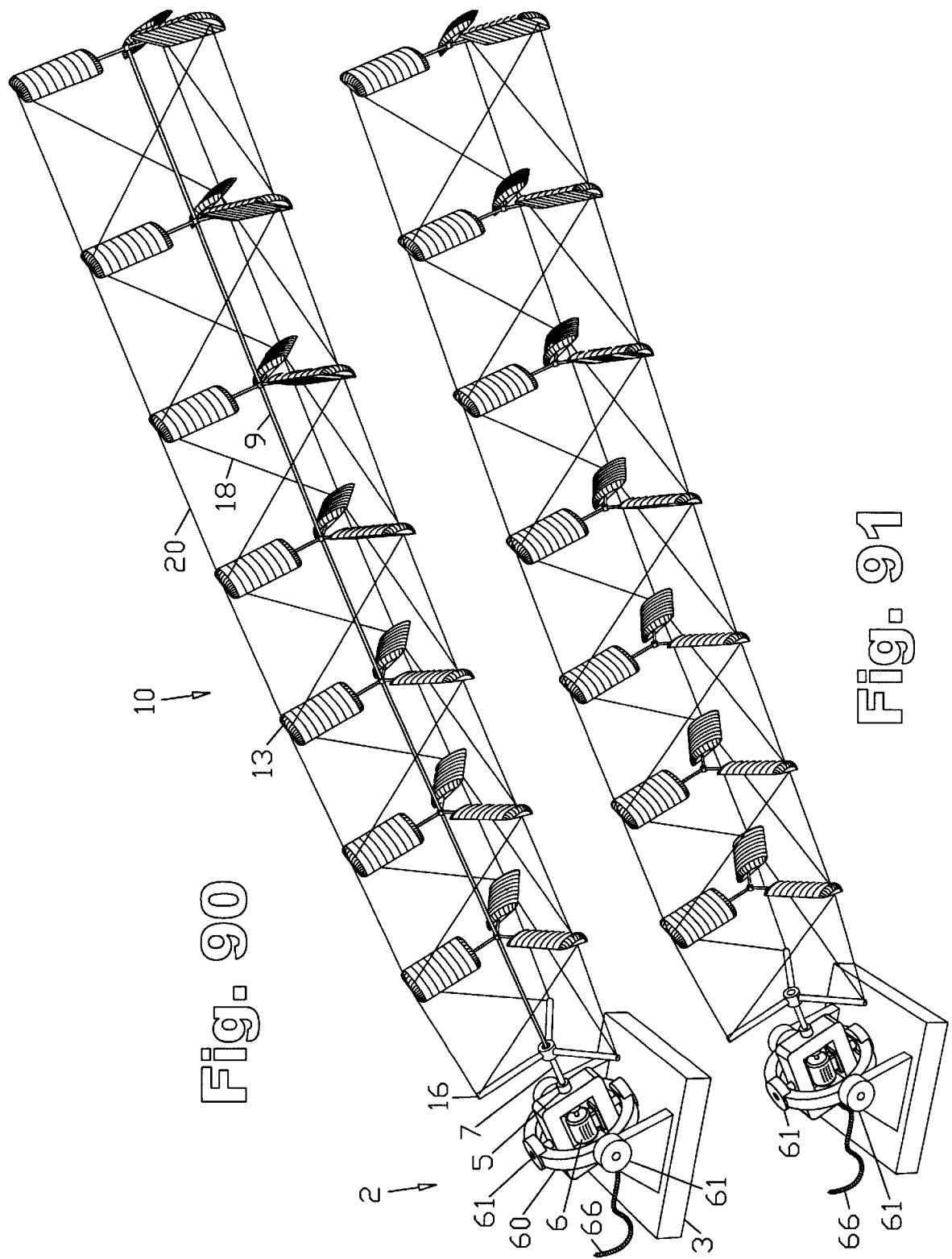

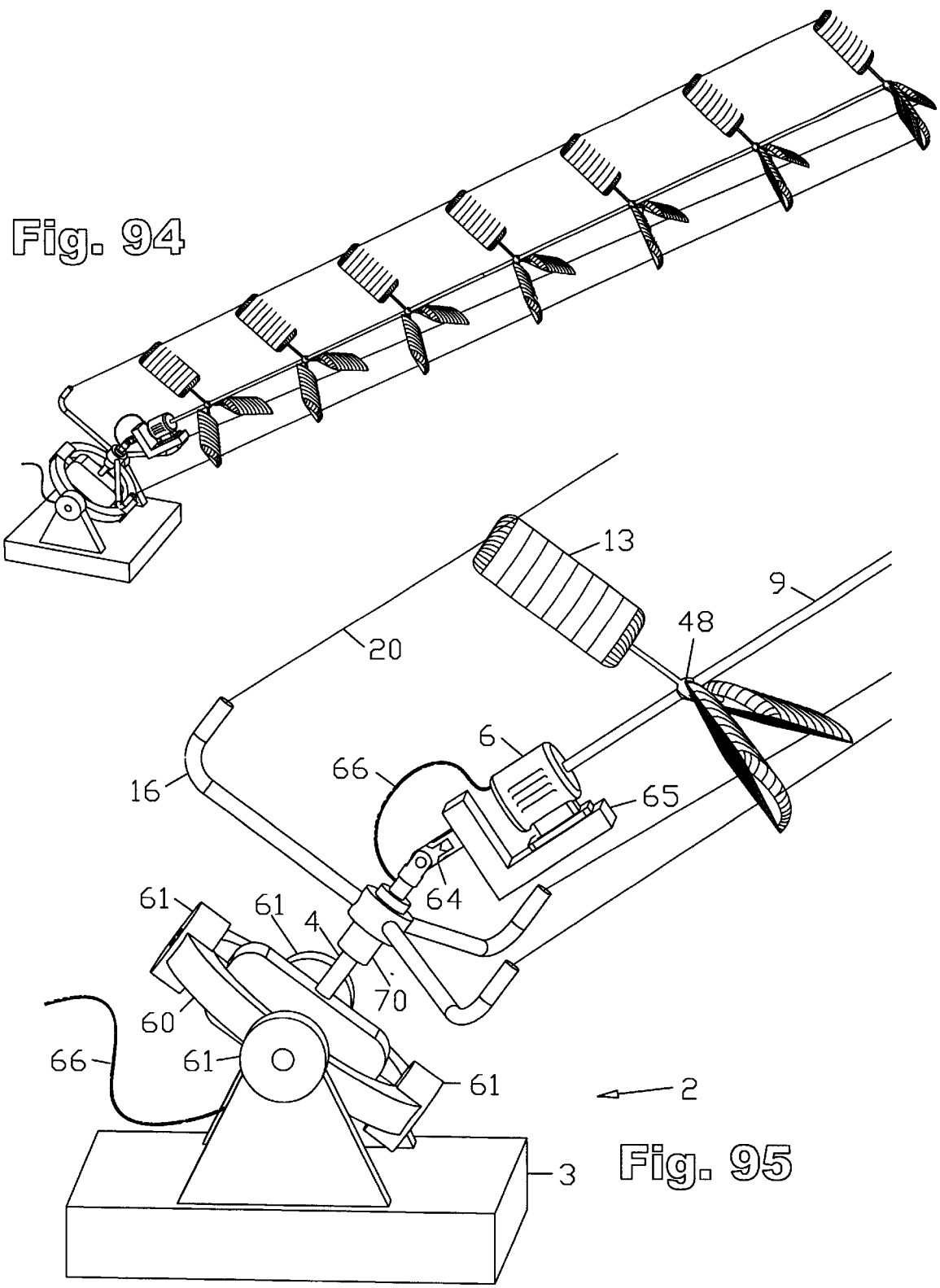

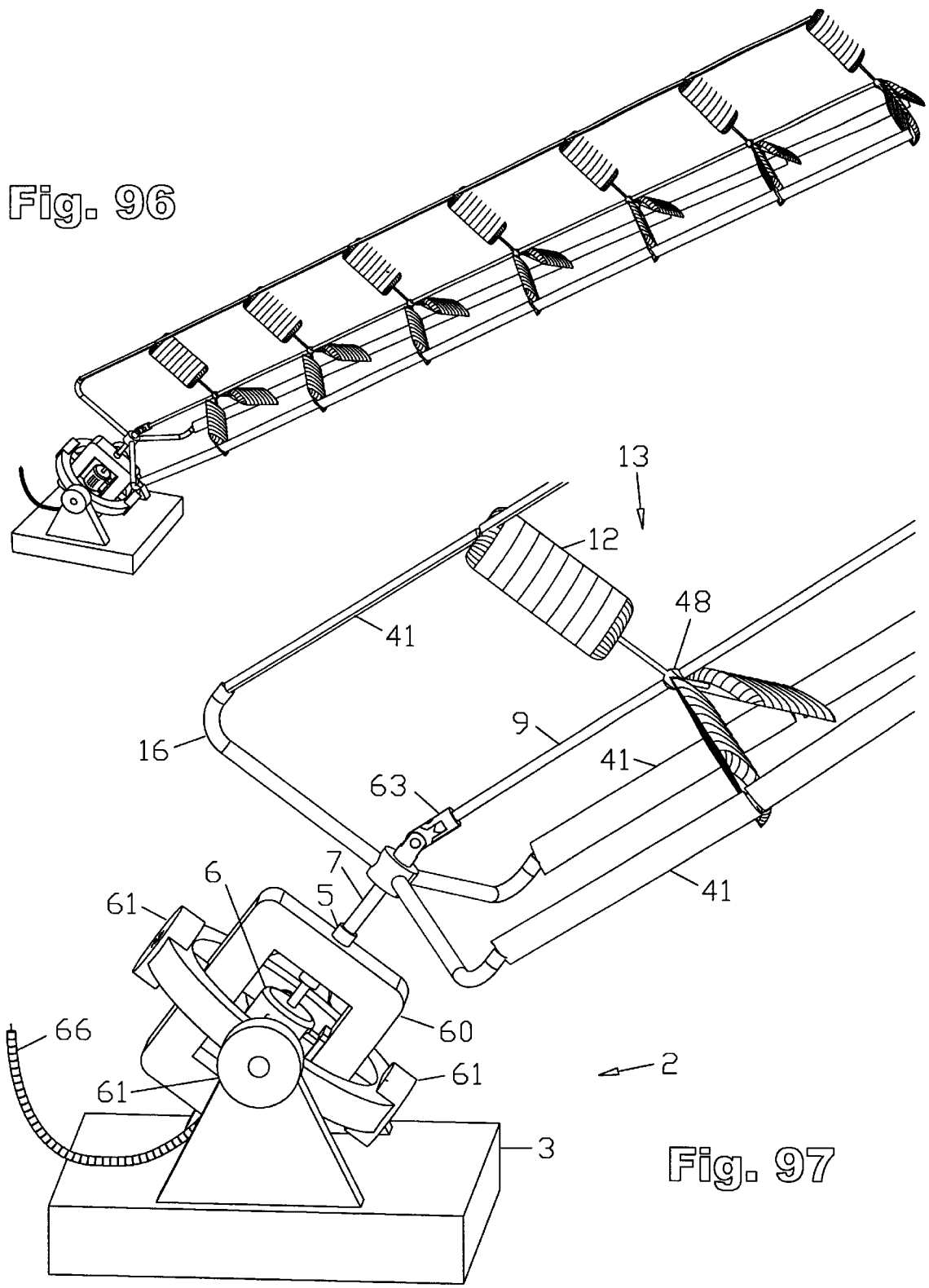

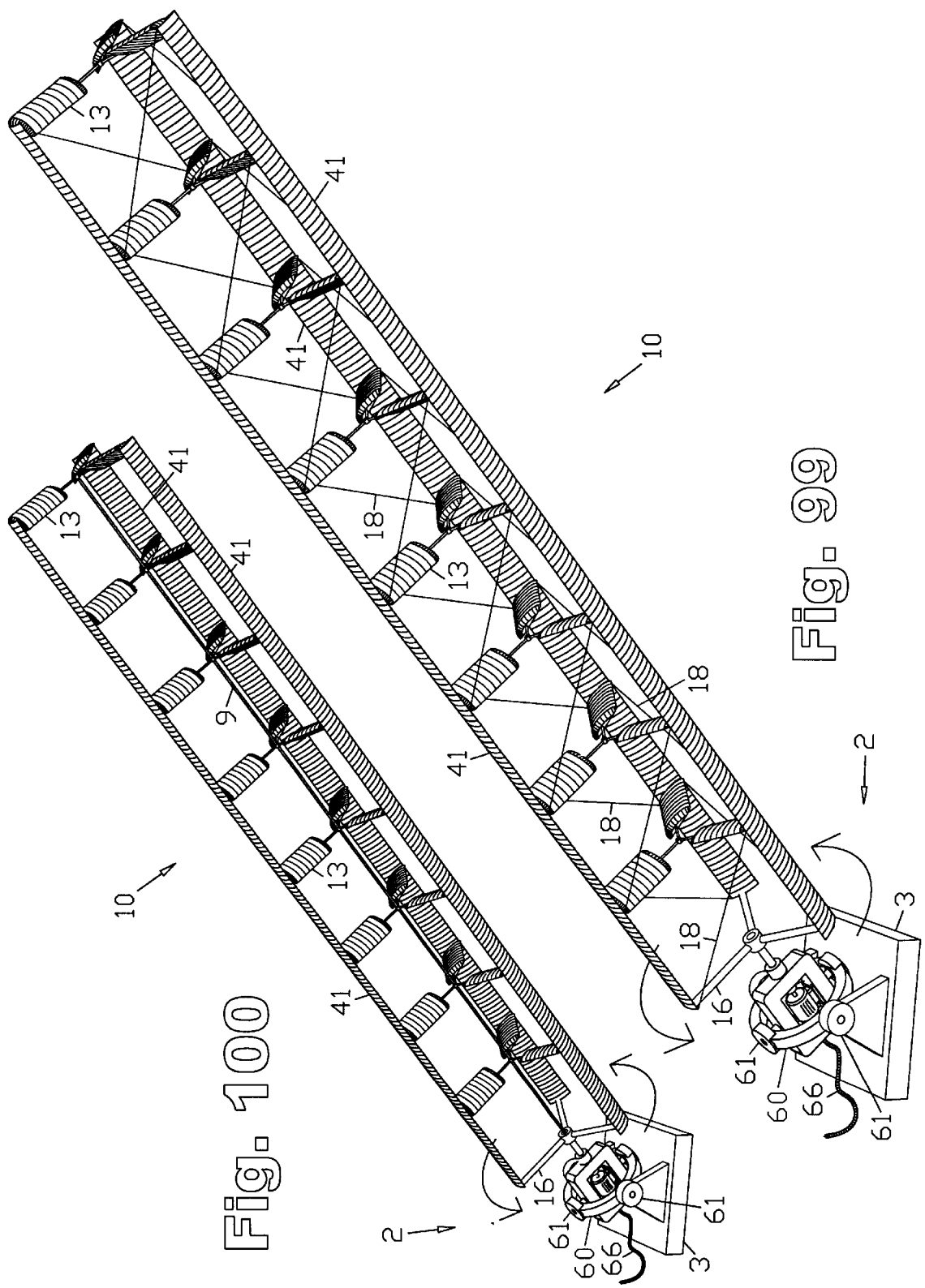

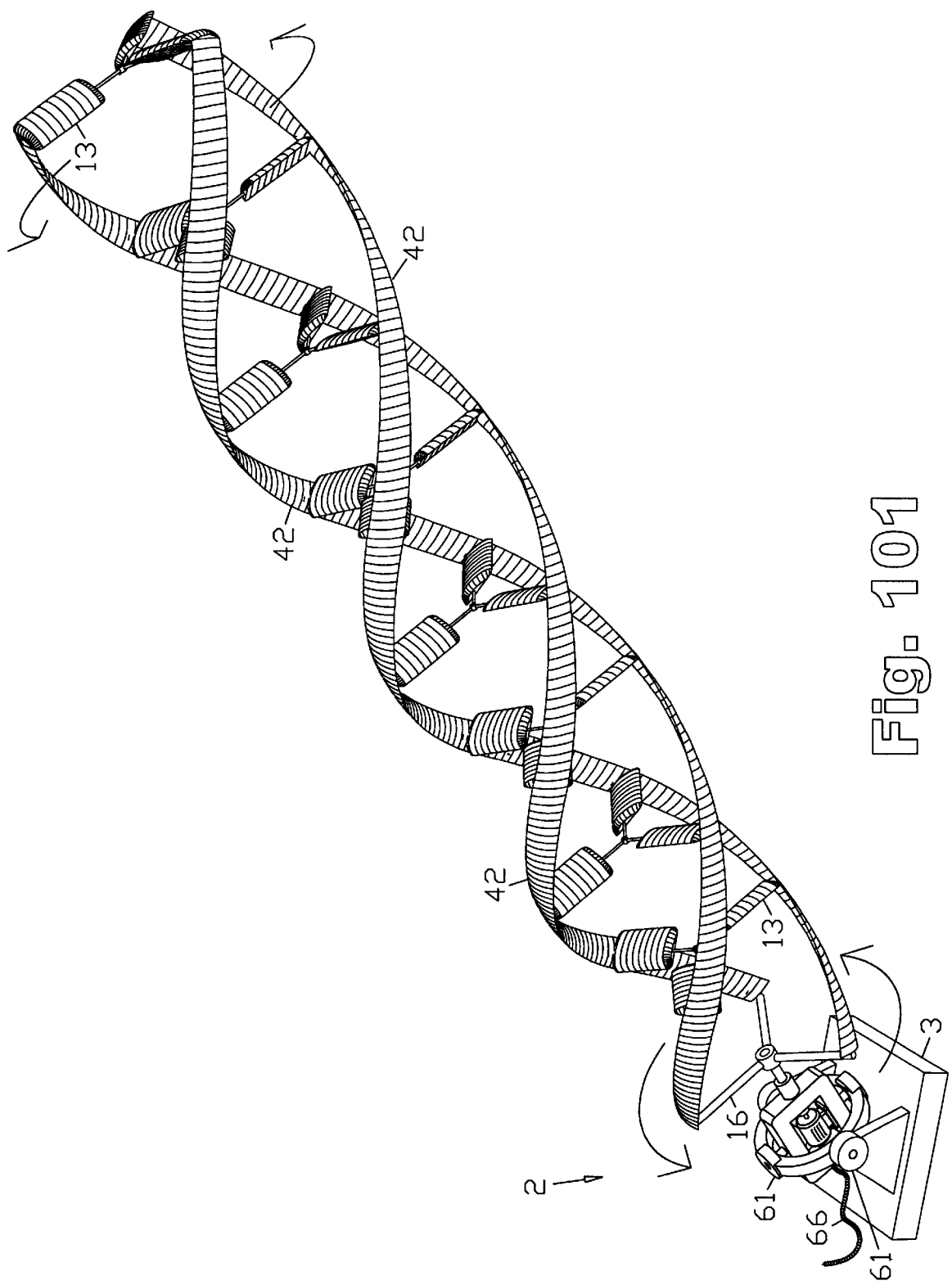

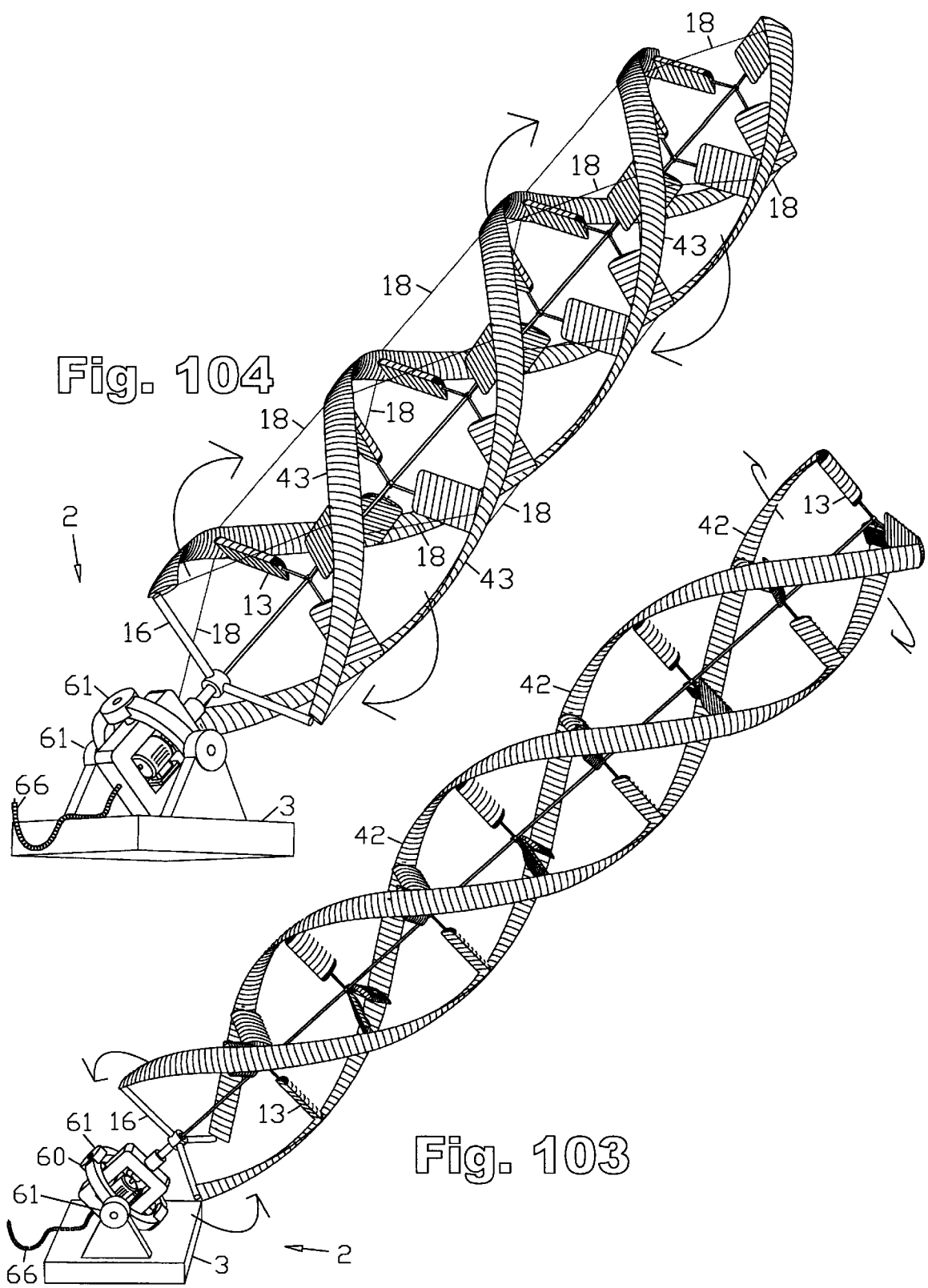

SERPENTINE WIND TURBINE

BACKGROUND

1. Field of the Invention

This invention relates generally to the field of extracting usable energy from a moving fluid, more particularly to windmills.

2. Prior Art

The basic design of windmills, whether for grinding grain, pumping water, or generating electricity, has not significantly changed in hundreds of years. A stationary vertical tower supports a single upwind horizontal-axis rotor, which may drive a load either directly, or, more usually, through a mechanical transmission. The traditional windmill tower is rigid, with many historical examples actually being made of stone. A single large rotor served well on these early machines, since a large rotor spins slowly with high torque, perfect for turning a stone to grind grain. The mass of such a large rotor, combined with the primitive state of technology of the day, precluded a serious consideration of a flexible tower.

Currently, the "single large rotor" design still prevails, despite the fact that today's electrical generators require a much higher rotational rate than yesterday's grindstone. Excessive bending deflection of the tower on these modern windmills is seen as sloppy, inefficient, and even dangerous. The axis of rotation of the rotor is perpendicular to the tower, so excessive bending of the tower would tend to reduce the incident angle of the wind on the disk of the rotor, reducing the effective swept area. With their hard mounting, the huge rotors and gargantuan machinery that supports them do not take kindly to being shaken about, due to stresses caused by inertial, vibrational, and coriolis type forces. The rigidity of the tower therefore protects the machinery from excessive wear or damage. Often, at the price of aesthetic clutter and reduced utility of the land below, guy wires are used to further stabilize the rigid tower. This basic prior art design has been slowly refined over the centuries, by improvements in tower construction, blade design, transmissions, materials science, control systems, etc. Current models, however, normally used for generating electricity, are still only barely feasible from an economic standpoint. The rigid, vertical tower is often the most expensive component of a wind turbine. Since wind velocity increases with height, and available power is proportional to the wind speed cubed, a taller tower will result in more power collected. Usually the rigid tower must be strong enough to support not only the huge rotor, but the driveshaft, generator, and associated gearbox as well, in addition to blade feathering mechanisms, yaw control apparatus for directional guidance, and associated electronics and auxiliary mechanisms, commonly weighing many tons. Access for maintenance personnel, such as an interior stairway or ladder, is often built-in. Erection and even maintenance of such an unwieldy wind energy conversion system often requires a crane and other expensive equipment, to lift the heavy machine components to and from the top of the tower. Deaths have resulted from accidents during these procedures.

The idea that the bending deflection which a tower is so naturally inclined to undergo could be embraced and utilized as advantageous, rather than avoided as a flaw, or minimized as an undesirable characteristic, has not yet found a place in modern windmill design. Despite a general feeling among many designers that there "must be a better way", alternatives to the "standard model" have thus far proven not to be cost-effective. Aside from the vertical axis designs, such as those of Darrieus, nobody is yet successfully thinking "out of the box" so to speak. Designers have been as yet unable to break away from the traditional, basic, medieval design. As we begin a new millenium, the stationary, rigid windmill tower, a veritable relic of the stone age, with its azimuthally adjustable cap, having a geared mechanism with a horizontal driveshaft, supporting a single large upwind rotor, as developed in the middle ages, yet persists.

Once the decision is made to erect such an expensive rigid tower, it becomes important to maximize the size and efficiency of the rotor so as to justify this high cost. The decision to use a single large rotor, rather than many small rotors, is based on a desire for simplicity, and economy of scale, but results in a whole new series of expenses: First, the circular area subtended by a spinning rotor is proportional to the diameter squared, while the rotor's actual volume (and hence its mass), is proportional to the diameter cubed. In other words, the larger the rotor, the less wind it can capture in relation to its mass. The significance of this cannot be overemphasized: The amount of wind available per unit rotor mass is inversely proportional to the rotor diameter. This means that a 10-meter rotor will capture 100 times as much wind as a 1-meter rotor, but will weigh 1000 times as much! So as its diameter has increased by an order of magnitude, its subtended wind collecting area per unit mass has decreased by an order of magnitude.

Of course, 100 of these smaller rotors would each require individual physical support at an effective height, as well as either 100 individual generators, or a mechanical means to combine the rotation of the individual rotors. In the current state of the art, the increased complexity and consequent higher manufacturing and maintenance costs, as well as possible aesthetic clutter of such a multi-rotor technology, have weighed in favor of designs using a single large rotor, despite the disproportionately higher mass. The huge, multi-ton rotors employed must be carefully designed to maximize aerodynamic efficiency, with complex mechanisms both for feathering the blades and for orienting the rotor assembly (yaw control) according to prevailing wind conditions. Balance and resonances must be closely controlled to minimize harmful vibration. Means for protecting the massive rotor from self-destruction in high winds, such as a feathering mechanism, are normally required. Also, the momentum and relative rigidity of a large, upwind rotor make it slow to accelerate, so the extra energy available in momentary or localized gusts is not fully utilized.

A downwind design is well known to avoid several of these disadvantages. Since the downwind blades are pushed away from the tower, rather than toward it, they are unlikely to contact it. A downwind design can therefore use lighter, more flexible blades, which can simply bend to avoid damage in higher winds. These lighter, more flexible blades can also take better advantage of momentary gusts, due to their resilience and ease of acceleration. Finally, a downwind design requires no yaw control mechanism, as it will tend to naturally orient itself in the proper direction. In the current state of the art, however, despite all of these advantages, downwind designs are not favored, due to:

A) the large wind-shadow of current state-of-the-art, thick, rigid, vertical towers. The wind-shadow reduces overall efficiency and can cause fatigue from stresses due to resonant vibrations induced by the repeated passage of the blades through the shadow. The upwind side of the tower is much less affected by wind-shadow.

B) the fact that the generator is often horizontally mounted at the top of the tower, and the electricity must be somehow transported to the ground; Over time, with no active yaw control, simple electrical cables are likely to eventually become twisted too far in one direction, so that slip rings must be used to transmit the electric power with rotational freedom. Slip rings add complexity, and are not well-suited to larger installations. Once active yaw control is deemed necessary, the downwind design has lost its main advantage of passive yaw control, so an upwind design makes more sense.

Vertical-axis machines, such as a Darrius or a Savonius, also avoid many problems of single-rotor, upwind designs. For one, the aforementioned yaw control problem is nonexistent, since vertical axis turbines work equally well no matter what the direction of the wind. Also, the generator may be located at ground level, greatly reducing both the required tower strength and maintenance costs. While these advantages inherent in today's vertical-axis machines are certainly extremely desirable, they are outweighed by technical drawbacks.

The Darrieus type, for example, is not self-starting, and once started, does not collect as much energy, as smoothly, as an equivalent sized horizontal-axis rotor. Since its blades project upward it is perceived as "not needing a tower" and so is usually installed close to ground level. Such an installation may suffer from a large discrepancy in wind velocity between the tops and bottoms of its blades, since wind at ground level is markedly slowed by friction. And in actuality, of course, the tops of the blades must be supported by something, which normally turns out to be a rigid vertical tower of sorts, even if it turns with the blades. This tower, while not supporting a generator, must still be quite strong and substantially rigid to withstand the horizontal wind forces acting upon the blades without distorting. As with a horizontal axis rotor, the area subtended by a Darrieus type rotor is proportional to the diameter squared, while blade mass increases with the diameter cubed, so that larger rotors can collect less wind per unit mass. Again, available power per unit rotor mass is inversely proportional to rotor size. A heavier rotor needs a stronger tower and stronger bearings. Often, guy wires are used in an effort to satisfy this requirement for tower strength. Guy wires can require an additional bearing at the top of the rotor, produce visual clutter, and reduce the agricultural or other viability of the land below.

A Savonius turbine has some of the advantages of the Darrius, being omnidirectional, and is self-starting, but unfortunately a Savonius is very inefficient. Combining the two vertical-axis machines, with a Darrieus stacked atop a Savonius, serves to elevate the Darrieus, and this combination is self-starting. Unfortunately, even this improved combination still swings a large, slow rotor, requiring a transmission to drive a faster-spinning generator, and utilizes a rigid, vertical tower at its core, with its inherent high cost. The most efficient use of such an expensive, rigid tower, in the current state of the art, is still an upwind, horizontal axis machine.

For a given wind speed, the blade tip speed for any size rotor is about the same, hence, the angular rate of rotation is inversely proportional to rotor diameter. For a given amount of driveshaft power, torque is inversely proportional to rotation rate. Consequently a large rotor will turn a shaft at low rotational speed, but with high torque. This slow rotation rate and consequent high torque of such a large rotor mandate the use of heavy-duty driveshafts and ratio gearing mechanisms in order to transmit the power to a faster-rotating generator. Contemporary generators must turn many times faster than today's large rotors in order to efficiently generate power. The gearbox required to achieve this increased rotational rate represents about 20% of the cost of current systems.

The rotor, driveshaft, transmission, generator, and associated equipment must then, as a unit, be provided with means for powered yaw control, (directional rotation about the vertical axis) to maintain proper aim into the wind. The weight of all this heavy-duty hardware must be supported by the rigid tower, further adding to the strength required of the tower, and its consequent cost. The rigid, vertical towers in modern wind generation systems consume about another 20% of total system cost. As you can see, current windmill designs result in a self-reinforcing cascade of upwardly spiraling costs. This cascade of cost begins with the decision to utilize a rigid, vertical tower. It is interesting to note that for centuries, we have taken wood from trees that readily bend with the wind, to build windmills that don't. More than one engineer has been frustrated that their best attempts to harness the light and fleet wind result in clanking, complicated, multi-ton monstrosities that literally shake themselves apart. There is a strong feeling among researchers that there must be some easier, more simple and cost-effective way to harness wind energy, if only we could find it. The challenge to wind energy development for the new millenium is to meet the wind on its own terms using the stronger, and more flexible materials now available.

BRIEF SUMMARY OF THE INVENTION

The present invention discloses a simple way to achieve the mechanical linkage of a multiplicity of rotors, combined with a way to resiliently support the rotors at an effective operational height, combined with a way to automatically orient the rotors, combined with a way to mechanically transmit the power of the rotors to the ground, and finally, even generate electricity, using as few as one single moving part.

The windmill of the present invention puts the natural flexibility of a tower to good use, rather than attempting to make the tower rigid. This tower doubles as a high rotational speed, low-torque, flexible driveshaft. Rather than supporting one large, heavy, slowly spinning rotor, our flexible, spinning tower supports multiple, small, lightweight, rapidly rotating rotors, attached coaxially at intervals along its length. Since multiple small rotors weigh much less than a large rotor of equivalent area, and tower flexure is permitted, the tower can be of much lighter duty construction than current designs permit. Further, the generator or other load, and associated hardware, are located at the base of this tower/driveshaft. The flexible tower/driveshaft therefore supports only itself and the attached rotors, further reducing its required strength.

At its base, the rotating tower/driveshaft projects substantially upward, to achieve distance from the ground. This lower section may be provided with vertical axis type blades. Higher up, the tower/driveshaft begins to bend with the direction of the wind flow. With increasing distance from its base, the tower/driveshaft becomes increasingly bent over, becoming more driveshaft, and less tower. At some height, the tower/driveshaft becomes sufficiently parallel to the wind for any coaxially attached horizontal axis rotors to effectively harness the wind, and thereby contribute toward its rotation. Multiple horizontal axis type rotors are therefore attached at spaced intervals to this upper section.

Depending on their angle of tilt, certain of the rotors may generate some lift, in the fashion of a kite. Still further from the base, the planes of rotation of the coaxially attached, horizontal axis-type rotors become increasingly perpendicular to the wind direction, and along this upper section, the flexible tower/driveshaft may be blown into a completely horizontal orientation. Toward its extreme distal end, the tower/driveshaft may even point downward, depending on conditions. Such a downward hanging section may advantageously be provided with vertical axis type blades. In addition to its simple rotation, due to its resilience, the tower/driveshaft may conditionally undertake swinging, waving, serpentine, or corkscrew types of motion, or combinations thereof, which add to the effective wind-collection area swept by the windmill.

The flexibility of the rotating tower/driveshaft naturally results in a passive downwind orientation for the rotors. The flexible tower/driveshaft smoothly converts the rotation of the substantially horizontal-axis-type rotors, as well as that of any attached vertical-axis-type rotors, whatever the wind direction, into a uniform, reliable, substantially vertical-axis rotation at the base. The high rotational rate reduces or eliminates the need for a gearbox. If a gearbox is used, it can be lighter-duty because of the lower torque requirements of a faster-spinning shaft. The motion of the flexible tower/driveshaft is stabilized to some extent by the gyroscopic action of the individual rotors spaced along its length. The result is a much lighter, simpler, and more cost-efficient windmill. Lashing between the horizontal axis type blades may be added to help transmit torque downward, or the vertical axis blades may be extended upward and serve as lashing. If sufficiently strong, the presence of vertical axis type blades may even make a central shaft unnecessary. And the vertical axis type blades need not be exactly parallel to the axis of the tower as a whole, but may wrap around it helically, or even comprise a geometric latticework formed into a generally cylindrical shape. The tower/driveshaft and attached rotors is supported against the pull of gravity and the force of the wind by the stiffness of the rotating tower/driveshaft tower itself, as supported by a cantilevered bearing means at the base. Guy wires may also be used. Additionally, vertical support may be provided by natural buoyancy, by aerodynamic lifting forces, or a combination thereof. In embodiments having a directionally compliant base, these additional means of vertical support may predominate, reducing the radial loading on the cantilevered bearing means at the base.

Objects and Advantages:

Object: To harness energy from the wind in an environmentally and aesthetically acceptable manner at the least cost.

Advantages:
1. It's a downwind machine: Utilizing the natural effect of passive downwind orientation, the present invention harnesses wind equally well from any direction, eliminating the need for active directional (yaw) control apparatus, mechanisms, software, and associated wind-direction sensors.
2. As with a purely vertical-axis machine, the generator or other load, and all associated hardware, is located at the base of the tower, greatly reducing the strength required of the tower, as well as simplifying maintenance procedures, especially if the generator must be rebuilt or replaced.
3. The elimination of the requirement that the tower be absolutely rigid further reduces the required strength of the tower. Taking a lesson from nature, we note that trees are not completely rigid; we therefore let the tower do exactly what it wants to do in the wind: bend. The tower in turn rewards us by allowing lighter construction.
4. The torque required to transmit a given amount of power through a driveshaft is inversely proportional to the rate of rotation. Since small rotors spin faster than large ones, multiple small coaxial rotors can provide the same power as a single large rotor through a less substantial driveshaft, spinning at a higher rotational rate. Therefore, the use of smaller, multiple rotors further reduces the strength required of our tower/driveshaft.
5. The circular area subtended by a spinning rotor is proportional to its diameter squared, while the rotor's actual volume (and hence its mass), is proportional to its diameter cubed. In other words, the larger the rotor, the less wind it can capture in relation to its mass. Significantly, the amount of wind available per unit rotor mass is therefore inversely proportional to the rotor diameter. This means that a 10-meter rotor will capture 100 times as much wind as a 1-meter rotor, but will weigh 1000 times as much! From this standpoint, a multiplicity of smaller rotors is lighter for the same amount of wind captured, and therefore makes better use of materials than a single larger rotor. This dramatic savings in weight even further reduces the required tower strength.
6. The fact that each rotor is comparatively small and, to some extent, a free-floating body reduces the need for a perfectly balanced rotor; small perturbations in rotation are easily absorbed along the length of the flexible tower/driveshaft. This reduces the expense of the rotors.
7. The redundancy of multiple coaxial rotors means that maximizing efficiency of any single rotor is not as paramount as in a single-rotor design; available wind energy missed by one rotor will likely be harnessed by a subsequent rotor. This also reduces the cost of the rotors.
8. In addition to simple rotation, a windmill of the present invention will often assume a swinging, waving, serpentine, or corkscrew motion. Such a trajectory sweeps the rotors through a larger area of wind than a statically rotating configuration, reducing the wind-shadow effect from one rotor to the next, thereby harnessing more total wind energy than might otherwise be expected.
9. The faster rotational speed of our driveshaft eliminates or reduces the need for a gearbox to translate slow shaft rotation to a faster generator rotation. If such a gearbox is needed, it can be lighter-duty, since at higher rotational speeds, less torque is involved.
10. The simplicity and redundancy of the present invention will reduce design, manufacturing, installation, and maintenance costs; like purely vertical-axis machines, theoretically, simple versions of this new design could require only "one moving part".
11. The wind-shadow effect can actually be beneficial by protecting the windmill from damage in unusually high winds; Wind-shadows lengthen with the increased Reynolds numbers encountered at higher wind speeds. Also, as wind speed increases, the tower/driveshaft is increasingly bent over toward a horizontal position. These effects increase the wind-shadow effect from one rotor to the next in higher winds, protecting against destructively fast rotation.
12. As with other downwind machines, the rotors are unlikely to contact the tower/driveshaft, and so may be made light and flexible enough to bend with extremely strong winds, avoiding damage while decreasing costs.

13. This same light flexibility allows each blade to more fully respond to instantaneous localized gusts.

14. The tower/driveshaft is also rotationally flexible along its length, to some extent. This allows an entire rotor, or a series thereof, encountering a sudden gust to quickly accelerate. The extra energy is first absorbed by the local rotational flexibility of the tower/driveshaft, then transmitted down the length of the shaft by its resilience. This overcomes a well-recognized problem with larger, stiff, heavy rotors: due to their relative rigidity and high momentum, the energy of a localized gust cannot be efficiently harvested; The blades can't speed up fast enough to take full advantage of the extra energy in the momentary gust before it is too late and the gust has passed. Since available power is proportional to wind velocity cubed, this can represent significant amounts of wasted energy.

15. An aesthetic improvement: The windmill of the present invention answers the question: "If Nature could somehow build, or grow, a windmill, what might it look like?" As such, it has a very natural appearance. Especially in smaller versions, the blades appear as a blur, and the assembly resembles a tall tree, naturally bending with the wind. Green coloration may be used to augment this appearance.

Drawings in General:

FIG. 1 shows the first embodiment of a windmill of the present invention having three-bladed rotors, a gear-driven generator, and sub-surface bearing means, from an offset endwise downwind aerial view.

FIG. 2 illustrates a side view of the windmill of FIG. 1.

FIG. 3 is a closeup view of the base of the windmill of FIG. 1.

FIGS. 4–6 show alternative base configurations, similar to the base of FIGS. 1–3, described in the second through fourth embodiments.

FIG. 4 shows a base with a subsurface cantilevered bearing means and a directly driven inline load.

FIG. 5 shows an above surface base with the directly driven load below the cantilevered bearing means.

FIG. 6 shows an above surface base with the directly driven load within the cantilevered bearing means.

FIG. 7 is a side perspective view from an elevated position of the fifth embodiment, having a subsurface base with directly driven load, and two-bladed rotors.

FIG. 8 shows a closer view of the base of the fifth embodiment.

FIG. 9 shows the base of the sixth embodiment, an alternative version of the base of the previous, fifth embodiment.

FIG. 10 shows a closeup side view of part of the upper section of the tower/driveshaft of the fifth embodiment shown in FIG. 8.

FIG. 11 shows the seventh embodiment.

FIG. 12 shows the eighth embodiment.

FIG. 13 shows the ninth embodiment.

FIG. 14 shows a perspective side view of the tenth embodiment, a floating marine installation of a windmill of the present invention.

FIG. 15 shows a closeup view of the floating marine base of the tenth embodiment shown in FIG. 14.

FIG. 18 shows a perspective side view of the thirteenth embodiment, a sailboat powered by a windmill of the present invention.

FIG. 19 shows a closeup view of the simple marine drivetrain of the fourteenth embodiment.

FIG. 20 shows a closeup view of the wind/electric hybrid marine drivetrain of the fifteenth embodiment.

FIG. 21 shows a perspective side view of the sixteenth embodiment, a tower/driveshaft having a turntable base.

FIG. 22 shows a closeup perspective side view of the turntable base of the sixteenth embodiment.

FIG. 23 shows a perspective side view of the seventeenth embodiment, a tower/driveshaft having a directionally compliant base with bias toward vertical. (graphically represented by a simple coil spring)

FIG. 24 shows a closeup perspective side view of the directionally compliant base of the seventeenth embodiment. (graphically represented by a simple coil spring)

FIG. 25 shows a perspective side view of the eighteenth embodiment, having helical, torque transmitting lashing.

FIG. 26 shows a perspective side view of the nineteenth embodiment, having helical, and longitudinal lashing.

FIG. 27 shows a closeup view of part of the upper section of a tower driveshaft of the eighteenth embodiment, having helical lashing.

FIG. 28 shows a closeup view of part of the upper section of a tower driveshaft of the nineteenth embodiment, additionally having longitudinal lashing.

FIG. 29 shows a closeup view of part of the upper section of a tower driveshaft of the twentieth embodiment, additionally having reverse helical lashing.

FIG. 30 shows a closeup view of part of the upper section of a tower driveshaft of the twenty-first embodiment, additionally having circumferential lashing.

FIG. 31 shows a perspective side view of the twenty-second embodiment, having a latticework tower/driveshaft.

FIG. 32 shows a closeup perspective side view of the upper section of the latticework tower/driveshaft of the twenty-second embodiment.

FIG. 33 shows a perspective side view of the base of the twenty-second embodiment, having a latticework tower/driveshaft.

FIG. 36 shows an upper side perspective view of the windmill of the twenty-fifth embodiment, having a single horizontal axis type rotor.

FIG. 37 shows an upper side perspective view of the windmill of the twenty-sixth embodiment, having a vertical axis rotor, and a horizontal axis type rotor.

FIG. 38 shows an upper side perspective view of the windmill of the twenty-seventh embodiment, having multiple vertical axis rotors, and multiple horizontal axis type rotors FIG. 39 shows an upper side perspective view of the twenty-eighth embodiment, having multiple horizontal axis, and multiple vertical axis rotors, supported by guy wires.

FIG. 40 shows an upper side perspective view of the twenty-ninth embodiment, having multiple horizontal axis type rotors, and supported by guy wires.

FIG. 41 shows an upper side perspective view of the thirtieth embodiment, having a single horizontal axis type rotor, supported by guy wires.

FIG. 42 shows the thirty first embodiment—a wind farm of wind turbines of the twenty-eighth embodiment, interconnected through a shared grid of guy wires.

FIG. 43 shows an upwind side perspective view of a wind turbine of the thirty-second embodiment, having an elongate vertical axis rotor, and multiple horizontal axis type rotors.

FIG. 44 shows a closeup view of the upper end of the elongate vertical axis rotor of the thirty-second embodiment.

FIG. 45 shows an upwind side perspective view of a wind turbine of the thirty-third embodiment, having elongate vertical axis type rotor blades extending along the entire length of the tower/driveshaft, attached to the multiple horizontal axis type rotors.

FIG. 46 shows a closeup view of the tower/driveshaft of the thirty-third embodiment.

FIG. 47 shows an upwind side perspective view of a wind turbine of the thirty-fourth embodiment, having elongate vertical axis type rotor blades extending along the entire length of the tower/driveshaft, attached to the multiple horizontal axis type rotors, with no central shaft.

FIG. 48 shows a closeup view of the tower/driveshaft of the thirty-fourth embodiment.

FIG. 49 shows an upwind side perspective view of a wind turbine of the thirty-fifth embodiment, having elongate vertical axis type rotor blades extending along the entire length of the tower/driveshaft, attached to the multiple horizontal axis type rotors, with no central shaft, and helical lashing FIG. 50 shows a closeup view of the tower/driveshaft of the thirty-fifth embodiment.

FIG. 51 shows an upwind side view of the thirty-sixth embodiment, a windmill of the present invention mounted atop a building, having both vertical and horizontal axis type rotor blades, with a distal end hanging below the level of the base.

FIG. 52 is a closeup view of a section of the tower/driveshaft of the thirty-seventh embodiment, having helically wrapped vertical axis blades.

FIG. 53 is a closeup view of a section of the tower/driveshaft of the thirty-eighth embodiment, having reverse helically wrapped vertical axis blades.

FIG. 54 is a closeup view of a section of the tower/driveshaft of the thirty-ninth embodiment, having reverse helically wrapped vertical axis blades, and helical lashing.

FIG. 55 is a closeup view of a section of the tower/driveshaft of the fortieth embodiment, having vertical axis blades, helically wrapped, in both directions. (The forty-first embodiment is not specifically illustrated, but refers back to FIG. 55 also.)

FIG. 56 is a closeup view of a section of the tower/driveshaft of the forty-second embodiment, having helically wrapped vertical axis type blades, and longitudinal vertical axis blades.

FIG. 57 is a closeup view of a section of the tower/driveshaft of the forty-third embodiment, having reverse helically wrapped vertical axis type blades, helical torque transmitting lashing, and longitudinal vertical axis blades.

FIG. 58 is a closeup view of a section of the tower/driveshaft of the forty-fourth embodiment, having vertical axis type blades, helically wrapped in both directions, as well as continuous longitudinal vertical axis type blades.

FIG. 59 is a closeup view of a section of the tower/driveshaft of the forty-fifth embodiment, having vertical axis type blades, helically wrapped in both directions, as well as extending longitudinally, as in the previous embodiment, but with no central shaft.

FIG. 60 is a downwind side view of the forty-sixth embodiment, having a cylindrical lower section composed of a hexagonal array of aerodynamic struts comprising vertical axis type blades, and an upper section having horizontal axis type blades.

FIG. 61 is a closer view of the forty-sixth embodiment, where the lower section meets the middle section.

FIG. 62 is a closer view of the forty-sixth embodiment, where the lower section meets the base.

FIG. 63 is an even closer view of the forty-sixth embodiment, where the lower section meets the middle section. (The forty seventh embodiment is not illustrated, but refers back to FIGS. 60–63)

FIG. 64 shows an extreme closeup view of the forty-eighth embodiment, having a cylindrical lower section comprised of a triangular array of aerodynamic struts comprising vertical axis type blades, where the lower section meets the middle section.

FIG. 65 shows a closeup view of the forty-ninth embodiment, having a cantilevered tail.

FIG. 66 shows an upwind side perspective view of the windmill of the fiftieth embodiment, having multiple cantilevered tails.

FIG. 67 shows a closeup view of the upper section of the tower/driveshaft of the fifty-first embodiment, comprising a lifting body.

FIG. 68 shows an upwind side perspective view of the windmill of the fifty-second embodiment, having a lifting body and multiple cantilevered tails.

FIG. 69 is a closeup view of the upper section of the tower/driveshaft of the fifty-third embodiment, having cantilevered tails, cantilevered noses, pulled toward the base by a tension transmission means.

FIG. 70 is a perspective side view of the tower/driveshaft of the fifty-third embodiment, having cantilevered tails, and cantilevered noses, pulled toward the base by a tension transmission means.

FIG. 71 is a closeup view of the upper section of the tower/driveshaft of the fifty-fourth embodiment having a lifting body, cantilevered tails, and cantilevered noses, pulled toward the base by a tension transmission means.

FIG. 74 is an upwind side perspective view of the fifty-seventh embodiment, comprising multiple horizontal axis type rotors, and a buoyant lifting body.

FIG. 75 is a closeup view of the buoyant lifting body of the fifty-seventh embodiment.

FIG. 76 is an upwind side perspective view of the fifty-eighth embodiment, comprising multiple horizontal axis type rotors having buoyant blades.

FIG. 77 is a downwind perspective view from above, looking down the tower/driveshaft of the fifty-eighth embodiment.

FIG. 78 shows a closeup view of the base of the fifty-eighth embodiment.

FIG. 79 shows a downwind perspective side view of the fifty-ninth embodiment, having buoyant horizontal axis type rotors and a directionally compliant base.

FIG. 80 shows a downwind perspective side view of the sixtieth embodiment, having multiple horizontal axis type rotors, a buoyant lifting body, and a directionally compliant base.

FIG. 83 shows a downwind perspective side view of the sixty-second embodiment, having multiple horizontal axis type rotors having buoyant blades, and a directionally compliant base.

FIG. 84 shows a downwind perspective side view of the sixty-third embodiment, having multiple horizontal axis type rotors connected by helical torque transmitting lashing, a buoyant lifting body, and a directionally compliant base.

FIG. 85 is a side perspective view of the sixty-fourth embodiment, having buoyant horizontal axis type rotors, held by torque transmitting lashing, with no central shaft.

FIG. 86 shows an upwind side perspective view of the sixty-fifth embodiment, having a buoyant lifting body, and multiple horizontal axis type rotors suspended by torque transmitting lashing.

FIG. 87 shows a closeup view of the buoyant lifting body of the sixty-fifth embodiment.

FIG. 88 is a downwind side perspective view from above, of the sixty-sixth embodiment, having buoyant rotor blades tethered by torque transmitting lashing, and a directionally compliant base.

FIG. 89 is a downwind side perspective view from above, of the sixty-seventh embodiment, having a buoyant lifting body, multiple horizontal axis type rotors suspended by torque transmitting lashing, and a directionally compliant base.

FIG. 90 shows a downwind side perspective view from above of the sixty-eighth embodiment, having multiple horizontal axis type rotors with buoyant blades, helically wrapped torque transmitting lashing, elongate lashing, and a directionally compliant base with means for directional bias.

FIG. 91 shows a downwind side perspective view from above of the sixty-ninth embodiment, having multiple horizontal axis type rotors with buoyant blades, helically wrapped torque transmitting lashing, elongate lashing, a directionally compliant base with means for directional bias, and no central shaft.

FIG. 94 shows a downwind side perspective view from above, of the seventy-first embodiment, having rotors mounted on tilting hubs, steerable by elongate lashing, an armature, and a directionally compliant base with means for directional bias, further having the load coaxially mounted directly to the upper section of the tower/driveshaft.

FIG. 95 is a closeup view of the base of the seventy-first embodiment.

FIG. 96 shows a downwind side perspective view from above, of the seventy-second embodiment, having rotors mounted on tilting hubs, steerable by elongate vertical axis blades, an armature, and a directionally compliant base with means for directional bias.

FIG. 97 is a closeup view of the base of the seventy-second embodiment.

FIG. 99 is an aerial side perspective view of the seventy-fourth embodiment, having buoyant horizontal axis type rotors connected by buoyant, elongate vertical axis type blades, an armature, a directionally compliant base, and torque transmission lashing, with no central shaft.

FIG. 100 is an aerial side perspective view of the seventy-fifth embodiment, having buoyant horizontal axis type rotors connected by buoyant, elongate vertical axis type blades, an armature, a central shaft, and a directionally compliant base.

FIG. 101 is an aerial side perspective view of the seventy-sixth embodiment, having buoyant horizontal axis type rotors connected by buoyant, elongate vertical axis type blades, helically wrapped to transmit torque to an armature, and a directionally compliant base.

FIG. 103 is an aerial side perspective view of the seventy-eighth embodiment, having buoyant horizontal axis type rotors connected by buoyant, elongate vertical axis type blades, helically wrapped to transmit torque to an armature, a directionally compliant base, with the inclusion of the central shaft.

FIG. 104 shows an upwind side perspective view from below, of the seventy-ninth embodiment having buoyant horizontal axis type rotors connected by buoyant, elongate reverse helically wrapped vertical axis type blades, torque transmission lashing, and a directionally compliant base.

Figure 10:
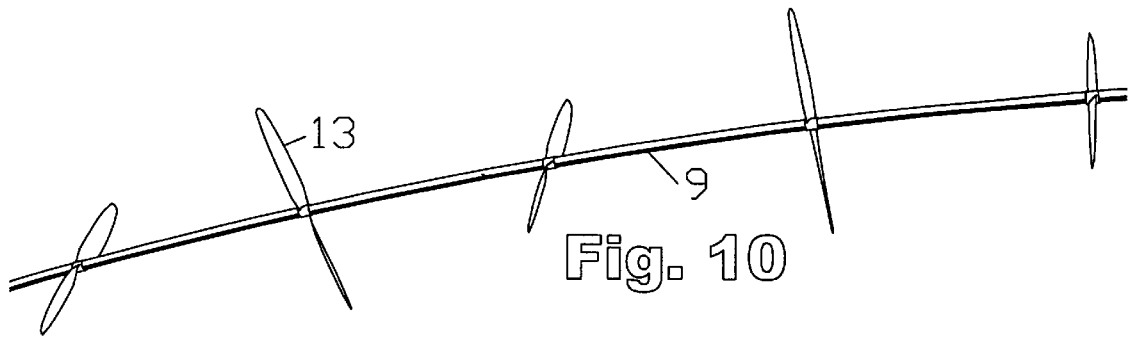
FIGS. 10–13 show closeup side views of part of the upper section of a tower/driveshaft illustrating alternative rotor blade configurations, applicable to many of the embodiments described herein.

Part Numbers in the Drawing Figures:
1. surface
2. base means
3. mounting means
4. bearing support means
5. cantilevered bearing means
6. load
7. lower section of tower/driveshaft
8. middle section of tower/driveshaft
9. upper section of tower/driveshaft
10. resilient tower/driveshaft
11. bearing means
12. horizontal axis type blade
13. horizontal axis type rotor
14. power takeoff means
15. axle
16. armature means 17. . . .
18. torque transmission helical lashing means (helically wraps around tower/driveshaft, from bottom to top, in direction of rotation, transmitting torque in tension.)
19. reverse helical lashing means (helically wraps around shaft top to bottom, in direction of rotation) (wraps in opposite direction of 18)
20. continuous longitudinal lashing means (substantially parallel to shaft)
21. latitudinal lashing means (substantially perpendicular to shaft)
22. cantilevered tail means
23. tail boom means
24. tail lifting surface means (horizontal stabilizer)
25. passive downwind tail orientation means (vertical stabilizer)
26. cantilevered boom rotational bearing means
27. . . .
28. cantilevered nose boom means
29. linear tension transmission means (shown as a cable)
30. tension adjustment means (shown as a winch)
31. lifting body
32. buoyant lifting body
33. suspension bearing means
34. . . .
35. azimuthal directional orientation means (shown as a turntable)
36. elevation angle control means
37. lifting means
38. pivot means
39. resilient, directionally flexible, non-rotating mounting interface (having a bias toward vertical) (shown as a simple spring)
40. longitudinally oriented, vertical axis type blade (substantially linear blade that operates on the general principle of a Darrieus type blade)
41. longitudinally oriented, vertical axis type blade that doubles as linear lashing or otherwise functions as linear structural means
42. vertical axis type (Darrieus type) blade that helically wraps around the structure, proceeding upward from the base end, in the direction of rotation, whereby it can also serve as helical diagonal lashing means, transmitting torque downward in tension
43. vertical axis type (Darrieus type) blade that wraps around the structure, proceeding from top to bottom, in a substantially helical manner, in the direction of rotation, that serves as helical diagonal structural means, transmitting torque downward in compression
44. vertical axis (Darrieus type) rotor
45. adjustable elevator surface
46. elevator actuating means
47. elevator control means
48. tilting hub
49. . . .
50. . . .
51. circumferentially oriented strut (perpendicular to tower/driveshaft)
52. cylindrical repeating geometric pattern of vertical axis type rotor blades (generally cylindrical continuous geometrical lattice comprising struts having an airfoil cross-section, disposed so as to function as Darrieus-type vertical-axis rotor blades.
53. open latticework structure comprising tower/driveshaft
54. a diagonal strut comprising part of a latticework structure
55. guy wire
56. upper bearing hub means for guy wires
57. horizontal guy wire between units
58. . . .
59. slack uptake means (elastic or resilient spring means)
60. non-rotating directionally compliant support means (gimbal mounting frame)
61. means for directional bias (usually toward vertical) (passive (spring) or powered)
62. steering means (rudder) (for embodiments featuring a boat)
63. directionally flexible rotational coupling means (universal joint)
64. directionally flexible non-rotating coupling means
65. non-rotating mount means for load (attached to non-rotating part of load, resists torque applied to load by rotating tower/driveshaft, so the load functions properly, rather than simply rotating as a whole)
66. continuous power conduit means (example shown is an electric cable)
67. ballast counterweight
68. buoyant upper section of axle (hollow tube, marine installation)
69. anchor means (shown as a simple chain)
70. armature rotational bearing means
71. power conversion unit
72. combination generator/reversible motor
73. first clutch means
74. second clutch means
75. underwater propeller driveshaft
76. underwater propeller driveshaft bearing means
77. underwater propeller
78. power storage means (shown as a bank of electrical batteries)
79. boat
80. building
81. brake means
82. transmission means including reverse gear . . .
98. downward hanging distal section of tower/driveshaft
99. distal end of tower/driveshaft Preferred Embodiments:

1. In the first embodiment, referring to FIGS. 1, 2, and 3, a rotating tower/driveshaft 10 comprising a resilient elongate structure, such as a flexible pole, that serves as both a tower and a driveshaft, extends substantially upward from a base means 2 located substantially at surface level. The base means 2, comprises a mounting means 3, a cantilevered bearing means 5, a power takeoff means 14, and a load 6. A closer cutaway view of such a base 2, as in FIG. 78, shows that the cantilevered bearing means 5 may comprise, for example, a substantially vertical axle 15, rotationally supported by two rotational bearing means 11, said bearing means 11 being located substantially proximate either end of said axle 15. Radial loads on the bearings can be substantially reduced by making the shaft 15 as long as is practical, thereby separating these bearings as far apart as is practical, so as to enhance their effective, combined leverage. The bearings are securely retained by a bearing support means 4, which in this case comprises an enclosing, rigid, vertical tube. Cantilevered bearing means 5, securely so attached to mounting means 3, supports the tower/driveshaft 10 in a manner that allows the tower/driveshaft to freely rotate about its own longitudinal axis. The structure of the base means, including the mounting means 3 and the cantilevered bearing means 5, is sufficiently robust to support the weight of the tower/driveshaft 10 and its attached rotors, in addition to the aerodynamic loads generated thereupon by the wind, as exerted through the leverage afforded by the length of the tower/driveshaft. The base means may be mounted at a surface in such a manner that the cantilevered bearing means 5 extends below the surface, to add stability while reducing surface clutter. The lower section 7 of the tower/driveshaft is coaxially coupled to, and rotatably supported by, the cantilevered bearing means 5, meaning that the tower/driveshaft is securely held, in both position and direction of projection, at its base, yet is free to rotate about its own longitudinal axis. This lower section 7 therefore emerges from the base substantially perpendicular to the surface, serving to achieve distance from the surface, so as to reach the higher speed winds found away from the surface, like the tower of a conventional windmill. With increasing height, the tower/driveshaft begins to bend in a progressively more downwind direction, due to both its own weight, the weight of its attached rotors, and the force of the wind. The middle section 8 of the tower/driveshaft serves both to achieve additional distance from the surface and, by its bending deflection, to transition toward a more horizontal direction of projection. The tower/driveshaft may vary in thickness along its length, or be otherwise tailored for a specific bending response. In this embodiment the tower/driveshaft is thickest at the base, tapering to a more narrow profile with increasing distance from the base, as does, for example, a fishing pole, becoming more constant in thickness toward its distal end 99.

A multiplicity of substantially horizontal axis type rotors 13 are coaxially attached at intervals to the upper section 9 of the tower/driveshaft. This upper section 9 begins at a point where the shaft becomes sufficiently parallel to the wind for these rotors to effectively contribute toward its rotation; As the tower/driveshaft is naturally bent over in a downwind direction, the rotors become oriented substantially perpendicular to the direction of wind flow. The wind then causes the rotors to spin. With increasingly rapid rotation, the disk swept by each rotor becomes more opaque to the wind, adding to its effective aerodynamic drag, and depending on its angle, providing lift, further influencing the bending behavior of the tower/driveshaft.

It is a classic blunder in wind turbine design to closely place one rotor directly in front of another, since the wind shadow of the upwind rotor renders the downwind rotor less effective, and the high pressure region in front of the downwind rotor even slightly reduces the amount of wind flowing through the upwind rotor, by causing back pressure, impairing its effectiveness as well. The present invention is to be distinguished from those which simply cluster multiple horizontal axis rotors on a single short horizontal driveshaft, stacked too closely for new air to enter the stream between rotors, in disregard of wind shadow effects. In the present invention, the rotors are placed far enough apart that undisturbed air from the surrounding airstream has some chance to dilute the wind shadow from one rotor before that air makes it to the next rotor. Also, most of the upper section 9 of the tower/driveshaft is not exactly horizontal, but rather at some slight angle to horizontal, so that each rotor is not exactly downwind from the preceding rotor, but offset either above or below, or even to the side, depending on how the shaft bends. The tilt of any rotor also fortunately acts to deflect its wind shadow away from the succeeding rotor. In addition, the entire upper section 9 of the serpentine tower/driveshaft may wave, swing, or otherwise actively bend, further exposing the affected rotors to a wider section of undisturbed airstream. Such a waving motion can also serve to raise the relative speed at which the air impinges upon the rotor blades. The gyroscopic effect of each rotor 13, however, tends to stabilize the shaft in the region where that rotor is attached. The aggregate stabilizing effect is quite significant, substantially reducing wild swings and gyrations of the shaft in gusty conditions, making for smoother power generation, reduced material fatigue and wear, and increasing safety. The net sum of the power contributed by all of the rotors turns the entire tower/driveshaft 10. The shaft rotates about its own axis, along its entire length.

The resulting collective power may be drawn off and utilized by a load 6 at the base end of the shaft. In this embodiment, the load 6 comprises an electrical generator, coupled to the shaft through a power takeoff means 14 as illustrated by the set of gears shown. Since this load 6 is not, as an entire unit, rotatably mounted, as is the load of conventional horizontal axis windmills, the power may be conveniently conducted away from the load 6 by a continuous power conduit means 66, which in this case comprises an electric cable. If the load were a pump or compressor, the continuous power conduit means would comprise a hose, pipe, or tube. Other suitable continuous power conduit means could include fiber optic cable, or a driveshaft, chain, belt, or other mechanical means. This new horizontal axis type wind turbine therefore has two huge advantages previously reserved for vertical axis windmills:

1. that of having a stationary load at ground level, which is clearly a distinct improvement over prior art horizontal axis windmills. Since the load need not revolve to follow the direction of the wind, no slip rings are needed to remove electrical power from the installation. Since the load need not be supported by the tower, the tower can be dramatically less robust, therefore lighter and less expensive. Installation and periodic maintenance of the load is safer and less complicated at ground level.
2. that of responding equally well to wind from any direction, with no need for an active yaw control mechanism, since this downwind machine is naturally self-aiming, inherently comprising passive downwind orientation behavior, and therefore inherently comprising passive downwind orientation means.

Such a load 6 may also be directly driven by the rotating tower/driveshaft, as in FIGS. 4, 5, and 6. Whether the load is directly or indirectly driven, the advantages over prior art horizontal axis turbines therefore include, but are not limited to:

that such a simple conduit means as a cable or hose is sufficient to remove power from this self-orienting, downwind machine, with no slip rings nor active yaw control being necessary, and;

that the tower can be made less robust since it need support only itself and the attached rotors, and not the generator and yaw control apparatus;

that the tower can be made still less robust, since it is free to bend, and;

that a multiplicity of small rotors weigh less than a single, similar, larger rotor, while subtending the same area, therefore harvesting the same amount of wind with less total rotor mass, further allowing an even less robust tower;

that these smaller rotors turn faster than a larger one, requiring a less robust driveshaft for the same power delivered;

that this faster-spinning, less robust driveshaft requires less robust bearings to support it;

that this faster-spinning, less robust driveshaft requires a less robust gearbox, if any, to handle the lower torque of this faster-spinning, less robust shaft, that this increased rotational rate reduces the amount of, or even eliminates the need for, ratio gearing needed to raise the rotation speed of the shaft up to a speed that is suitable for driving a generator; since it already turns faster due to the smaller rotor diameter. It is well known in windmill design that turbines having smaller diameter rotors can often effectively drive an alternator with no gearbox, due to the high rotation rate of a smaller rotor, for a given wind speed.

With the gearbox eliminated, as in the next embodiment, a wind turbine of this general design, with all of its diverse functions and advantages, can comprise as few as one single, flexible, rotating, moving part. Such a turbine is ideal for atmospheric use, but a turbine of this general design may also be driven by another moving fluid, such as, for example, an ocean current.

2. In FIG. 4, an alternate base 2 is shown. The load 6 is directly driven, securely mounted to mounting means 3, directly in line with the lower section 7 of the tower/driveshaft, above the cantilevered bearing means 5. As in the base of the first embodiment, the cantilevered bearing means 5 extends below the surface, and the fluent power may be transmitted from the load, here a generator, via continuous power conduit means 66, here comprising a simple electric cable. Having no gearbox, this wind turbine comprises but a single, flexible, rotating, moving part.

3. In FIG. 5, the entire base means 2 is ideal for being installed above a surface. As in the previous embodiments, the cantilevered bearing means 5 and the load 6 are both mounted to mounting means 3. The load 6 is coaxial with, and directly below, the cantilevered bearing means 5, and is directly driven by axle 15.

4. In FIG. 6, the cantilevered bearing means 5 comprises two rotational bearing means 11 disposed at opposite ends of a shaft 15. The load 6 is located between the bearings, above one and below the other, directly driven by the shaft. All components are secured by mounting means 3 in an above-surface, vertically stacked, coaxial configuration. Increasing the distance between the bearings 11 reduces the radial loading upon them.

5. FIGS. 7, 8 and 10 show a version of the present invention having a base 2 designed for subsurface installation, having two-bladed rotors, and a directly driven load 6, also located below the surface, within the rigid cylindrical housing provided by bearing support means 4. Referring to FIG. 8, cantilevered bearing means 5 comprises two rotational bearing means 11, separated by an axle 15, which is rotatably retained by the bearings. Load 6 is directly driven by axle 15, being coaxially coupled thereto, and is located below cantilevered bearing means 5. The power may be conveniently drawn off by means of continuous power conduit means 66, which in this case comprises an electric cable, since the load comprises an electric generator. Referring to FIG. 10, Each horizontal-axis-type rotor 13 has two blades, and is offset by 90 degrees from the previous rotor. Other numbers of blades per rotor, or amounts of angular offset, are also to be considered within the scope of the present invention.

6. FIG. 9 shows an alternative subsurface base means similar to that of the fifth embodiment, in FIG. 8, except that the load 6 is disposed between the two rotational bearing means 11, as opposed to below them, taking up less overall space while maintaining the distance between the bearings 11. This particular base configuration was chosen for the sake of example only, to illustrate the wide variety of types of bases possible, within the overall scope of the invention, and need not necessarily be specifically associated with any particular rotor configuration.

Figure 11:
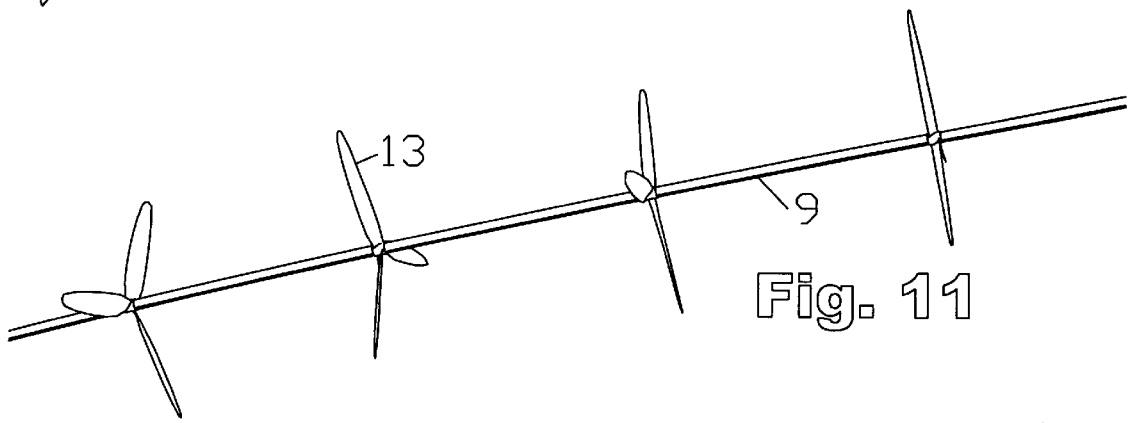

7. FIG. 11 presents an alternative rotor blade configuration: three-bladed horizontal axis type rotors 13, sequentially offset by 60 degrees. (Due to symmetry, it would be equally accurate to say that they simply alternate in direction, and are therefore offset by 180 degrees.) The key concept here is that the rotors need not be perfectly aligned from one to the next. The rotors may be originally mounted in this offset way, or such a configuration may simply result from a dynamic twisting of the upper section 9 of the tower/driveshaft 10 caused by the torque exerted upon the rotors by the wind, since the tower/driveshaft 10 will naturally have some torsional flexibility.

Figure 12:
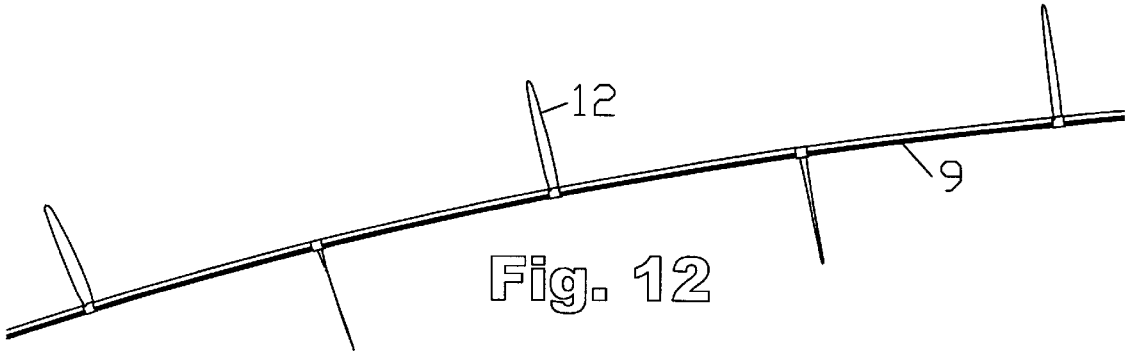

8. In FIG. 12, single-bladed rotors alternately project in opposite directions from the upper section 9 of the tower/driveshaft 10. (They are sequentially offset by 180 degrees.) Though any small region of the tower/driveshaft may be unbalanced, the shaft as a whole maintains overall balance. Each blade 12 is pulled outward by centrifugal force, bending the shaft outward slightly at that point. This resilient deformation of the tower/driveshaft allows each rotor to sweep a slightly enlarged arc, harvesting more total wind energy. Single bladed rotors weigh less, and may produce less wind shadow effects on downwind rotors, than regular, balanced, multi-bladed rotors. It is not absolutely necessary that each rotor be designed in an attempt to extract the full capacity factor of energy allowed by the betz limit; Considering that the rotors encounter the wind in somewhat of a serial manner, available power missed by one rotor may well be salvaged by a downwind rotor.

Figure 13:
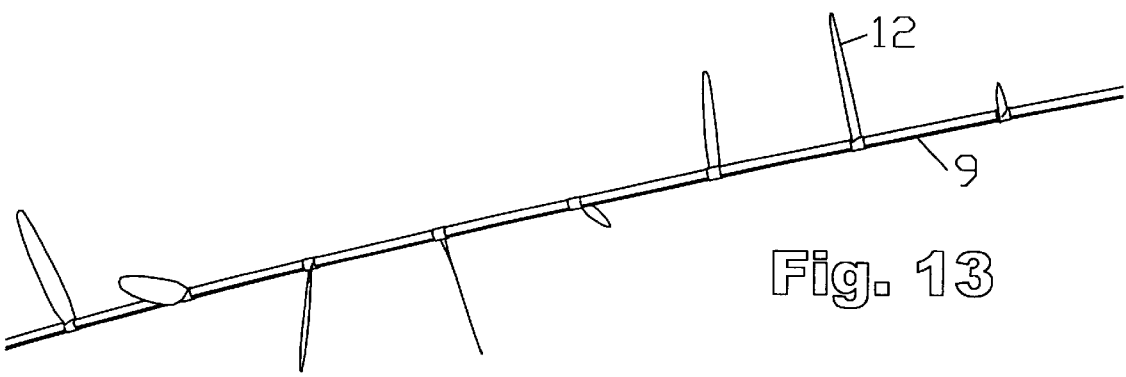

9. In FIG. 13, single-bladed rotors project from the shaft in a helical pattern, at increments of 60 degrees. Such a configuration may encourage the entire tower/driveshaft to spin in a helical mode. The effect at any one point, as in the eighth embodiment, is that the rotor sweeps an enlarged arc, encountering more wind. One or more regions of stability, or harmonic nodes, having a more balanced rotor configuration, such as that of FIG. 10, may be combined on the same tower/driveshaft with a configuration such as this. One can quickly see that a wide variety of rotor configurations, combinations, and permutations thereof, are possible, within the scope of the present invention.

10. FIGS. 14 and 15 show a floating marine installation. Here the mounting means 3 is buoyant, being less dense than water, and floats at the surface 1 of a body of water. The bearing support means 4, here comprising a rigid hollow tube, extends below the water surface, being held down by the weight of ballast counterweight 67, attached to the lower end of the tube. The base means 2 is moored by anchor means 69, graphically represented as simple chains, extending from the mounting means 3 downward toward an unseen point of attachment below. Load 6, here shown as an electrical generator, is located at the top of the tube that serves as bearing support means 4, allowing easy access for service, and minimizing the likelihood of damage by water. The power may be conveniently drawn off by means of continuous power conduit means 66, which here is an electric cable.

The cantilevered bearing means 5 comprises an axle 15 and two bearings 11, securely retained within the hollow tube comprising bearing support means 4, below the load 6. At the bottom, the ballast counterweight 67 serves to counteract the combined forces of gravity and the wind upon the tower/driveshaft and its attached rotors, as exerted through the leverage of its length. This counterweight, by being pulled downward, acts to maintain a substantially upward aim to the direction in which the lower section 7 of the tower/driveshaft 10, projects from the surface 1. As in the previous embodiments, these same forces must be bourne by the bearings 11 of cantilevered bearing means 5. Increasing the distance between the bearings helps to reduce the magnitude of the radial loading thereupon. Since this floating base with attached ballast counterweight is not hard mounted, and therefore has some freedom of directional aim, the entire assembly will tend to be naturally tilted in a downwind direction, with the degree of tilt commensurate with wind speed. Some advantages of marine installations are that higher speed winds are generally found over bodies of water, since there are no obstacles to slow it, that no excavation of earth is needed for the base to extend below the surface, and that valuable land is not used.

Figure 16:
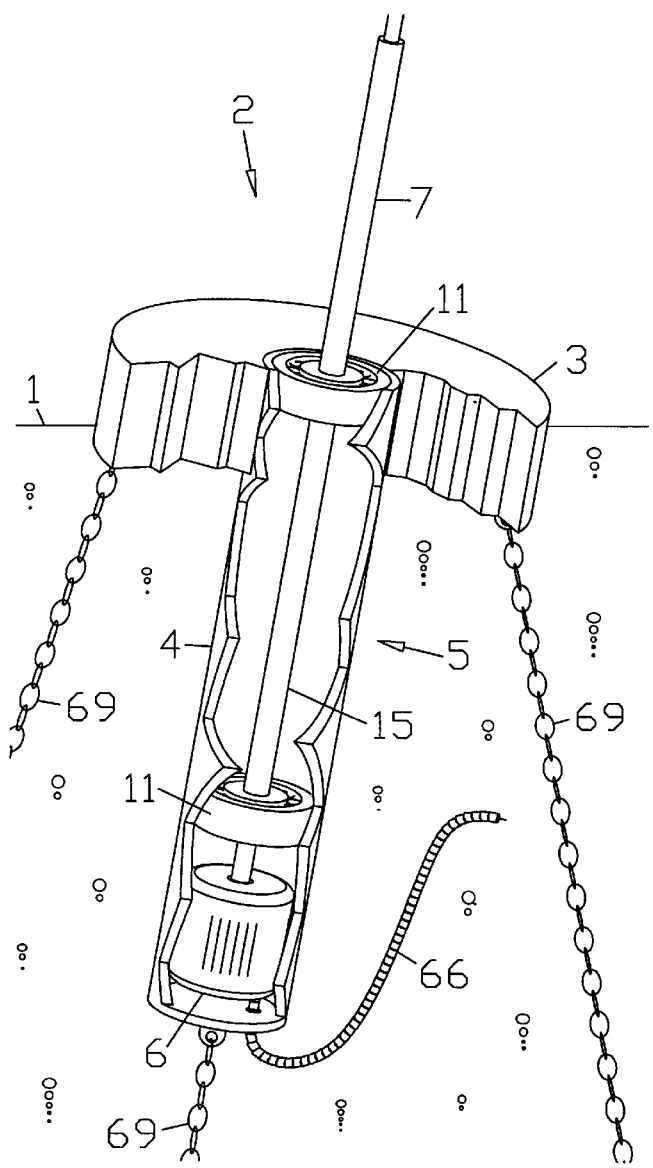
FIG. 16 shows a closeup view of the floating marine base of the eleventh embodiment.

11. FIG. 16 shows a similar floating base similar to the previous, tenth embodiment, with two differences:
    a. The load 6 is located below the bearings, instead of above.
    b. The counterweight is replaced by an additional anchor means 69, attached to a convenient point near the lowest part of the entire assembly, which in this configuration happens to be the lower end of the substantially tubular bearing support means 4. This third point of attachment helps this base to resist tilting with the wind.

These two particular differences from the tenth embodiment are only exemplary in nature, illustrative of such differences that can comprise a wide range of possible marine installations of the present invention.

Figure 17:
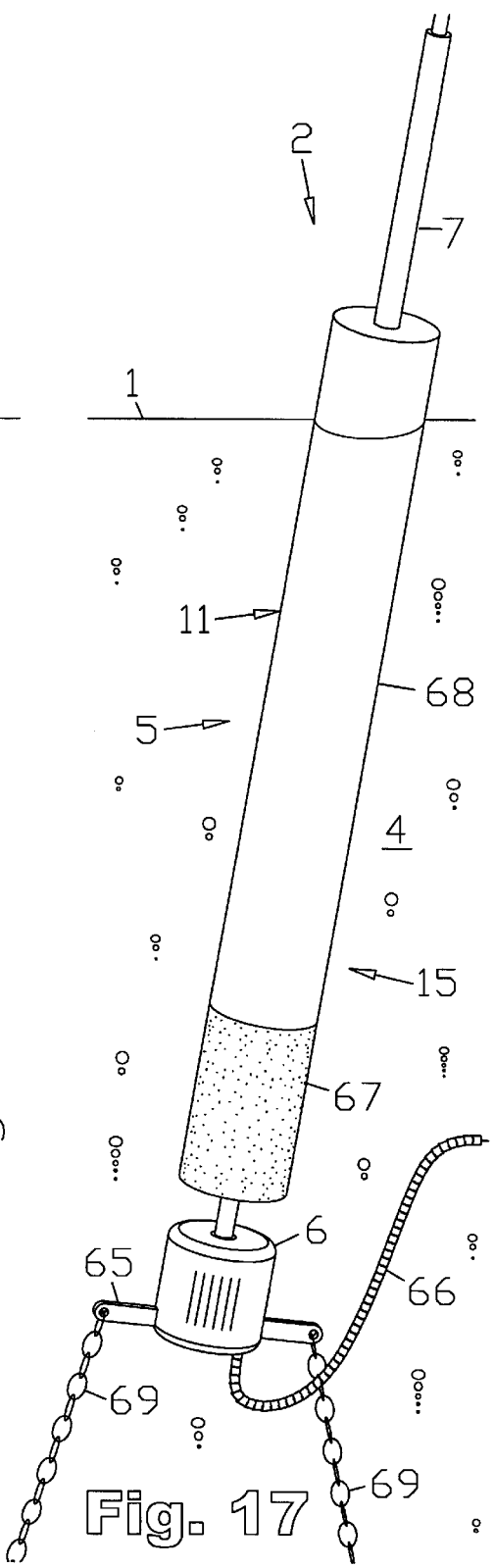
FIG. 17 shows a closeup view of the floating, rotating, counterweighted marine base of the twelfth embodiment, having the cantilevered bearing means comprised of the liquid interface between the rotating base and the surrounding water.

12. FIG. 17: In this surprisingly simple version of the present invention, the axle 15, is comparatively enlarged in the radial dimension, and comprises a single rotating cylinder having a buoyant upper section 68, which is less dense than water, and therefore floats, and a heavy lower section comprising a ballast counterweight 67, which is significantly more dense than water, and therefore sinks. Virtually all of the functions of the bearings 11, the bearing support means 4, and the mounting means 3, are here served by the buoyant axle with its counterweighted end, and the water in which the axle floats. These functions include, but are not limited to:
    a. acting as the cantilevered bearing means 5, by rotatably supporting the tower/driveshaft and its attached rotors, in a substantially upwardly projecting direction, against the forces of gravity and the wind, as exerted through the leverage afforded by the length of the tower/driveshaft.
    b. maintaining a substantially upright bias to the angular orientation of the tower/driveshaft by the natural ambient hydraulic pressure of the water, which exerts an upward force by seeking to displace the buoyant upper end of the axle, while the lower end is pulled downward by its own weight, including the rotating ballast counterweight 67 under the influence of gravity. For this reason the water itself is labeled 4, since it serves as the bearing support means.
    c. allowing full rotational freedom, as provided by the liquid interface between the cylindrical surface of the axle and the water in which it floats. For this reason, this cylindrical surface, comprising a single elongate liquid bearing, is labeled as bearing 11 in FIG. 17.

The lower end of the axle is coaxially coupled to the load 6, in this case an electrical generator. The load 6 is essentially stationary, being attached to non-rotating mount means 65, as moored by anchor means 69, so that power may be conveniently drawn off through a continuous power conduit means 66, in this case a simple electrical cable.

The extremely important point to grasp here is that the highly stressed bearings 11 of the cantilevered bearing means 5 in previous embodiments, are entirely replaced by the floating cylindrical axle with its counterweighted lower end, and the water in which they float. Both the axial and radial loads previously borne by the bearings 11 in previous embodiments are here borne by the water itself. This means that this entire embodiment comprises just a single, floating, moving part, plus an attached load (generator) which depends therefrom. Without the attached load, since no solid part moves against any other solid part, this unitary rotating wind turbine structure could actually be said to have zero moving parts, at least insofar as parts in mutual contact moving with respect to one another, although without a load, it would also seemingly have little or no purpose, and with no way to moor it, it would eventually be blown away. It is nonetheless possible that a use could be found for such a non-anchored apparatus, for instance as a migrating buoy, or that some type of load that simply rotates along with the structure, perhaps interacting with the water, the geomagnetic field, or otherwise utilizing such rotation, could be found. The point is that this new class of flexible windmill, having only a single moving part, is in this embodiment, made yet even simpler, with the need for the manufactured main bearings 11 of previous embodiments completely eliminated.

The bearings of the load itself may be greatly less robust than the bearings 11 of the cantilevered bearing means 5, since they need only bear the stresses due to the power transmitted by the rotation of the shaft, and of mooring the assembly against being blown away, but need not generally provide the major portion of the support of the structure, since that function is provided by the floating, buoyant axle with its counterweighted lower end. Such a floating, counterweighted axle configuration is easily fabricated by, for example, filling the bottom end of a hollow tube with gravel, sand, or concrete. Of course the types of marine installations of the present invention represent just a sampling of those possible. Other possibilities include being directly moored to the seafloor, or, as will be disclosed in the next embodiment, not being moored to anything at all!

13. FIG. 18 shows a propeller-driven boat 79, whose underwater propeller 77 is directly powered by the rotation of a windmill of the present invention. The cantilevered bearing means 5 is mounted directly to the boat, and supports the lower section 7 of the tower/driveshaft with rotational freedom, in a substantially vertical orientation. The propeller is driven by the propeller driveshaft 75, which is held by a propeller driveshaft bearing means 76. The propeller driveshaft 75 is in this case flexible, and forms a rotational coupling between the propeller and the tower/driveshaft, depending coaxially from the lower end of the cantilevered bearing means 5, then curving back to make the directional transition to the substantially horizontal axis underwater propeller 77. In this embodiment, the entire driveline, including the propeller 77, and indeed even the hull of the boat itself, can be considered, in a sense, to comprise the load 6. A steering means 62 is graphically represented as a simple rudder. It is interesting to note that, unlike conventional sailing craft, this boat has no trouble sailing directly into the wind! In fact, the power extracted from the wind is greater when traveling upwind than downwind, due to increased relative wind speed and consequently increased apparent volumetric flow of air. Of course this is a simplified illustration, for sake of example only, with no provision for stopping, or a reverse gear illustrated, though such are well within the known art of marine drivetrains.

Also, note should be taken that, while not illustrated, it is possible to mount several such windmills on the same watercraft, within the scope of the present invention, even projecting in different directions to avoid mutual entanglement.

14. FIG. 19 illustrates an example of a more usable marine drivetrain, for being mounted in a boat, having a power conversion unit (PCU) 71 installed between the rotating tower/driveshaft, as supported by the cantilevered bearing means, above, and the propeller below. The PCU 71 is driven by the axle 15, which is itself rotationally coupled to the lower section 7 of the tower/driveshaft, being essentially an extension thereof, rotationally held by cantilevered bearing means 5. The PCU comprises a brake means 81, and a typical marine transmission means including reverse gear 82, which transmission 82 also serves to transfer rotation from the substantially vertical axle 15 to the substantially horizontal prop shaft 75. The brake 81 may be used to slow or stop the rotation of the tower/driveshaft, and therefore may be used to control power during maneuvering, in a similar manner to that of a throttle being used to attenuate the power of an engine. Shifting to and from reverse gear is also best accomplished under little or no power, therefore application of the brake allows shifting to occur when necessary. The brake 81 also allows the craft to be "parked", with the tower/driveshaft in a nonrotating state, and can therefore serve to protect the tower/driveshaft from damage in excessively high winds.

15. FIG. 20 illustrates an example of an even more versatile, and sophisticated marine drivetrain, a wind/electric hybrid drive. In this embodiment, the Power Conversion Unit 71 comprises a first clutch means 73, a controllable, combination generator/reversible motor means 72, and a second clutch means 74. A continuous power conduit means 66 connects the generator/motor 72 to the power storage means 78, which in this case comprises a bank of electrical batteries. (If the generator/motor produced, for example, compressed air instead of electricity, the power storage means would comprise a high pressure air storage tank.)

This drivetrain is capable of several modes of operation:

a. The first mode is simple sailing, as in the previous two embodiments, with the rotation of the tower/driveshaft 10 directly powering the propeller 77. Both clutches are engaged, and the motor/generator is switched to a neutral state so as to offer no electromagnetic resistance to rotation. Such sailing can proceed in any direction, no matter what the direction of the wind.

b. The second mode is sailing with both clutches 73, 74 engaged, with the motor/generator switched to a generating mode that extracts only a portion of the rotational power as electricity, allowing the rest to drive the propeller 77. In such a mode, the PCU (Power Conversion Unit) 71 functions as an Auxiliary Power Unit (APU), and maintains the batteries 78 in a charged state, and/or contributes power to operate lighting, navigational instruments, computers, or electrical appliances while under way.

c. In a third mode, the first clutch 73 is engaged, while the second clutch 74 is disengaged. The generator/motor 72 is caused to rotate by the rotation of the lower section 7 of the tower/driveshaft, as transmitted by the axle 15 through the first clutch means 73. The generator/motor 72 acts in its generator mode to charge the energy storage means 78, for later use. Since the second clutch means 74 is disengaged, no power is transmitted to the propeller 77 below, so the boat can actually harvest wind energy while moored. The stored energy may be used to power lights and other appliances while moored or later while underway, and/or for powered cruising.

d. Mode four: Sailing with power assist: The wind causes the tower/driveshaft to rotate, providing power to the drivetrain. Both clutches are engaged, and the generator/motor 72 acts as a motor, providing additional power to the drivetrain, while draining the batteries 78. The propeller receives both the power of the instant wind, and power stored in the batteries from previous wind, allowing faster travel. This feature allows cruising to continue at full speed, even when winds die down.

e. Powered cruising under electric drive only, with the upper clutch 73 disengaged, and the lower clutch 74 engaged. The underwater propeller 77 is powered by the motor/generator 72 acting as a motor, in the manner of a conventional electric boat, and the tower/driveshaft, with its attached rotors, does not contribute power.

f. Powered operation in reverse, with the upper clutch 73 disengaged, the lower clutch 74 engaged, and the generator/motor operating as a motor in reverse mode, supplying power to rotate the propeller in a reverse direction, for backing up and maneuvering during docking.

The batteries, being heavy, may also serve as useful ballast, if properly placed. For example many sailboats utilize a heavy keel, weighted with up to several tons of lead, to stabilize the craft and prevent capsizing. If this lead ballast is in the form of batteries, a dual purpose is served. If a boat is going to have a large amount of lead on board anyway, it might as well be utilized for its ability to store power, as well as for its weight.

The preceding three embodiments are but examples of the myriad of marine drives made possible by utilizing wind turbines of the present invention.

16. FIGS. 21 and 22 show a directionally adjustable version of the present invention wherein the base means 2 comprises both azimuthal and elevational directional orientation means; Both the horizontal and vertical components of the direction in which the tower/driveshaft projects from the base means may be controlled. The horizontal, or azimuthal component, is in this case controlled by lateral rotation of the mounting means about horizontally rotatable azimuthal directional orientation means 35 (here shown as a simple turntable), upon which mounting means 3, as well as the rest of the base, is itself supported. The vertical component, or elevation angle, is controlled by an elevation angle control means 36, which in this case comprises a lifting mechanism 37, that raises and lowers the upper end of the bearing support means 4, the tubular enclosure that securely retains the bearings. This tubular bearing support means 4 pivots about a pivot means 38 at its lower end.

The exact aiming mechanism shown is exemplary only, serving to illustrate the point that the aim may be actively controlled in general. Many simple alternative mechanisms known in the art may be adapted. Note in FIG. 21 that the lower section 7 of the tower/driveshaft 10 is actually aimed into the wind at its base, but, proceeding upward, the middle section 8 of the tower/driveshaft begins to bend back with the wind, until, at sufficient distance from the base, the upper section 9 of the tower/driveshaft is eventually blown back into the opposite direction—downwind. Such aiming technique may be used, for example, in strong winds that might otherwise blow the tower/driveshaft and attached rotors too far over, resulting in ground contact. With the aim of the tower/driveshaft being pre-biased toward the wind, it reaches higher before being blown backward. In lighter winds, however, that don't bend the tower/driveshaft as severely, the base is allowed to freely rotate, so as to naturally aim itself in a downwind direction. Additional reasons for aiming the tower/driveshaft in a direction other than vertical include the avoidance of other objects, such as buildings or even other windmills, and bringing the system down for maintenance.

This embodiment exemplifies the strong tendency of the general flexible design disclosed herein to aim itself in the proper downwind direction, no matter what the direction of initial projection. The important point is not the specific mechanism of aiming the windmill, but the fact that it may be desirable, within the scope of the present invention, for the tower/driveshaft to project from the base in some direction other than vertical.

Also to be considered within the scope of this embodiment, with reference to FIG. 22, are:

1. A version which the direction in which the tower/driveshaft projects from the base is simply fixed, firmly locked in some direction other than vertical. Reasons for this could include directionally consistent prevailing winds, being mounted on a ship, building, bridge, or other vehicle or structure, or the avoidance of objects such as buildings, landforms, or other windmills.
2. A version in which the elevation angle, at which the flexible tower/driveshaft projects from the base in the vertical plane is fixed at an angle other than exactly vertical, while free rotation of the base is allowed in the horizontal (azimuthal) plane. In this case the tower/driveshaft may emerge from the base means in a direction sufficiently parallel to the wind that horizontal-axis-type rotors may effectively be mounted quite close to the base end (as in the next embodiment, shown in FIG. 23.) The freely rotating turntable base will naturally allow the entire tower/driveshaft to passively aim itself in a downwind direction. Projection at a sufficiently low angle even allows the middle section 8 of the tower/driveshaft, to effectively be eliminated. (This middle section normally serves the purpose of making the directional transition between the substantially vertical lower section of the shaft and the upper section with its attached rotors, by bending downwind.)
3. A version in which the elevation angle at which the tower/driveshaft projects from the base is fixed, and the azimuthal orientation (rotational in the horizontal plane) is controlled or adjustable, rather than freely rotating.
4. A version having a fixed directional aim in the horizontal (azimuthal) plane, while the elevation angle (direction in the vertical plane) at which the tower/driveshaft projects from the base is controlled or adjustable. Reasons for such a configuration could include installation in a location with directionally consistent winds that vary in strength, and having the ability to bring the system down for maintenance.
5. A version that can be operated in reverse, with a motor substituted for the load, so as to actually provide the motive interface to propel, and/or provide lift for, a vehicle.

17. FIGS. 23 and 24 show a version wherein the base means 2 comprises a resilient, directionally flexible, non-rotating mounting interface 39 with a bias toward vertical (spring). This mounting interface, represented graphically by a simple coil spring, has directional flexibility as in the previous embodiment, but is non-rotating, so that power may be conveniently drawn off by a Continuous Power Conduit Means 66, such as a simple electric cable. The cantilevered bearing means 5 is attached to the mounting means 3 by a resilient, directionally flexible, non-rotating mounting interface 39, graphically represented by a coil spring. Such a flexible interface allows the cantilevered bearing means 5 to be naturally aimed downwind by the tower/driveshaft. Both gravity and the force of the wind, as applied through the leverage of the tower/driveshaft 10 and the cantilevered bearing means 5, combine to force the resilient mounting interface 39 to yield to a position where the tower/driveshaft projects from the cantilevered bearing means in a substantially downwind direction. Depending on the magnitude of the deflection, the tower/driveshaft may emerge from the cantilevered bearing means in a direction sufficiently parallel to the wind for the coaxially attached horizontal axis type rotors 13 to function effectively even when placed fairly close to the basal end of the tower/driveshaft. In such a case, the resilient interface may be considered to have at least partially replaced the middle section 8 of the tower/driveshaft of the first embodiment, whose purpose is to deflect in a downwind direction.

Figure 27:
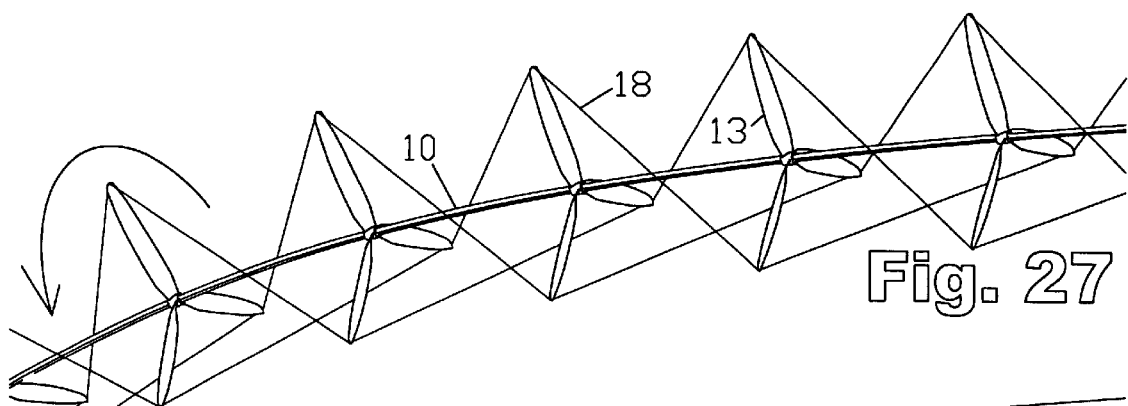
FIGS. 27–30 show closeup side views of part of the upper section of a tower/driveshaft illustrating alternative lashing configurations, applicable to many of the embodiments described herein.
Figure 98:
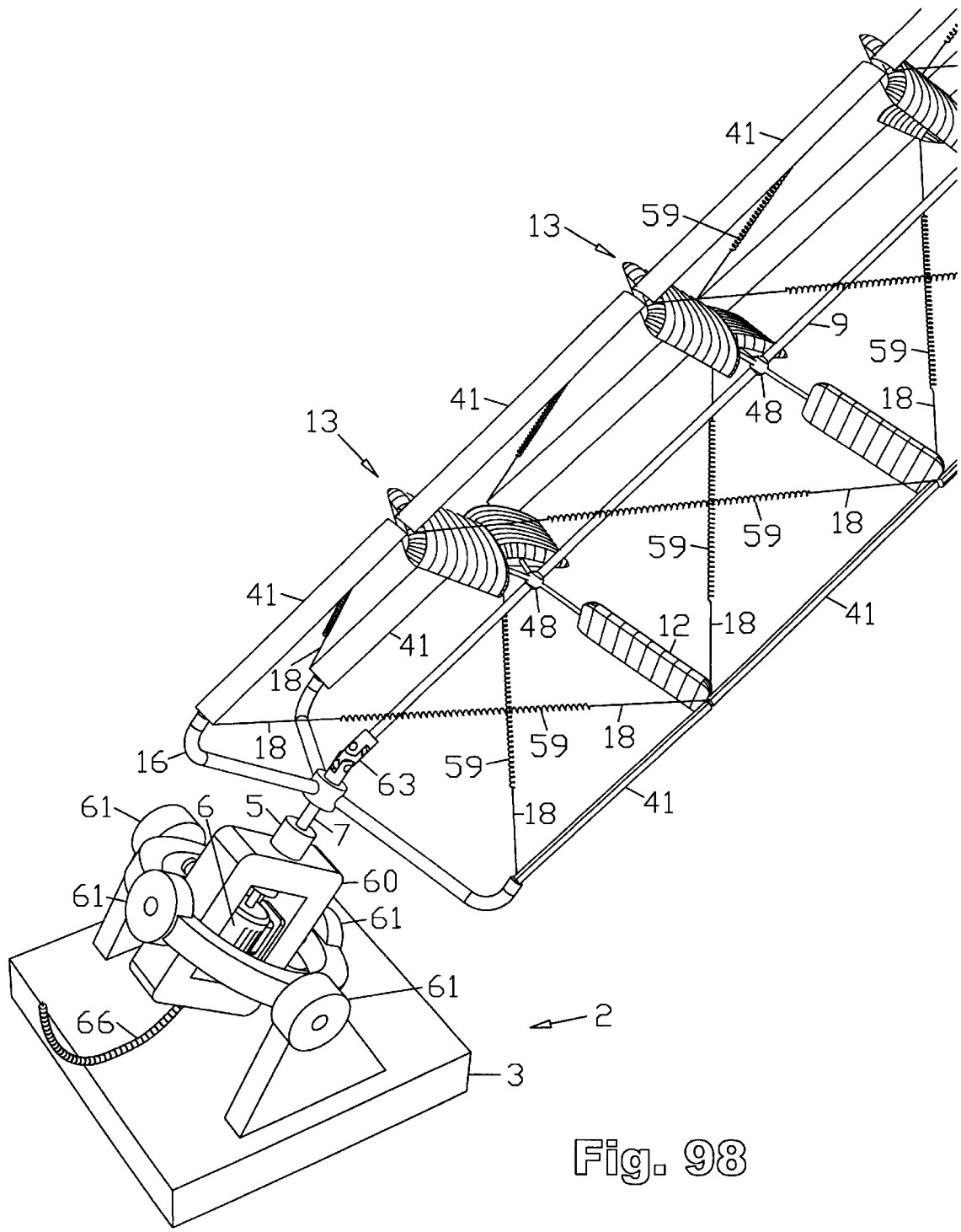
FIG. 98 is an aerial side perspective view of the lower end of the windmill installation of the seventy-third embodiment, having rotors mounted on tilting hubs, steerable by elongate vertical axis blades, an armature, a directionally compliant base with means for directional bias, and torque transmission lashing provided with slack uptake means.

18. FIGS. 25 and 27 show a rotating tower/driveshaft 10 as previously disclosed, extending downwind from a flexible mounting interface 39, shown for the sake of example. The key feature to note in this embodiment is the helical lashing means 18, three of which wind their way up the tower/driveshaft, from one rotor tip to the next, transmitting torque all the way from the most distant rotor back to the base of the lower section 7 of the tower/driveshaft, where the torque is taken up by an armature means 16. Such lashing may, or may not, be elastic, have elastic properties, or be provided with elastic property means (such as the slack uptake means 59, comprising elastic or resilient spring means in the seventy-third embodiment, as shown in FIG. 98). The helical configuration may be preconfigured, or may result from a twisting deformation of the central shaft under load.

Figure 28:
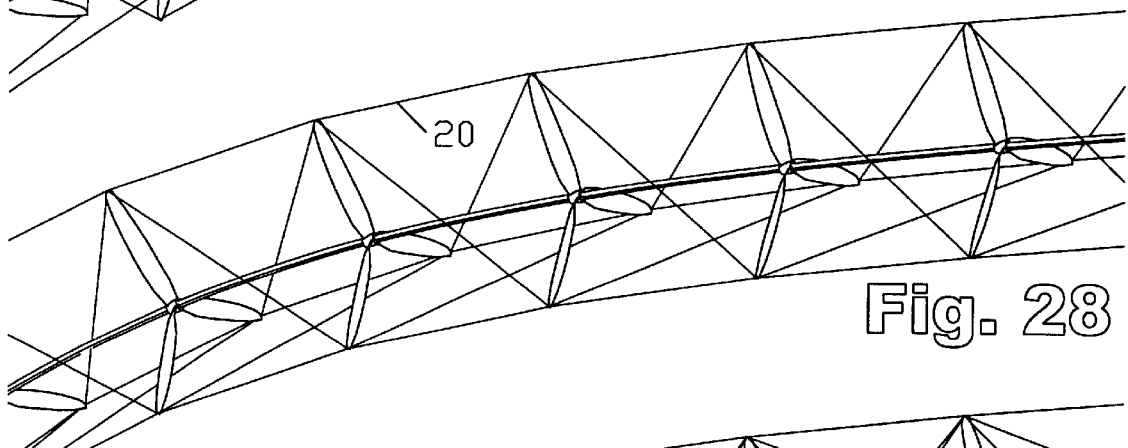

19. FIGS. 26 and 28 show a version having helical lashing means, like the seventeenth embodiment, with the addition of continuous longitudinal lashing means 20, shown extending from one rotor tip to the next, along the length of the tower/driveshaft, running substantially parallel to the shaft. This longitudinal lashing acts to structurally augment the stiffness of the tower/driveshaft 10, by serving, when brought under tension, to oppose any longitudinal bending of the tower/driveshaft. This limits the downward, and downwind, bending behavior. The substantially linear longitudinal configuration may be preconfigured, or may result from a twisting deformation of the central shaft under load.

Figure 29:
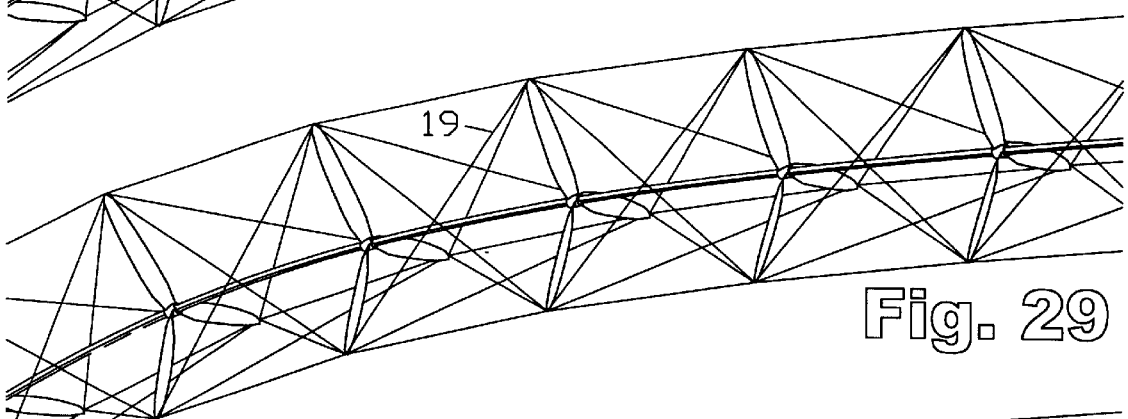

20. FIG. 29 shows a section of a driveshaft tower similar to that of the previous, nineteenth embodiment shown in FIG. 28, with the addition of reverse helical lashing means 19, that winds in the opposite direction of helical lashing means 18, and so does not help to transmit torque downward, but may transmit it upward in cases where the lower rotors encounter a sudden gust. This type of lashing acts to contribute to the overall structural stiffness, interconnection, and integrity of the structure as a whole.

It may be incorporated with, or without, the longitudinal lashing means 20.

Figure 30:
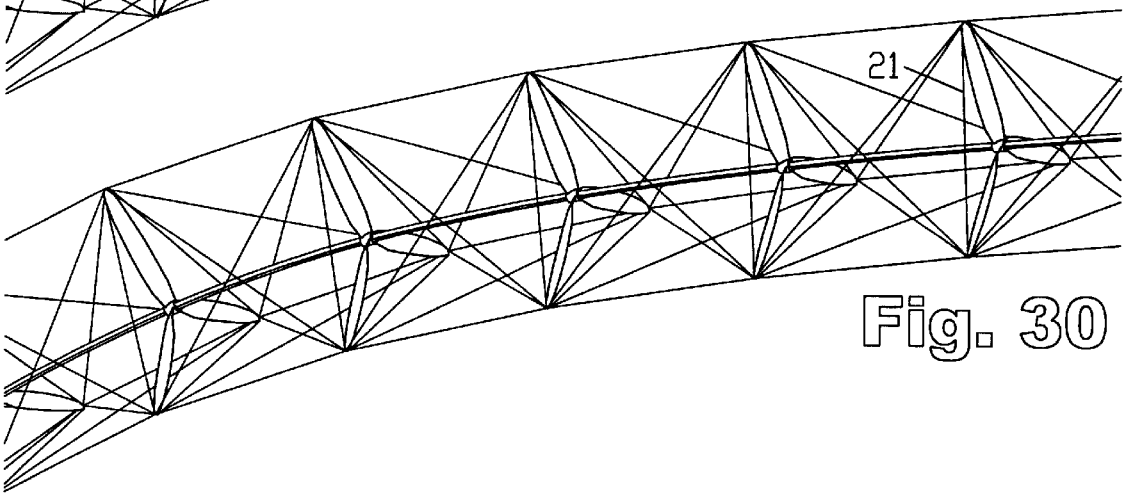

21. FIG. 30 shows a section of a driveshaft tower similar to that of the twentieth embodiment shown in FIG. 29, with the addition of latitudinal lashing means 21 (substantially perpendicular to shaft), that winds in a circumferential circuit from rotor tip to rotor tip, of the same rotor. Such lashing helps, by acting in tension, to transmit torque from one blade to the next, as an interim step before it is finally transmitted downward, and may likewise contribute toward its transmission upward, or otherwise contribute to the overall structural stiffness, interconnection, and integrity of the structure as a whole.

22. This embodiment, shown in FIGS. 31, 32, and 33, is similar to the first embodiment, except that in this case the tower/driveshaft 10 comprises an open latticework structure 53, rather than a solid shaft. In operation, as with other windmill towers, this flexible, rotating, latticework column, serving as a tower/driveshaft, can have higher strength for a given weight, more effectively transmit torque, and may cast less wind shadow than a solid tower, by allowing some wind to pass through it. Such an open latticework structure 53 may be comprised of, for example, struts. Referring to FIG. 32, One such strut 54 member extends diagonally from top to bottom in the direction of rotation. A strut so placed would tend to transmit torque exerted by the rotors downward in compression. A strut placed in the opposite diagonal direction would tend to transmit the torque downward in tension. These are only examples. Many lattice structures are possible, within the scope of the present invention. The tower/driveshaft 10 of such an embodiment may be said to resemble, for instance, a floppy truss-type radio tower with no guy wires. In FIG. 33, The base 2 is seen in a closer, cutaway depiction showing that the cantilevered bearing means 5 may comprise, for example, a bearing support means 4, such as the substantially vertical cylindrical enclosure means shown, with a pair of bearings 11, one mounted at each end. The bearings 11 rotatably support a substantially vertical rigid axle 15, upon which the power takeoff means 14 and the tower/driveshaft 10 are coaxially mounted, as in the first embodiment. As in other embodiments, the radial loads on the bearings 11 may be lessened by increasing the distance between them.

Figure 34:
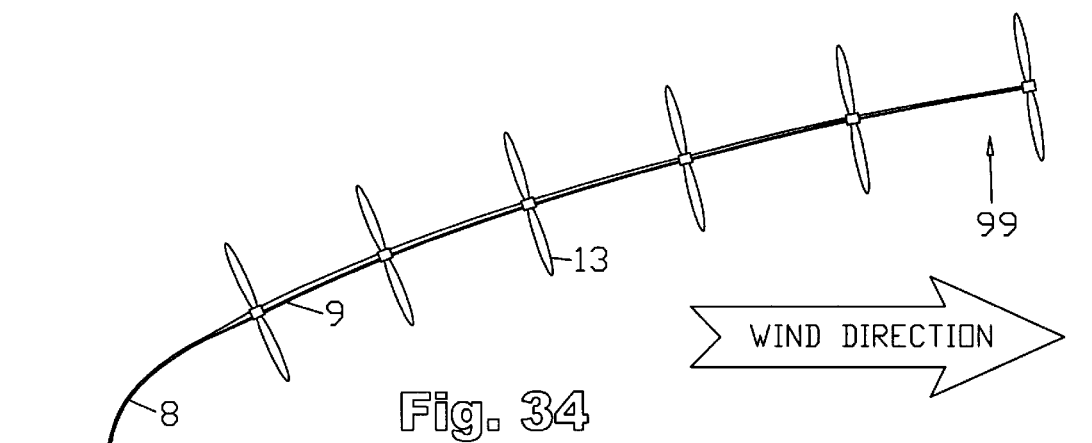
FIG. 34 shows a side view of the twenty-third embodiment, showing a tower/driveshaft in profile, depicting regions of varying longitudinal flexibility.
Figure 35:
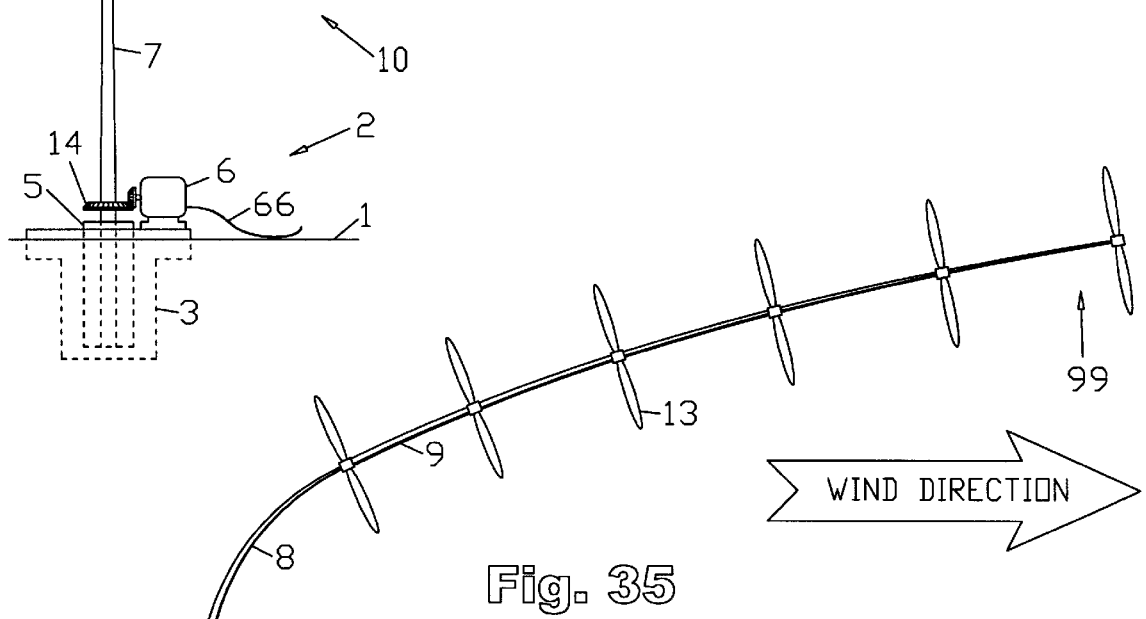
FIG. 35 shows a side view of the twenty-fourth embodiment, showing a tower/driveshaft in profile, depicting regions of varying longitudinal flexibility.

FIGS. 34 and 35 illustrate two examples of how a desired bending response may be built into a tower/driveshaft of the present invention, so that each section of the tower/driveshaft 10 is specifically tailored to its intended purpose:

23. In FIG. 34, depicting the twenty-third embodiment, the lower section 7 is thick and substantially rigid, serving to attain distance from the ground, like the tower of a conventional windmill, with the added duty of transmitting torque, and therefore mechanical power, downward by its rotation. At a desired height the lower section 7 gives way to the longitudinally more flexible middle section 8 of the shaft. This middle section 8 of the shaft is depicted as being thinner than either the lower section 7, or the upper section 9, to denote that this middle section 8 is more longitudinally flexible. Many known structural means, other than simply making the shaft thinner, could also be utilized to provide such enhanced longitudinal flexibility. This increased flexibility allows an enhanced bending transition toward horizontal, reducing the required length of this middle section 8. This reduces the overall mass, as well as the overall height, and the horizontal extension, of the tower/driveshaft, which in turn reduces the lever moment applied at the base, and so reduces the radial loads which must be born by the bearings comprising cantilevered bearing means 5. At a point where the tower/driveshaft 10 is sufficiently parallel to the wind for an attached rotor 13 to effectively contribute toward its rotation, the upper section 9 of the shaft begins. Rotors are coaxially attached at intervals along this upper section of the shaft. Further bending of the shaft beyond this point will tend to increase the wind shadow effect from one rotor to the next, so for added stiffness, this upper section 9 of the shaft begins thicker than the middle section 8, while tapering toward its distal end 99, to save weight. The gyroscopic effect of each rotor 13 tends to stabilize the shaft in the region where that rotor is attached. As described in the first embodiment, the aggregate stabilizing effect is quite significant, substantially reducing wild swings and gyrations of the shaft in gusty conditions.

Note that in this illustration, the mounting means 3, which may comprise, for example, a concrete footing, extends sufficiently far below the surface 1 that the cantilevered bearing means 5, also below the surface, is substantially embedded within the mounting means. The load is at the surface for easy access. Since the base and load do not rotate, power may be easily extracted from the assembly by a continuous power conduit means 66. This base configuration is an example, which need not be exclusively associated with this embodiment of the tower/driveshaft.

24. FIG. 35: The twenty-fourth embodiment shown in FIG. 35 is similar to that of the previous embodiment, shown in FIG. 34, except that in this case, no well-defined delineation exists between the stiffer, thicker lower section 7, and the thinner, more flexible middle section 8 of the tower/driveshaft. The tower/driveshaft simply gradually tapers with increasing distance from the base, becoming thinner and more flexible until, sufficiently bent in a downwind direction for coaxially attached horizontal axis type rotors to effectively contribute toward rotation, it transitions to the upper section 9, which again begins thicker for added stiffness, tapering toward its distal end 99 to save weight.

It is important to note that the differences between the first embodiment, and the twenty-third and twenty-fourth embodiments may be interpreted as simply a matter of degree, involving how thick, or stiff, one chooses to make the tower/driveshaft 10 at any point along its length, in order to fine tune its behavior under differing conditions. The designations of the different sections of the shaft are only intended as a simplified illustration of the basic concepts involved. Other variations of stiffness or thickness along the length of the shaft may occur to other designers for whatever reason.

25. FIGS. 36 and 78: The twenty-fifth embodiment is similar to the first embodiment, except for having only one rotor. As in the first embodiment, the substantially rigid lower section 7 of the tower/driveshaft 10 is substantially vertical to achieve height, rotationally supported, in an upwardly cantilevered manner, by cantilevered bearing means 5. FIG. 78 shows a closer view of the base, wherein the cantilevered bearing means comprises a vertical axle 15, rotationally supported by a pair of vertically spaced bearings 11, securely retained by a rigid bearing support means 4, which in this case comprises a rigid, hollow, vertical tube. The middle section, 8 bends, and the upper section 9 therefore has a substantially horizontal component to its direction, allowing any coaxially attached, horizontal axis rotors to effectively harness the energy of the wind. In this case, rather than a multiplicity of rotors, we utilize only a single, three-bladed, horizontal axis type rotor. The power takeoff means 14, mounted to the mounting means 3 and attached to the rigid lower section 7 of the tower/driveshaft, above the cantilevered bearing means 5, supplies ratio gearing to convert the relatively slow rotation of this single rotor 13 to a faster rotational rate suitable for driving a generator 6.

26. FIG. 37: The twenty-sixth embodiment is similar to the twenty-fifth, having only a single horizontal axis type rotor, but with the addition of a Darrieus type vertical axis type of rotor 44, coaxially mounted to the lower section 7 of the tower/driveshaft 10. The two rotors, one a vertical axis type rotor 44, one a horizontal axis type rotor 13, work in tandem, turning the same tower/driveshaft 10 in unison. The upper, horizontal axis type rotor 13 makes the machine self-starting, and is located at a substantial distance from the surface to capture more wind energy. The lower, vertical axis rotor 44 adds to the total amount of power collected, by making extra use of the rotating, rigid, vertical shaft comprising the lower section 7 of the tower/driveshaft, necessary to support the upper rotor, and to transmit its rotation to the base 2. This lower rotor, being closer to the base 2 than the upper rotor, applies less leverage on the base 2 and therefore contributes less radial loading to the bearings 11 of cantilevered bearing means 5. The subsurface base of the sixth embodiment, shown in FIG. 9, was chosen as an example, but another type of base could be used. This embodiment can also be thought of as coupling the middle section 8 and the upper section 9 of the tower/driveshaft 10 of a windmill of the present invention, with a standard Darrieus type of windmill, to make the Darrieus machine self-starting, and also add to the amount of power it can produce. This embodiment therefore overcomes one of the main drawbacks of a Darrieus machine, that it is not self-starting, making the Darrieus machine a viable alternative to conventional, horizontal-axis wind turbines.

27. FIG. 38: The twenty-seventh embodiment is similar to the twenty-sixth, further comprising additional rotors of each type. Coaxially mounted to the lower section 7 of the tower/driveshaft are multiple Darrieus type vertical axis rotors 44; In this case two are shown, but more can be added within the scope of the present invention. Some of the uppermost vertical axis type rotors 44 may encroach upon the middle section 8 of the tower/driveshaft, yet remain sufficiently vertical to contribute toward the shaft rotation. Coaxially attached to the upper section 9 of the tower driveshaft are a multiplicity of horizontal axis-type rotors, as in the first embodiment. This embodiment combines several horizontal axis turbine rotors, with a multiplicity of vertical axis turbine rotors, including a means of rotationally supporting them all at an effective height, and harnessing their combined power to run a load, with automatic directional orientation guidance, all using only "a single moving part".

28. FIG. 39 The twenty-eighth embodiment, somewhat similar to the previous, twenty-seventh embodiment, having multiple rotors of both the horizontal type 13, and vertical axis type 44. This embodiment utilizes guy wires 55, attached to a hub means 56, which comprises a bearing 11, which is the upper bearing of cantilevered bearing means 5, coaxially aligned with, mounted to, and horizontally supporting, with rotational freedom in the horizontal plane, the upper end of the vertical rigid axle 15, which in this embodiment, is coincident with the rigid lower section 7 of the tower/driveshaft. Cantilevered beating means 5 in this case therefore comprises the bearings 11, the bearing support means 4, (which, in addition to the usual cylindrical housing, that here holds only the lower bearing, also comprises the hub means 56, and the guy wires 55, as moored to the surface itself), and the lower section 7 of the tower/driveshaft, which in this case is rigid along its entire length, and therefore also serves the function of the axle 15, and is so labeled. So here, since the cantilevered bearing means 5 is mostly above the surface, and is therefore exposed to the wind, it is provided with vertical axis rotors to help turn the shaft. The advantages to this design over, say, the first, fifth, and sixth embodiments include, but are not limited to:

a. The overall structure is shorter, since the axle 15 does not extend as far underground, but instead doubles as the lower section of the tower/driveshaft 7, being coincident therewith.
  b. The rigid axle 15 can be easily made longer, without providing it with a deep subsurface excavation and a commensurately long underground tubular bearing support housing 4, since it is located primarily above the surface, and can be made as long as the lower section 7 of the tower driveshaft.
  c. The excavation, being less deep, is easier and safer to dig.
  d. The cylindrical housing comprising bearing support means 4 is shorter, requiring less material.
  e. Problems related to deep excavations, such as water accumulation and access for maintenance, are lessened.
  f. The bearings can be less robust, since:
    1. the longer axle 15 allows the bearings 11 to be separated more, adding to their combined leverage.
    2. the leverage that the middle section 8, and the upper section 9 with its attached rotors, can exert upon these bearings is now less as well, without the additional leverage length that the lower section 7 adds in other embodiments.
  g. The vertical axis rotors 44 add to the power generated by the horizontal axis rotors, making this a more powerful machine.

29. FIG. 40 shows a machine similar to that of the twenty-eighth embodiment, except for having no vertical axis blades. Such a configuration has many of the advantages of the previous embodiment, while allowing more availability of the land below for other uses, such as agriculture. The cantilevered bearing means 5 comprises the two bearings 11, and the rigid axle 15, which is also, in this case, the lower section 7 of the tower/driveshaft. As in the previous embodiment, the axial loading on each individual bearing 11 is lessened by increasing the distance between them, with such increased distance being facilitated by having the axle 15 above the surface. This axial loading is further reduced by the fact that, since the lower section of the tower/driveshaft is now also part of the rigid axle 15, which is part of cantilevered bearing means 5, less of the tower/driveshaft projects above the cantilevered bearing means 5, reducing the leverage exerted by the projecting remainder of the tower/driveshaft 10 thereupon.

30. FIG. 41 The thirtieth embodiment is similar to the twenty-fifth embodiment, having a single downwind horizontal axis rotor, with the load 6 located above the surface, driven by a power takeoff means 14, which is rigidly attached to, and driven by, the rigid, rotating axle 15. Additionally, as in the previous two embodiments, this embodiment also utilizes guy wires 55, attached to a hub means 56, which comprises a bearing 11, which is the upper bearing of cantilevered bearing means 5, coaxially mounted to, and horizontally supporting, with rotational freedom in the horizontal plane, the upper end of the vertical rigid axle 15, which is, here again, coincident with the lower section 7 of the tower/driveshaft. As in these previous two embodiments, this allows the axle 15 to be made longer, lessening the axial load on the bearings 11, and requires no deep excavation for installation.

31. FIG. 42 The thirty-first embodiment shows a wind farm, comprising a multiplicity of the turbines of the twenty-eighth embodiment, arranged in a rectangular grid pattern, separated by a sufficient distance that collisions between turbines are prevented. Around the perimeter of the grid, guy wires 55 extend from the surface to each hub 56. Within the grid, horizontal guy wires 57 connect each hub 56 to its neighbors, leaving the surface below, within the grid, uncluttered by guy wires, so that the land may be more easily utilized for other purposes, such as agriculture.

32. FIGS. 43 and 44 show a wind turbine similar to the twenty-seventh embodiment, having a vertical axis rotor 44, coaxially mounted to the lower section 7 of the tower/driveshaft, and horizontal axis type rotors 13 coaxially mounted to the upper section 9 of the tower/driveshaft. Here the vertical axis rotor 44 is comprised of elongate, substantially straight, longitudinally oriented, vertical axis type blades 40, running parallel to the lower section 7 of the tower/driveshaft and mounted to the ends of armatures 16, which are vertically spaced at intervals therealong. Another key feature in this embodiment to note is that the tower/driveshaft extends past even the upper section 9, forming a downward hanging distal section 98, to which additional horizontal axis rotors are coaxially mounted. The length of this downward-hanging distal section 98 is limited by the overall stiffness of the tower/driveshaft; It may extend only as far as its attached horizontal axis type rotors remain sufficiently perpendicular to the wind to contribute to, rather than hinder, the rotation of the tower/driveshaft.

33. FIGS. 45 and 46 show a version similar to the previous embodiment, having both vertical axis rotors and horizontal axis rotors. The key feature here is that both types of rotors are mounted along the entire length of the tower driveshaft, rather than being restricted to the upper or lower section, and are interconnected to each other. The horizontal axis type blades 13 serve as the armature means to which the vertical axis type blades 41 are connected. The vertical axis type blades 41 of this embodiment differ from the vertical axis blades 40 of the previous embodiments, in that they also serve as structural components of the tower/driveshaft; These vertical axis blades serve as longitudinal lashing means 20 when under tension, and may otherwise contribute strength to the structure as a whole by their stiffness, or rigidity, and by resistance to compression forces. During one rotation of the tower/driveshaft, each longitudinal vertical axis type blade 41 is placed alternately under tension, then compression. Since the tower/driveshaft is constantly twisted by the wind in one direction, along its entire length, these elongate vertical axis blades may even assume somewhat of a helical configuration of the type illustrated in FIG. 52 when under load. Referring to FIG. 45, notice that this tower/driveshaft is so long in relation to its stiffness, that the entire distal section 98 of the structure hangs significantly downward. At some point, its direction of downward projection will have a sufficient vertical component that the attached vertical axis type blades 41 in that region will begin to be aerodynamically affected in a manner favorable to rotation. While one may wonder at first glance whether the aerodynamic forces on the vertical axis blades of this downward hanging distal section would tend to augment, or to counter, the rotational forces exerted by the rest of the blades, remember, vertical axis type blades, in general, are equally responsive to wind from any direction. These vertical axis rotors don't "know" or "care" whether they are upside down or right side up, or from which direction the wind comes, only that they are rotating, and that wind flows through them, substantially perpendicular to their longitudinal axis. Therefore, it is extremely important to note that this distal section 98, even though "upside-down", still contributes toward, rather than detracts from, the overall rotation of the tower/driveshaft.

(In fact, if the base 2 of such a turbine is installed at a point higher than the surrounding surface, as illustrated in FIG. 51, where a similar windmill is mounted atop a building, the downward hanging distal section 98 may actually comprise the most significant power-generating portion of the of the tower/driveshaft, extending well below even the base itself, and harvesting more total wind energy than any other section.)

An advantage of the wind turbine of this embodiment is that, if all sections of this tower/driveshaft are similar, it can be fabricated in a uniform, modular fashion; Virtually the entire tower/driveshaft 10, including the horizontal axis type rotors and the longitudinal vertical axis blades, can be prefabricated in easy-to-ship, identical sections, then assembled in the field. Or, the elongate blades can be rolled up on spools for shipping, then attached to the armature rotors in the field.

Alternatively, if we are willing to give up the cost savings of uniform parts throughout, the components of each section of the tower/driveshaft may vary, being optimized for their particular function, placement, and orientation. For example, the "horizontal axis type rotors" 13 which are mounted to the vertical lower section 7 of the tower/driveshaft are not properly oriented to contribute aerodynamically toward the overall rotation of the tower/driveshaft. They exist primarily to serve as armatures 16 for the vertical axis blades. In fact, the wide blades of a conventionally-shaped horizontal axis type rotor, in this instance would tend to produce drag, rather than contributing toward rotation. Therefore these lower rotors 13, serving mainly as armatures, should optimally be streamlined to reduce drag, and need not be shaped to generate rotational forces from the wind.

The shape of the horizontal axis rotors 13 of the middle section 8, being somewhere between parallel and perpendicular to the wind, may optimally be somewhere between that of a simple streamlined armature and that of a dedicated horizontal axis turbine rotor, or may be otherwise optimized for the type of airflow they will encounter in their position along the bending tower/driveshaft.

The horizontal axis rotors of the upper section 9 of the tower/driveshaft, on the other hand, being substantially perpendicular to the wind, are fully aerodynamically functional, and should be so shaped.

Proceeding toward the distal end 99 of the tower/driveshaft, as it begins to point in an increasingly downward direction, at some point the horizontal axis type rotors 13, once again may become aerodynamically ineffective due to improper orientation, and therefore serve primarily as armatures for mounting the vertical axis type blades, which do indeed, once again, become effective in this downward hanging distal section 98. Here again, in this distal section 98 the aerodynamic shape of the horizontal axis type rotors/ armatures 13 may be adjusted toward being simply streamlined, to function as armatures, rather than being shaped as a fluid reactive surface in an attempt to generate rotational forces, (although very strong winds may still blow this distal section to a more horizontal direction). Similarly, the longitudinal blades 41 of the vertical axis type rotors, where they pass through the upper section 9 of the tower/driveshaft, are not properly oriented to produce power, but instead serve as structural members, and so may be shaped to simply minimize drag, rather than to produce rotation, although this difference in shape is less pronounced than that of the horizontal axis type rotors. Other differences in rotor shape, depending on position, could include diameter and pitch. For example, faster winds are found at higher altitudes. Since the blade tip speed is proportional to wind speed, if all rotors have the same diameter, the higher altitude rotors will be driven to rotate faster than lower altitude rotors, creating a possible discrepancy in optimal rotational rate from one section of the shaft to the next. Since the whole shaft turns as a unit, lower rotors may tend to slow the higher rotors, reducing overall efficiency. This effect may be mitigated by slightly increasing the diameter of the higher altitude rotors, or by varying their pitch.

In the final analysis, whether or not the rotors are uniform throughout the tower/driveshaft, or are tailored for their specific placement, is based on cost. At one, low cost extreme, all rotors and sections of blade, and therefore all modules of a modular construction, are exactly identical. At the other, high cost manufacturing extreme, each rotor, or section of blade, is specifically designed to be optimized for its exact placement. Between those two extremes, a limited number of types of modules, having different rotor, and blade variations, may be mass-produced, with the best type for each position chosen from among those.

34. FIGS. 47 and 48: The thirty-fourth embodiment is similar to the thirty-third, except that here the central shaft has been eliminated from all but the lower section 7 of the tower/driveshaft. In this lower section 7, the central shaft is reduced to a vertical extension of the axle 15, of sufficient length to provide a rotational coupling between the tower/driveshaft 10 and the load 6. The longitudinal stiffness of the remainder of the tower/driveshaft is provided by the longitudinal vertical axis type blades 41, which alternate between tension and compression once with every revolution. These longitudinal blades 41 are maintained in their relative geometry by being connected at intervals along their length by the horizontal type rotors 13 that serve as armatures. Torque transmission as well is provided by the stiffness of these longitudinal blades 41, as interconnected with these aerodynamic armatures. The tower/driveshaft may therefore become twisted under load, so that these elongate blades 41 then assume a somewhat helical configuration. The beauty of this configuration is that, with the exception of the vertical extension of the axle 15, which projects upward into to lower section 7 of the tower/driveshaft, virtually every part of this tower/driveshaft 10 is capable off serving the aerodynamic function of extracting mechanical rotational energy from the wind, in addition to its structural duties, depending on wind strength and direction. Like the latticework tower/driveshaft 53 of the twenty-second embodiment, this tower/driveshaft 10 can be thought of as being comprised of struts 54. In this case, every strut 54 is a blade, and every blade is a strut. Amost no element offered to the wind is wasted on only support, nor on only catching wind, as in prior art windmills. With the possible exception of the horizontal axis type rotors 13 connected to the lower section 7 of the tower/driveshaft, practically all components, to some degree, serve both functions. Here is a self orienting windmill, having only a single moving part, whose blades also serve as its flexible, rotating, latticework tower. Whatever the wind direction or strength, every section of this serpentine windmill, however it may bend, has aerodynamic surfaces that will translate that wind into localized forces that contribute to the rotation of the tower/driveshaft. It is easy to see that a myriad of possible structures exist, within the scope of the present invention, for a tower/driveshaft having similar combinations of blades acting as struts, for example, a configuration based on four- or five-bladed, rather than three-bladed rotors, or one with struts at various geometric angles, having various combinations of aerodynamic properties, all acting in concert to cause the tower/driveshaft as a whole to rotate.

35. FIGS. 49 and 50 The thirty-fifth embodiment is similar to the thirty-fourth, having no central shaft, but with the addition of diagonal torque transmission lashing means 18 running diagonally from proximate one horizontal axis type rotor 13 blade tip to the next, wrapping its way helically upward in the direction of rotation. This lashing, while producing some wind drag and not contributing aerodynamically toward rotation, greatly increases the torque transmission capabilities of the tower/driveshaft, acting to help prevent excessive twisting of the structure.

36. FIG. 51 Shows a windmill similar to that of the thirty-fourth embodiment, mounted atop a building 80, with the base 2 being substantially embedded within the structure of the building. The hanging distal section 98 of the tower/driveshaft 10 actually extends below the level of the base, with its length limited by the height of the building, minus that of other obstacles below. Such turbines may be installed at any convenient perch, such as hilltops, utility poles, water towers, etc.

37. FIG. 52 illustrates a section of a tower/driveshaft similar to that of the thirty-third embodiment, having both horizontal axis type, and continuous elongate vertical axis type blades. The direction of rotation is counterclockwise, as viewed from above, with the left side coming out of the page, toward the viewer. The horizontal axis type blades 13 serve as armature means to which helically wrapped vertical axis blades 42 are mounted. The elongate vertical axis type blades 42 wrap in a helical fashion, proceeding from bottom to top, in the direction of rotation, connecting the tips of the blades of each horizontal axis rotor with those of the next. These helically wrapped vertical axis blades serve as diagonal lashing means, transmitting torque downward in tension, like the diagonal lashing means 18 of the eighteenth embodiment, shown in FIG. 27. Such a helical configuration of these elongate vertical axis type blades may be a prefabricated feature, or may also result from the natural twisting forces exerted by the wind, as transmitted downward along the length of the tower/driveshaft. The central shaft 10 may, or may not be included, depending on the strength of the blades. The advantage of this helical configuration is that the upper horizontal axis rotors pull the vertical axis blades in the direction of rotation, which then pull the rotors and blades below them, and so on all the way down the tower/driveshaft, thereby transmitting the torque of all rotors down to the lowest rotors and to an armature 16 at the base of the lower section 7 of the tower/driveshaft. A disadvantage is that, along the upper section 9 of the tower/driveshaft, which runs substantially horizontal and parallel to the wind, these substantially vertical axis blades will cease to function in their usual vertical axis mode. Yet still they are exposed to the wind, and indeed present a surface configuration thereto, having, to some extent, the form of an Archimedian screw. Any such aerodynamic rotational forces generated in the manner of a simple Archimedian screw on these elongate helical blades, however, will be counter to the direction of rotation, due to the direction of their helical wrapping.

38. FIG. 53 shows a configuration similar to that of the previous, thirty-seventh embodiment, in that the vertical axis blades wrap in a helical fashion along the length of the tower/driveshaft. The difference is that the direction in which the vertical axis blades wrap around the structure is reversed. These vertical axis blades 43 wrap, in the direction of rotation, from top to bottom, rather than vice-versa, and help to transmit torque downward in compression, rather than in tension. It should be apparent that the helical, vertical axis blades 42 of the previous embodiment, wrapping in the opposite direction, would have the advantage in that they transmit torque in tension, rather than in compression. Nevertheless, any forces generated on these helical blades 43 in the manner of a simple Archimedian screw will be with the direction of rotation, rather than against it.

39. FIG. 54 shows an embodiment similar to the previous, thirty-eighth embodiment, having vertical axis blades, helically wrapped, from top to bottom in the direction of rotation, additionally having torque transmission lashing means 18 which wraps from bottom to top, in the direction of rotation, transmitting torque downward in tension. (This overcomes the problem of the thirty-eighth embodiment, that the torque is only transmitted downward in compression along the blades.)

40. FIG. 55 shows a combination of the thirty-seventh, and the thirty-eighth embodiments, having elongate vertical axis type blades 42, 43 helically wrapped in both directions, together comprising a cylindrical repeating geometric pattern of vertical axis type rotor blades 52, with the repeated geometry comprising a diamond, or trapezoidal shaped, four-sided polygon. The blades that wrap from bottom to top in the direction of rotation 42 serve to transmit torque downward in tension, while the blades that wrap from top to bottom in the direction of rotation 43 will transmit torque downward in compression. The central shaft 10 may or may not be included, as necessary. Horizontal axis rotors having four, five, or more blades may alternatively be utilized, to create a denser, more continuous geometric pattern.

41. Not illustrated If the central shaft of the previous, fortieth embodiment, shown in FIG. 55 is not included, then the entire tower/driveshaft comprises only fluid reactive components, or blades. That configuration, then, forms this forty-first embodiment. Every blade is a strut and every strut is a blade. Along most sections of such a tower/driveshaft, every part can aerodynamically contribute to overall rotation in some way, in any wind, from any direction, depending on how the tower/driveshaft may bend or swing about, and every part helps to physically support the parts above it, as well as to form an integral element of the structure that transmits torque downward.

42. FIG. 56 shows a section of a serpentine windmill that is similar to that of the thirty-seventh embodiment, having helically wrapped vertical axis type blades 42, additionally comprising continuous longitudinal vertical axis type blades 41 that double as a linear lashing and structural means. These help strengthen the structure, greatly adding to its overall bending strength. Of course, the central shaft 10 may or may not be included.

43. FIG. 57 shows a section of a serpentine windmill that is similar to that of the thirty-ninth embodiment, having vertical axis blades helically wrapped from top to bottom in the direction of rotation 43, and torque transmission lashing 18, helically wrapping its way up the tower/driveshaft, from tip to tip of successive horizontal axis rotors 13, in the direction of rotation, from bottom to top. The key new feature of this embodiment, as in the previous embodiment, is the addition of continuous longitudinal vertical axis type blades 41. These aerodynamically shaped blades of course help the structure rotate, and also help strengthen the structure longitudinally, greatly adding to its overall bending strength. Of course, as in other similar embodiments, the central shaft 10 may or may not be included.

44. FIG. 58 shows an embodiment similar to the fortieth embodiment, having vertical axis type blades that wrap helically in both directions 42, 43, with the additional feature of having elongate longitudinal vertical axis type blades 41, as in the previous embodiment. Since these vertical axis type blades run in three directions, they form a latticework of repeating triangles, comprising a cylindrical repeating geometric pattern of vertical axis type rotor blades 52. Such a perforated cylindrical configuration is capable of being made stronger, and therefore taller, than one relying only on a central shaft for its strength.

45. FIG. 59 This forty-fifth embodiment is the latticework tower/driveshaft of the previous, forty-fourth embodiment, comprised of both horizontal axis type rotors 13 and vertical axis type blades, with the vertical axis type blades running longitudinally 41, and wrapping helically in both directions 42, 43, but without the central shaft. Here the entire structure acts together to form the composite cylindrical tower/driveshaft 10, comprising a cylindrical repeating geometric pattern of vertical axis type rotor blades 52. Every strut is a blade and every blade is a strut. Any section of the elongate structure of this tower/driveshaft 10 has fluid reactive surfaces that will act to harness rotational energy from any wind, coming from any direction. This exact geometric configuration is exemplary only, with many variations on this general theme, of an elongate flexible rotating structure comprising both horizontal axis type and vertical axis type fluid reactive blades, being possible. More blades, struts, or lashing means, serving to further tie the structure together, could certainly be added within the scope of the present invention, working from the general principles disclosed herein.

46. FIGS. 60, 61, 62, and 63: This forty-sixth embodiment is similar to the thirty-second embodiment, in that the lower section 7 of the tower/driveshaft 10 is surrounded by vertical axis type rotor blades, attached to armatures 16, while the upper section 9 has only horizontal axis rotors 13. Here the form taken by these vertical axis type blades is a cylindrical, repeating geometric pattern of aerodynamic struts, as in the previous embodiment, with the repeating geometric form comprising this exterior cylinder being the hexagon, rather than the triangle of the previous embodiment. These struts comprise the vertical axis type blades 54, which run at about a 30 degree angle from parallel to the inner shaft, and act to contribute aerodynamically to the rotation of the structure, and the circumferentially oriented, aerodynamically shaped struts 51, which are substantially perpendicular to the inner shaft, and therefore contribute little, if any, aerodynamic forces to the overall rotation, but nevertheless provide structural integrity. The hexagons may alternatively run at a different angle, such as, for example, rotated by thirty degrees from those described above. Note that the armatures 16 are illustrated as being aerodynamically shaped as horizontal axis type rotors, although this is not a necessary characteristic of this embodiment.

47. (Not illustrated) The forty-seventh embodiment is the same as the previous, forty-sixth embodiment shown in FIGS. 60–63, except that the hexagons do alternatively run at a different angle, rotated by thirty degrees from those described above. In this embodiment, the aerodynamically shaped struts run both longitudinally, and at an angle of 60 degrees thereto, to form regular hexagons. Some other angle of offset for these non-longitudinal struts, such as 45 degrees, is also possible, to form non-regular hexagons. All struts, to some degree, act as vertical axis type blades, since none is exactly circumferential in direction. Other possible configurations for such an exterior cylindrical shell of vertical axis type blades include, but are not limited to, those of any honeycomb lattice type tube configuration, such as those exemplified by "buckytubes" or "carbon nanotubes", etc.

48. FIG. 64 In this embodiment the cylindrical latticework configuration of vertical axis blades 54 surrounding the lower section 7 is comprised of repeating equilateral triangles, alternating between pointing up and down. These triangles are comprised of aerodynamic struts, including vertical axis type blades 54 oriented at about 30 degrees from parallel to the central shaft, and circumferentially oriented struts 51, running substantially perpendicular to the central shaft. These vertical axis blade struts 54, when considered as connected from end to end, also collectively form continuous elongate helically wrapped vertical axis blades 42 and 43, as in the thirty-seventh through forty-fifth embodiments. The helically wrapped blades 42 run from bottom to top in the direction of rotation, transmitting torque down the tower/driveshaft in tension. The helically wrapped blades 43 run from top to bottom in the direction of rotation, transmitting torque down the shaft in compression. Again, other angles are possible for such a pattern, either collectively, or referring to the three directions of its constituent struts, relative to one another.

Lift Augmentation for the Tower/Driveshaft:

In previous embodiments, we have discussed how certain of the horizontal axis rotors, depending on the position, may generate some lift, in the manner of a gyroplane. This lift, and more predominantly the stiffness of the tower/driveshaft, as supported by the cantilevered bearing means 5, have been the only forces holding the structure aloft until this point. In the following embodiments we outline means of augmenting these forces, further helping to keep the structure of the tower/driveshaft and its attached aerodynamic blades aloft.

49. FIG. 65 In this forty-ninth embodiment, we introduce the concept of a downwind cantilevered tail means 22, which functions like the tail of an airplane. The tail is attached in a cantilevered manner, with rotational freedom, to the upper section 9 of a tower/driveshaft 10 similar to that of the first embodiment, by cantilevered boom rotational bearing means 26. A tail boom 23, extends downwind from the bearing 26. At the far end of the tail is lifting surface 24 (like the horizontal stabilizer of an airplane) and passive downwind tail orientation means 25 comprising a substantially vertical surface (like that of the vertical stabilizer on an airplane). Any functional equivalent, such as a V-tail, a flexible tail, an inflated tail, or any other type of tail means, is to be considered within the scope of this invention.

As previously discussed, when a tower/driveshaft 10, with its attached horizontal axis rotors 13, begins to be bent downwind, and the axes of the rotors 13 are tilted back from vertical, the rotors, once spinning, begin to produce lift, as does a gyrocopter. The planar disk of each spinning rotor forms a virtual "lifting surface", somewhat like a kite, or like the wing of a tethered airplane, or glider, or more specifically, like a tethered helicopter in autogyro mode. This lift helps to support the tower/driveshaft against gravity. As the tower/driveshaft becomes increasingly bent over, however, the angle of attack at which the disk of each rotor encounters the wind increases. While the rotor 13 produces more power when so tilted back, at a certain point it will begin to provide less vertical lifting force to the tower/driveshaft as a whole, as when an airplane wing "stalls".

This tail 22 serves the same purpose as the tail of an airplane, to influence the "angle of attack" of the rotor 13, as if the rotor were a wing, and thereby to substantially oppose its tendency toward "stalling"; The lift provided by the tail's lifting surface 24 tilts the rotors 13 forward by applying a forward lever arm to the structure as a whole, (as does the tail of an airplane when the control yoke is pushed forward) as shown by the curved arrows.

In this embodiment a single tail 22 guides the distal section 98 of the tower/driveshaft 10, and its coaxially attached upper rotors 13, into a more forward angle of attack. These upper rotors then, guided by the forward pitch rotation exerted by the tail 22, help to pull the entire tower/driveshaft forward, tilting the rotors below into a more forward position as well, with these rotors further influencing the rotors below to pull forward on the rotors below them, and so on down the line. To some extent, just as a train follows the engine, the lower rotors are brought forward toward a less extreme angle of attack. The column of rotors flies like a stack of kites, guided by the single tail 22.

50. In this, the fiftieth embodiment, illustrated in FIG. 66, multiple tails 22 of the previous embodiment are rotationally attached at intervals, by means of cantilevered boom rotational bearing means 26, along the upper section 9 of the tower/driveshaft, between the rotors. Again, the column of rotors flies like a stack of kites, with each vertical surface 25 serving to insure that the tail is blown downwind of the tower/driveshaft, and each horizontal lifting surface 24 serving to elevate that tail, thereby in the aggregate lifting the entire upper section 9 of the tower/driveshaft, and applying a forward pitching moment thereto that serves to help elevate it, keeping the tower/driveshaft from being blown all the way over. The base 2 shown, similar to the base of the third embodiment, was chosen for the sake of example, and need not necessarily be associated with this embodiment over any other base.

51. FIG. 67 Here an entire lifting body 31, rather than just a tail, is attached to the distal end of the upper section 9 of the tower driveshaft by means of suspension bearing means 33. The lifting body 31 is aerodynamically lifted by the force of the wind, and flies like a kite, or tethered glider, helping to support the tower/driveshaft against gravity, as well as helping to "steer" or guide the rotors 13 below forward into a better lifting orientation, having less angle of attack.

52. FIG. 68 This embodiment is a combination of the previous two, having both the multiple tails 22 of the fiftieth embodiment, as well as the lifting body of the previous, fifty-first embodiment. Each rotor/tail combination acts as a lifting body, with the whole assembly additionally pulled upward by the dedicated lifting body 31. It is easy to see that many combinations of tails and/or lifting bodies could be used, within the scope of the present invention. The base 2, similar to that of the fourth embodiment, having the load 6 vertically sandwiched between the two bearings 11, was chosen as an example; alternative base configurations could be used within the context of this embodiment.

53. In FIG. 69 the cantilevered tail boom 23 is extended to the upwind side of cantilevered boom attachment rotational means 26, forming cantilevered nose boom 28. A linear tension transmission means 29, such as, for example, a cable, attached sequentially to the tip of each nose boom, pulls downward on the nose booms, pulling the entire tower/driveshaft forward, thereby helping to elevate it, in addition to decreasing the angle of attack presented by the disks of the spinning rotors, causing the rotors to migrate upwind. This linear tension transmission means 29 may have a substantial stiffness in the region proximate the rotors, to avoid entanglement therewith. The passive downwind tail orientation means 25, comprising the "vertical" surface on each tail, insure that the tails are held in a downwind position, so that the nose booms remain projecting upwind. In FIG. 70 we can see that the tension on linear tension transmission means 29 is provided by tension adjustment means 30, here illustrated as a simple winch, located at the base 2. A turntable base 35, similar to that of the sixteenth embodiment, allows the entire assembly to passively track the wind.

54. FIG. 71 shows a combination of the previous, fifty-third embodiment, having cantilevered tails 22 with forward projecting cantilevered nose booms 28, and the fifty-first embodiment, having a lifting body 31 attached to the tower/driveshaft by suspension bearing means 33. The tension transmission means 29 is attached to the cantilevered nose booms 28, and the nose of the lifting body 31, and thereby adjusts the attitude of not only the tails, but of the lifting body as well. The entire assembly may be "flown" in the manner of a kite, or more specifically, a stack of kites.

Figure 72:
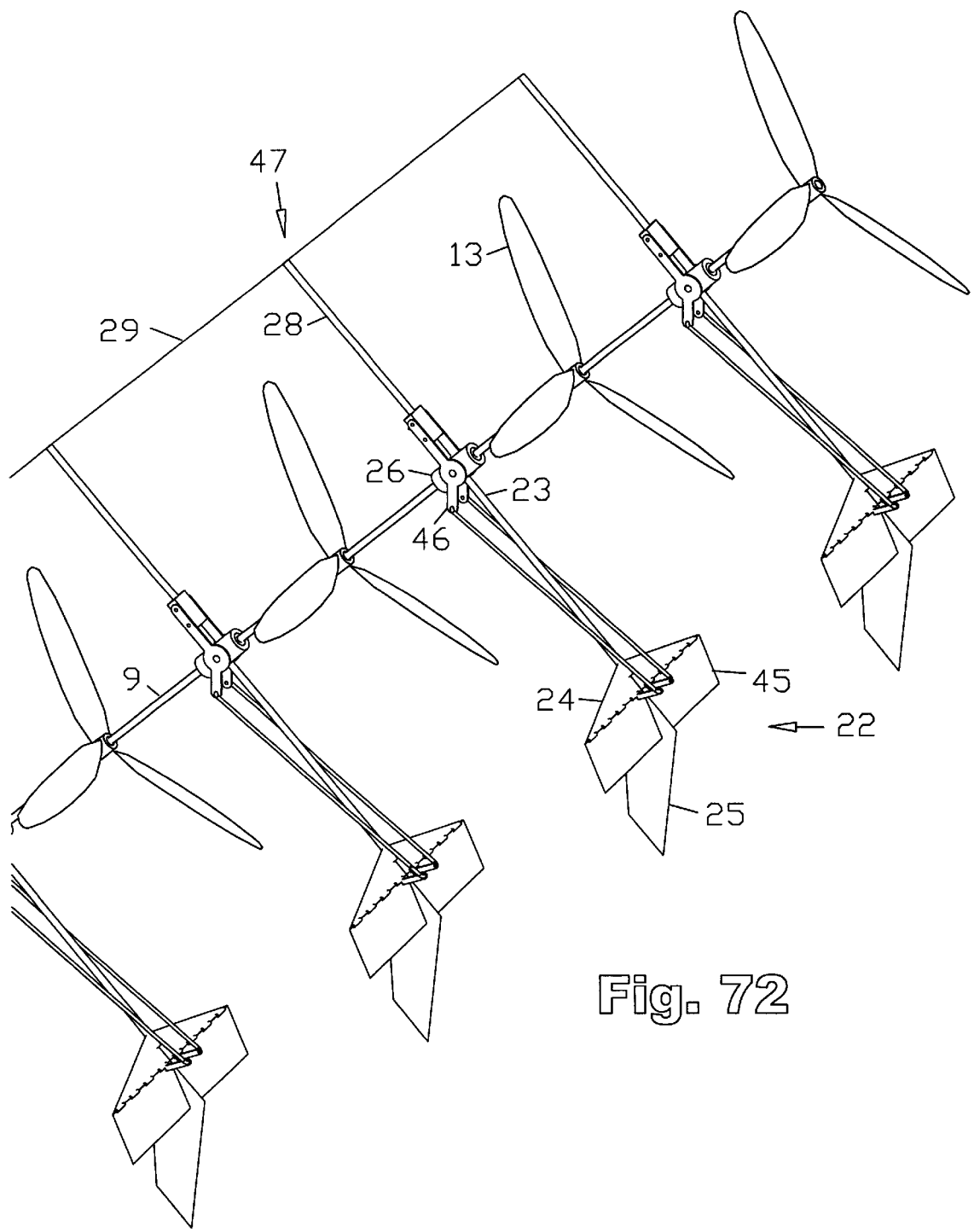
FIG. 72 is a closeup view of the upper section of the tower/driveshaft of the fifty-fifth embodiment having cantilevered tails with adjustable elevator surfaces.

55. FIG. 72 In this embodiment, similar to the fifty-third embodiment, the tail 22 further comprises an adjustable elevator surface 45, which is controlled by an actuating mechanism 46, with the particular mechanism illustrated pivoting at cantilevered boom rotational bearing means 26. This actuating mechanism, here comprising pivots and push rods, pivotably supports the nose boom, and is responsive to the angle thereof. The tension transmission means 29 pulls downward on the cantilevered nose booms 28, pivoting the actuating mechanisms 46, which adjusts the elevator surface 45. These components, along with the tension adjustment means 30, located proximate the base (as shown in FIG. 70) together comprise elevator control means 47. The control means 47 and actuating mechanism 46 could comprise alternative methods and apparatus than that shown, be they electric, hydraulic, pneumatic, electronic, radio controlled, etc., within the scope of the present invention.

Figure 73:
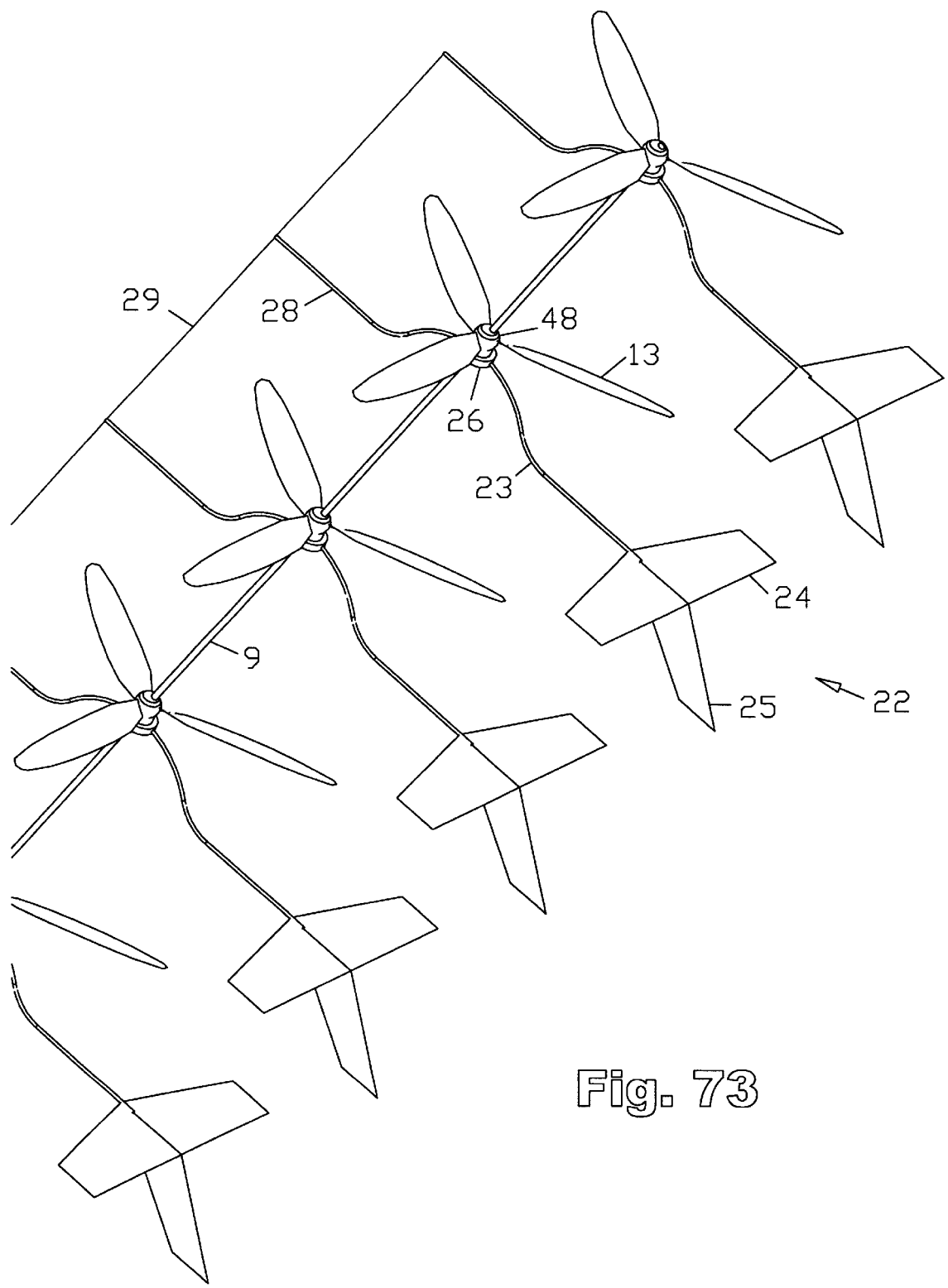
FIG. 73 is a closeup view of the upper section of the tower/driveshaft of the fifty-sixth embodiment having tilting rotors rotationally coupled to tilting cantilevered tails.

56. FIG. 73 This fifty-sixth embodiment is similar to the fifty-third, having tails 22 and projecting cantilevered noses 28 which are pulled downward by a tension transmission means 29. Each rotor 13 turns with the upper section 9 of the tower/driveshaft, being rotationally coupled thereto, but is allowed to tilt, being mounted on a Tilting Hub 48. Each cantilevered boom rotational bearing means 26 is similarly mounted to this tilting hub and so tilts with the rotor, while allowing the boom to rotate independently thereof, so the tails can remain downwind. So the rotor turns with the tower/driveshaft, but tilts with the nose and tail. Therefore, downward tension on the tension transmission means 29 can easily tilt both the rotors and their attached tails forward, reducing their angle of attack, without having to pull the entire tower/driveshaft forward against the force of the wind, with the limited leverage offered. Like a kite that is tilted forward, reducing its angle of attack, each rotor/tail combination will have an increased tendency, by its lift, to pull the tower/driveshaft upward and toward the wind. Through tension applied to tension transmission means 29, the entire tower/driveshaft may be caused to move to a more windward position, to fly, like a string of kites, to a position more overhead and less downwind, with less tension on tension transmission means 29 required than in the fifty-third embodiment. By using the wind itself to help lift the tower/driveshaft, strain on the tower/driveshaft 10, base 2, and tension transmission means 29 are also reduced.

57. FIGS. 74 and 75 show an embodiment similar to the fifty-first embodiment, with the upper section 9 of the tower/driveshaft suspended from a lifting body by means of suspension bearing means 33. The difference here is that this lifting body 32 is buoyant, in the fluid in which it is suspended; in this example, it is inflated with a buoyant gas such as helium and/or hydrogen, to be buoyant in the atmosphere. This helps to elevate the tower/driveshaft even in low wind or zero wind conditions. The buoyancy may augment, or largely replace, the stiffness of the tower/driveshaft itself as a means of supporting the entire upper section 9 of the tower/driveshaft and its attached horizontal axis rotors 13. Such an inflatable aerodynamic lifting body can also simply be filled with air, or a mixture of gases, to be lightweight in the atmosphere, even if not fully buoyant. Alternatively, such a buoyant lifting body may simply comprise a bag, balloon, or other shape, whether preconfigured or indeterminate, that contains the buoyant gas without providing significant aerodynamic lift. The fraction of lift provided by buoyancy versus aerodynamic forces of a lifting body will therefore vary depending on the exact configuration, as well as the wind speed.

58. FIGS. 76, 77, and 78 In this fifty-eighth embodiment, the actual rotor blades 12 themselves are buoyant, inflated with a lightweight gas, in an embodiment otherwise similar to the first embodiment. Torque is transmitted down the length of the tower/driveshaft 10. The closeup view of the base in FIG. 78 shows a typical configuration, similar to that of the first embodiment, with the lower section 7 of the tower/driveshaft extending upward from cantilevered bearing means 5, comprising an axle 15, which is rotatably supported by two bearings 11. The low speed, high torque rotation is converted to a higher speed rotation required by the load 6, via the ratio gearing provided in this case by power takeoff means 14. This lighter-than-air, downwind turbine remains aloft in zero wind conditions.

59. FIG. 79 This fifty-ninth embodiment is similar to the previous embodiment, having horizontal axis type rotors 13, whose buoyant blades 12 are inflated with a gas such as helium or hydrogen, and so float in the air. In this embodiment the rotors are held up by their buoyancy and aerodynamic lift only, not by the stiffness of the tower/driveshaft per se. The radial loading on cantilevered bearing means 5 is thus reduced. The base 2 comprises a non-rotating directionally compliant support means 60, here comprising, as an example, a gimbal mounting frame. Such a gimbal-equipped base is free to directionally track the tower/driveshaft, while not itself rotating, allowing the power to be drawn off by means of continuous power conduit means 66.

60. FIG. 80 This sixtieth embodiment is similar to the fifty-seventh embodiment, with the upper section 9 of the tower/driveshaft, and its attached horizontal axis type rotors being suspended by a buoyant lifting body 32 via suspension bearing means 33 (not visible, see FIG. 75), while also incorporating the non-rotating directionally compliant support means 60, or gimbal mount, of the previous embodiment. This downwind machine stays aloft even in low or no wind conditions.

Figure 81:
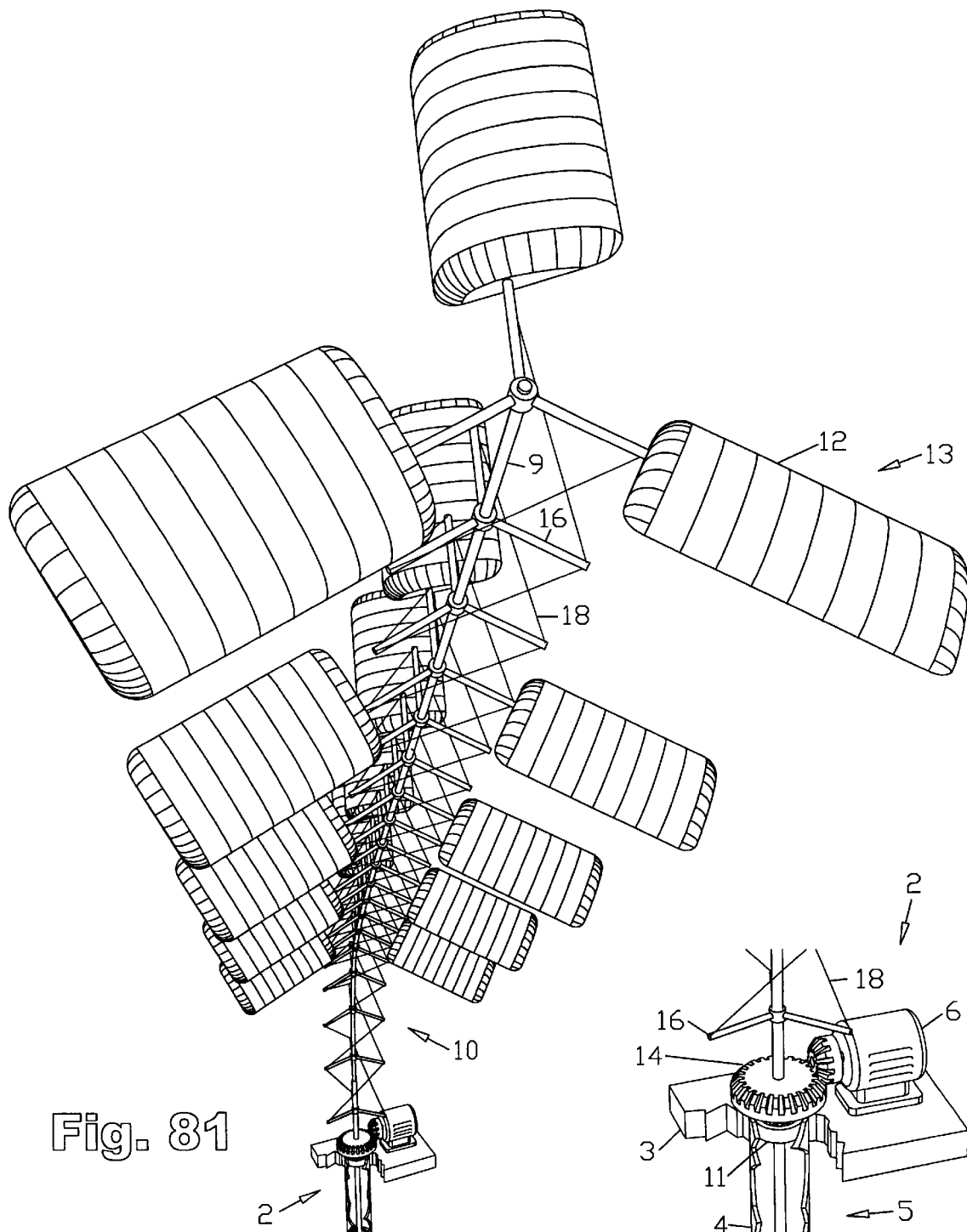
FIG. 81 is a downwind perspective view from above, looking down the tower/driveshaft of the sixty-first embodiment, comprising multiple horizontal axis type rotors having buoyant blades, and helical torque transmission lashing sequentially connected to multiple armatures.
Figure 82:
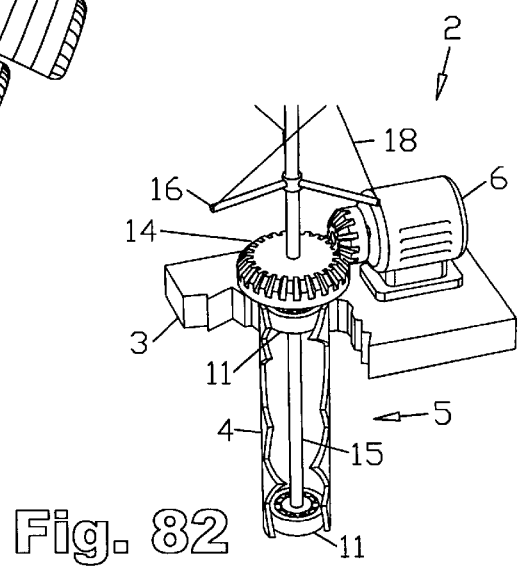
FIG. 82 shows a closeup view of the base of the sixty-first embodiment, showing the lashing attached to the lowest armature.

61. FIGS. 81 and 82 This sixty-first embodiment is similar to the fifty-eighth embodiment, having buoyant rotor blades, with the tower/driveshaft projecting upward from the base 2, rotationally supported by cantilevered bearing means 5, which comprises two bearings 11 at either end of a vertical axle 15. A series of armature means 16 are coaxially mounted to the tower/driveshaft, with helical torque transmitting lashing means 18, wrapping sequentially from tip to tip of the armatures, from bottom to top, in the direction of rotation, helping to transmit torque downward along the tower/driveshaft, as in the eighteenth embodiment, shown in FIG. 27.

62. FIG. 83 shows an embodiment similar to the fifty-ninth embodiment, having buoyant horizontal axis type rotor blades 13 and a directionally compliant base 60, having the additional feature of helical torque transmission lashing means 18, wrapping sequentially from the tip of one blade to the tip of the next, and connecting at its lower end to an armature means 16, mounted coaxially to the lower section of the tower/driveshaft 10, as in the eighteenth, and previous embodiments.

63. FIG. 84 shows an embodiment similar to the sixtieth embodiment, having multiple horizontal axis type rotors, with the tower/driveshaft suspended from a buoyant lifting body 32, and having a directionally compliant base, further comprising the additional feature of helical torque transmission lashing means 18, wrapping sequentially from the tip of one blade to the tip of the next, as in the eighteenth, and previous embodiments.

64. FIG. 85 shows the sixty-fourth embodiment, an embodiment similar to the sixty-second embodiment, having buoyant horizontal axis rotors, and a vertically cantilevered flexible shaft comprising the lower, and middle sections 7, 8 of the tower/driveshaft, except that this embodiment has no actual central shaft comprising the upper section 9 of the tower driveshaft, since, with the rotors being buoyant, an actual central shaft is not necessary to support the rotors. Nevertheless, the functions served in previous embodiments by this central shaft of the upper section 9, namely supporting the rotors and transmitting torque, are yet fulfilled by the buoyancy of the rotors, the aerodynamic forces on them, and the lashing 18. Therefore in a virtual sense, the upper section 9 of the tower/driveshaft still exists, as a self elevating, wind harvesting, rotating elongate structure, even without the central shaft.

65. FIGS. 86 and 87 show the sixty-fifth embodiment, having a buoyant lifting body 32, horizontal axis type rotors 13, and a tower/driveshaft that projects vertically from the base 2, similar to the fifty-seventh embodiment. The difference is that in this embodiment, like the previous embodiment, the central shaft comprising the upper section 9 of the tower driveshaft has been largely removed, with the rotors instead being supported by the torque transmission lashing 18. Only the uppermost and lowermost rotors are still attached to a solid central shaft. The uppermost rotor depends from the distal section 98 of the tower/driveshaft, which is itself rotationally supported from the buoyant lifting body 32 by suspension bearing means 33. The lowermost rotor is coaxially mounted to the end of the middle section 8 of the tower/driveshaft. The rotors in between are suspended by the lashing means 18, which also rotationally transmits their torque downward to the lowest rotor, which acts as an armature in conveying that torque to the middle section 8 of the tower/driveshaft.

66. FIG. 88 shows the sixty-sixth embodiment, an embodiment similar to the sixty-fourth embodiment having horizontal axis type rotors with buoyant blades, and no central shaft, but with the base 2 comprising a non-rotating directionally compliant support means 60, here comprising a gimbal mounting frame, which can track the direction of the wind without itself rotating, so that power can be drawn off by means of continuous power conduit means 66. Torque is transmitted from upper rotors downward by torque transmission lashing 18, to an armature means 16, which drives the truncated lower section 7 of the tower/driveshaft, being coaxially mounted thereto.

67. FIG. 89 shows the sixty-seventh embodiment, an embodiment similar to the sixty-fifth embodiment having horizontal axis type blades, a buoyant lifting body and no central shaft, but with the base 2 comprising a non-rotating directionally compliant support means 60, as in the previous embodiment, here comprising a gimbal mounting frame, which can track the direction of the wind without itself rotating, so that power can be drawn off by means of continuous power conduit means 66. Torque is transmitted from upper rotors downward by torque transmission lashing 18, to an armature means 16, which drives the truncated lower section 7 of the tower/driveshaft, being coaxially mounted thereto.

68. FIG. 90 shows the sixty-eighth embodiment, similar to the sixty-second embodiment, having buoyant horizontal axis type rotor blades 13 and a directionally compliant base 60, with helical torque transmission lashing means 18, wrapping sequentially from the tip of one blade to the tip of the next, and connecting at its lower end to an armature means 16, mounted coaxially to the lower section 7 of the tower/driveshaft 10, as in the eighteenth embodiment. This embodiment additionally comprises longitudinal linear lashing means 20, running from rotor tip to rotor tip, substantially parallel to the central shaft, to lend stiffness, or rigidity, to the structure as a whole. Additionally, the directionally compliant support means 60 further comprises a means for directional bias 61, which may be passive, and biased toward vertical, as in resilient or spring-loaded, or powered, as in actively controlled. This directional bias means 61, when exerting a force tending to aim the shaft toward vertical, acts to physically oppose the force of the wind blowing the tower/driveshaft over, as well as reducing the angle of attack with which the spinning rotors encounter the wind, which also helps to elevate the tower/driveshaft.

69. FIG. 91 This sixty-ninth embodiment is similar to the previous embodiment, except with the central shaft eliminated, as in the sixty-fourth embodiment. The tower/driveshaft 10 nonetheless still exists, in the virtual sense, even without the central shaft, being comprised of the buoyant rotors, the longitudinal lashing means 20, and the helical lashing means 18, as held in a rotationally stable elongate configuration by the buoyancy of the rotors and the force of the wind against them, as constrained by the tension of the lashing means. The lashing means in this case, particularly the helical lashing 18, may have elastic properties, or be provided with elastic means, such as that of the seventy-third embodiment, to allow the tower/ driveshaft structure to deform in a manner that would resemble a parallelogram if viewed from the side. The attitude, or pitch of the rotors may thereby be affected by the influence of the means for directional bias 61 toward vertical, as transmitted through the lower section 7 of the tower/driveshaft, to the armature 16, to the longitudinal lashing means 20, reducing the angle of attack of the rotors 13, thereby helping to keep the structure as a whole elevated.

Figure 92:
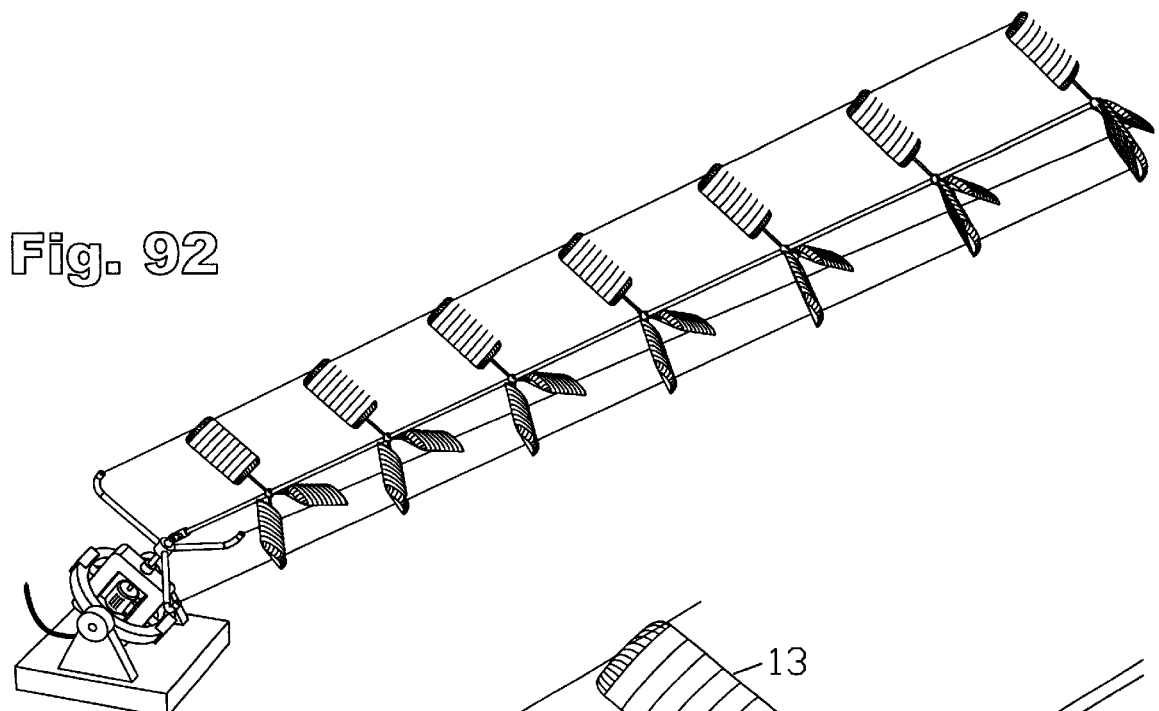
FIG. 92 shows a downwind side perspective view from above, of the seventieth embodiment, having horizontal axis type rotors, which may be buoyant, mounted on tilting hubs, steerable by elongate lashing attached to an armature, rotationally supported by a directionally compliant base, as influenced by a means for directional bias.
Figure 93:
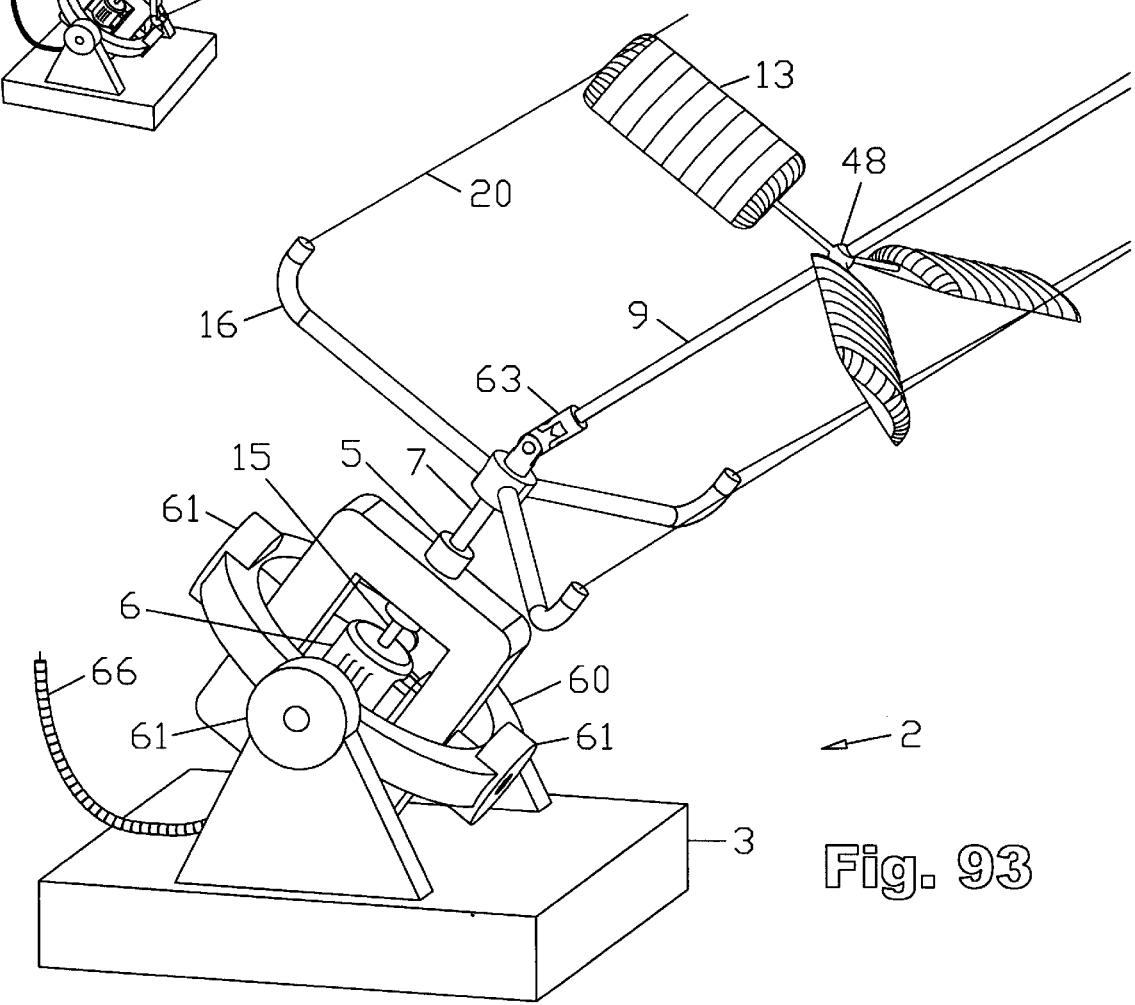
FIG. 93 is a closeup view of the base of the seventieth embodiment.

70. FIGS. 92 and 93 This seventieth embodiment is similar to the previous two, in that the base 2 has a directionally compliant support means 60, with a means for its directional bias 61, whose bias toward vertical is transmitted to the rotors by means of armature 16 and longitudinal lashing means 20. The horizontal axis type rotors shown are buoyant, so as to remain aloft in low or no wind conditions, but could also be non-buoyant, within the scope of this embodiment. The central shaft of the upper section 9 of the tower/driveshaft is retained, with the torque being substantially transmitted thereby. The key difference of this embodiment from the previous one is that the linear continuity of the tower/driveshaft is broken by directionally flexible rotational coupling means 63, here comprising a universal joint, and that each rotor is rotationally coupled to the shaft 9 by a tilting hub 48, allowing it freedom to tilt in relation to the shaft. The directional flexibility that this universal joint 63 provides for the upper section 9 of the tower/driveshaft, relative to the armature means 16, is matched by the directional flexibility afforded to each rotor relative to the upper section 9 of the tower/driveshaft, by the tilting hubs 48. The net result is that the column of buoyant, rotating, horizontal axis type blades may be "flown" in the manner of a stack of kites, with the armature 16 acting as a yoke to control the angle of attack that the rotors 13 present to the wind. This angle of attack may be biased in any direction, independent of the direction of projection of the tower/driveshaft, within the degree of freedom allowed by the universal joint 63, and the tilting hubs 48. Since the tower/driveshaft is not held up by its own stiffness, but rather by buoyant and/or aerodynamic forces, the lower section 7 of the tower/driveshaft therefore exerts less radial loading on the cantilevered bearing means 5, which allows that bearing means to be less robust. Note that in this embodiment, the upper section 9 of the tower/ driveshaft is co-rotational, but not strictly coaxial with the load, projecting at an angle thereto, while the rotors are also co-rotational with the load, with their axes of rotation being substantially parallel to that of the armature, which in this case is the same as that of the load.

71. FIGS. 94 and 95 The seventy-first embodiment is similar to the previous embodiment, with the angle of the armature 16 determining the angle of attack of the buoyant, horizontal axis rotors 13 through linear lashing means 20, except that here the load 6 is coaxial with the upper section 9 of the tower/driveshaft, with the angle between the rotational axis of the armature 16 and the tower/ driveshaft being accomplished by a directionally flexible non-rotating coupling means 64, which as illustrated appears similar to the universal joint 63 of the previous embodiment, but is non-rotating, and therefore is subject to less wear and energy loss through friction. This directionally flexible non-rotating coupling means 64 supports a non-rotating load mount means 65, providing a rotationally stable, directionally flexible mounting means for the load 6. So the load is allowed to follow the direction of the tower/driveshaft and remains coaxial thereto.

Looking somewhat like, and serving part of the function of, the lower section 7 of the tower/driveshaft of other embodiments, is the bearing support means 4, herein illustrated as a simple post projecting from the gimbal mount 60. The armature rotational bearing means 70 is retained by bearing support means 4, and supports the armature 16 in a rotationally free, yet angularly definitive manner. The angle at which the armature rotates is then influenced by directional bias means 61, which controls the directional orientation of the non-rotating directionally compliant mounting means 60 (the gimbal mount). This bearing support means 4 does not rotate, but extends entirely through the armature bearing 70, then forming a non-rotating point of attachment for the directionally flexible non-rotating coupling means 64, supporting non-rotating mount means 65, for mounting the load 6. The resulting fluent power is drawn off by means of continuous power conduit means 66, which is conveniently routed down the center of the mounting means 4, which penetrates the armature bearing 70. Here the load is a generator, so the conduit means 66 is an electric cable.

The directionally flexible non-rotating coupling means 64 of this embodiment has less friction, and is therefore more efficient, and requires less maintenance than the directionally flexible rotational coupling means 63 of the previous embodiment.

While buoyant rotors are shown, since they allow the structure to remain aloft during periods of low or no wind, non-buoyant rotors could also be used, within the scope of this embodiment.

72. FIGS. 96 and 97 This seventy-second embodiment is similar to the seventieth embodiment, comprising a directionally compliant non-rotating support means 60 (gimbal mount), provided with means for directional bias 61, causing an attached rotating armature 16 to steer and affect the angle of attack, as well as the horizontal angle, of the buoyant horizontal axis type rotors 13 through a linear means. The directionally flexible rotational coupling means 63, here shown as a simple universal joint, allows angular freedom between the upper section 9 of the tower/driveshaft and the axis of rotation of the armature 16. And the tilting hubs allow angular freedom between this upper section 9 and the attached horizontal axis rotors 13. The linear lashing means 20 of the seventieth embodiment is replaced by linear vertical axis type blades 41, which not only act to connect the arms of the armature 16 with the tips of the horizontal axis type rotor blades 12, thereby allowing the armature 16 to affect the angle of attack of each horizontal axis rotor 13, but also act to aerodynamically contribute to the rotation of the tower/ driveshaft as a whole, by harvesting wind energy as vertical axis type rotor blades. Even though the vertical axis type blades 41 are not strictly vertical, but are at the same angle to vertical as is the upper section 9 of the central shaft, their direction of travel is more horizontal than their direction of projection, being substantially parallel to the plane of rotation of the armature 16. These vertical axis type blades 41 may also be buoyant, filled with a lighter than air gas, to help elevate the structure. Torque is transmitted down the length of the central shaft comprising the upper section 9 of the tower/driveshaft. The vertical axis type rotors 41 are illustrated as having a break at each horizontal axis rotor. They could equally well be configured as continuous, unbroken, very long blades, (see FIG. 100) having the stiffness lent by that continuity. Therefore, torque may also be transmitted, or partially transmitted by the vertical axis rotors 41, either through their stiffness, through simple tension, or both. If the vertical axis type rotors have sufficient strength, the central shaft of the upper section 9 of the tower/driveshaft may be omitted, within the scope of this embodiment.

73. FIG. 98: This seventy-third embodiment is similar to the previous, seventy-second embodiment, having buoyant horizontal axis rotors mounted on tilting hubs 48, controlled by a tilting armature 16, through elongate vertical axis type blades 41, which may be substantially continuous, running from tip to tip of the horizontal axis rotors 13. The difference in this embodiment is that torque is transmitted by torque transmission lashing means 18, which wraps helically from bottom to top in the direction of rotation, running substantially from tip to tip of the horizontal axis type rotor blades 12.

When tilted relative to the shaft, the axes of rotation of the horizontal axis rotors are mutually parallel, but offset from one another. As the rotors turn simultaneously, the distance from the tip of one rotor, to the next sequential tip, in the direction of rotation, of the next rotor, will vary, with the magnitude of variance dependent on the angle of tilt. To maintain a stable configuration, it is desirable that the torque transmission lashing 18 be able to vary in length, while maintaining tension, as it completes each revolution, in order to accommodate this constantly changing distance. Therefore each torque transmission lashing means 18 is provided with slack uptake means 59 here comprising an elastic or resilient spring, to accomplish this adjustment in length, while maintaining tension. This allows the other components to more closely maintain their original configuration as they rotate, since their need to deform in order to accommodate the changing configuration as the shaft rotates is reduced.

74. FIG. 99 This seventy-fourth embodiment is similar to the previous, seventy-third embodiment, having horizontal axis type rotors 13 with buoyant blades, with elongate vertical axis blades 41 extending longitudinally from blade tip to blade tip of the horizontal axis rotors 13, connecting sequentially to each, and is likewise provided with a torque transmission lashing means 18, which wraps helically from bottom to top in the direction of rotation. In this embodiment however, all of the rotor blades, including both horizontal and vertical axis blades, comprise lightweight, inflated structures. Optimally, they are buoyant, meaning for atmospheric use on Earth that they are inflated with helium and/or hydrogen. (For aquatic use, they need be less dense than water, etc.) This buoyancy helps to maintain the altitude of the tower/driveshaft 10 structure during use, augmenting any overall lift provided by the wind, and allows this structure to conveniently remain airborne during periods of low or no wind. There is no central shaft in this embodiment, to save weight, with the configuration being naturally stable in a downwind orientation, held in shape by its bouyancy, the rigidity of the rotor blades, the force of the wind, and tension on the lashing. The non-rotating directionally compliant support means (gimbal mounting frame) 60 allows the armature 16 to track the downwind assembly of blades and lashing that comprises the tower/driveshaft. The optionally included directional bias means 61 may be used to exert some control over the angular orientation of the horizontal axis type rotors. The torque transmission lashing 18 may optionally be provided with slack uptake means 59, as in the previous embodiment.

75. FIG. 100 The seventy-fifth embodiment is similar to the previous, seventy-fourth embodiment, but with the inclusion of the central shaft comprising the upper section 9 of the tower/driveshaft, and no torque transmission shown, though such could optionally be included within the scope of this embodiment. As in the previous embodiment, buoyant, elongate vertical axis type blades 41 extend longitudinally from blade tip to blade tip of the horizontal axis rotors 13, also having buoyant blades, terminating at an armature means 16. Without such lashing, the torque is transmitted by the central shaft of the upper section 9, by the elongate vertical axis type blades 41, or by a combination of both. Any torque transmission along the vertical axis type blades may be through simple tension, through the rigidity of the elongate blades 41, or by a combination of both.

76. FIG. 101 This seventy-sixth embodiment is similar to the seventy-fourth and seventy-fifth embodiments, having horizontal axis type rotors 13 with buoyant blades, with buoyant elongate vertical axis type blades 41 extending longitudinally from blade tip to blade tip of the horizontal axis rotors 13. Therefore, for atmospheric use, all of the rotor blades, including both horizontal and vertical axis blades, comprise lightweight, inflated structures, filled with H or He. In this embodiment, however, there is no torque transmission lashing, but instead, the elongate vertical axis blades 42 wrap in a helical configuration, from bottom to top in the direction of rotation, like those of the thirty-seventh embodiment, or like the helical lashing means 18 of previous embodiments, helping to transmit torque downward in tension. This helical deployment may be preconfigured, may be caused to occur due to the aerodynamic forces that naturally tend to twist the structure, or some combination of both. As in previous embodiments, these vertical axis type blades, being helically wrapped, and therefore meeting the oncoming wind at an angle, nevertheless serve aerodynamically to help the structure rotate, in a manner similar to the blades of a Darrieus type wind turbine. Note that the downwind helical configuration of these vertical axis blades may also cause certain aerodynamic forces to be generated in the fashion of a simple Archimedian screw, and that, due to the direction in which they helically wrap around the tower/driveshaft, any such forces in this embodiment will be counter to the direction of rotation.

Figure 102:
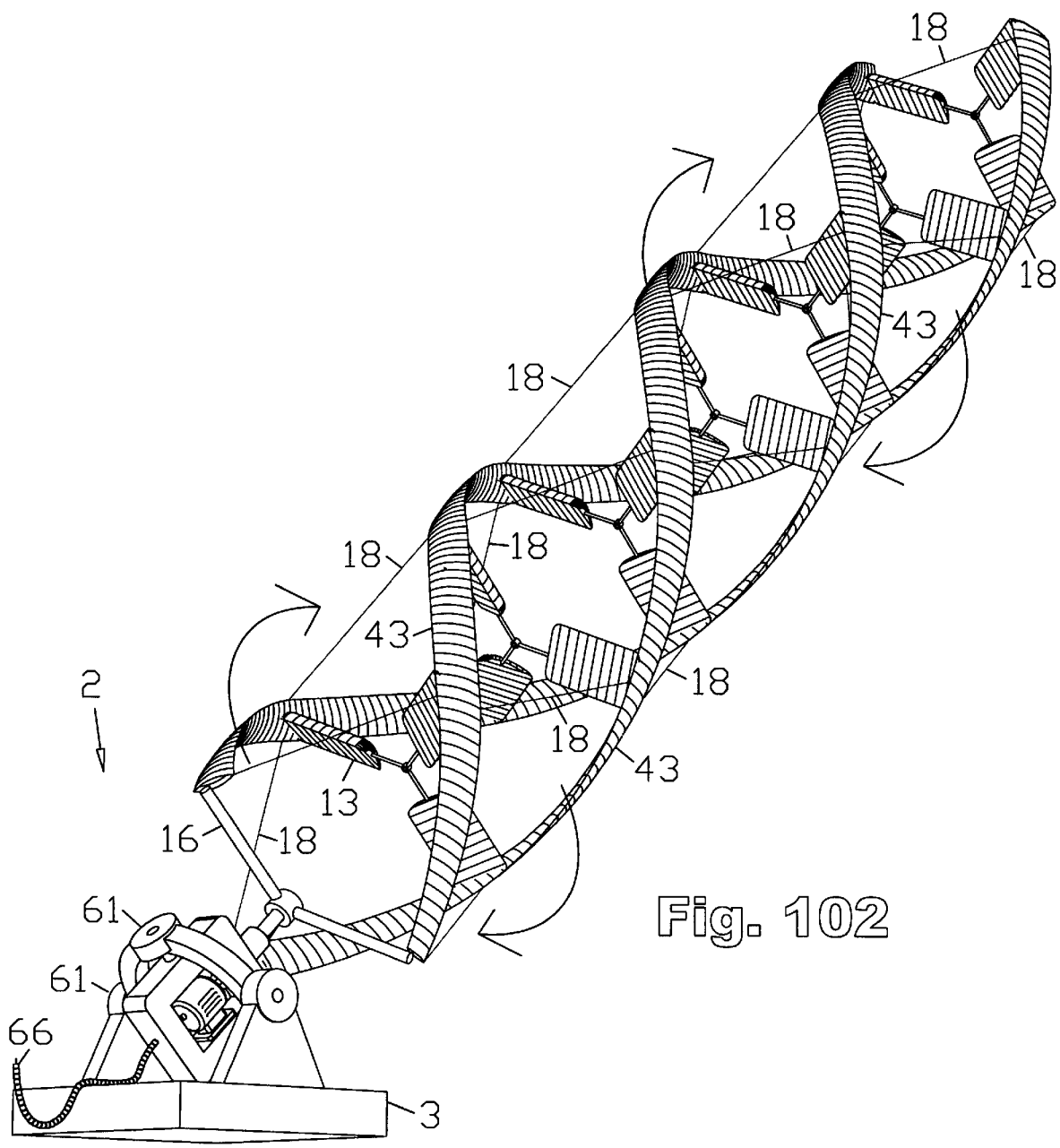
FIG. 102 shows an upwind side perspective view from below, of the seventy-seventh embodiment having buoyant horizontal axis type rotors connected by buoyant, elongate reverse helically wrapped vertical axis type blades, torque transmission lashing, and a directionally compliant base.

77. FIG. 102 This seventy-seventh embodiment is similar to the previous, seventy-sixth embodiment, having buoyant, helically wrapped, vertical axis type blades 43, connecting the tips of buoyant, horizontal axis type rotor blades, except that in this embodiment, they wrap in the opposite direction, running from top to bottom in the direction of rotation, as in the thirty-eighth embodiment. As in the seventy-fourth embodiment, helical torque transmission lashing means 18 serves to transmit torque downward to the armature means 16. This configuration of the tower/driveshaft is essentially the structure of the thirty-ninth embodiment, in an inflated, buoyant form; The entire structure of the tower/driveshaft floats, or is at least made significantly lighter due to this inflated construction. Note that the downwind helical configuration of these vertical axis blades 43 may also cause certain aerodynamic forces to be generated in the fashion of a simple Archimedian screw, and that, due to the direction in which they helically wrap around the tower/driveshaft, any such forces in this embodiment will be in the direction of rotation, helping to turn the shaft.

78. FIG. 103 This seventy-eighth embodiment is similar to the seventy-sixth embodiment, having buoyant, vertical axis type blades 42, helically wrapped from bottom to top in the direction of rotation, sequentially connecting the tips of buoyant, horizontal axis type rotor 13 blades, but with the inclusion of the central shaft of the upper section 9 of the tower/driveshaft, as in the seventy-fifth embodiment.

79. FIG. 104 This seventy-ninth embodiment is similar to the seventy-seventh embodiment, having buoyant, vertical axis type blades 43, helically wrapped from top to bottom in the direction of rotation, sequentially connecting the tips of buoyant, horizontal axis type rotor 13 blades, also including helically wrapped torque transmission lashing 18, but with the inclusion of the central shaft of the upper section 9 of the tower/driveshaft, as in the seventy-fifth embodiment, to help stabilize the configuration.

Figure 105:
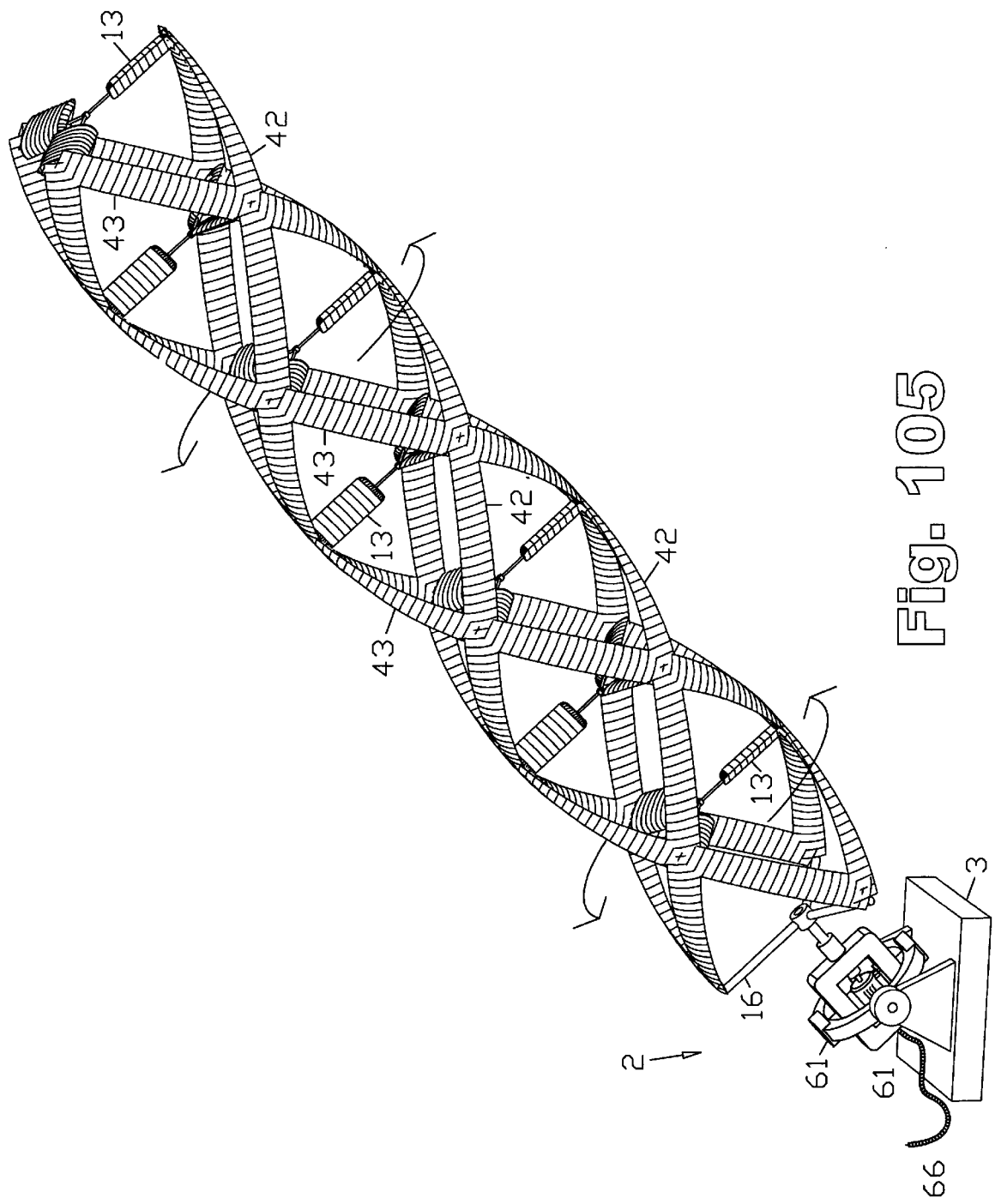
FIG. 105 is an aerial side perspective view of the eightieth embodiment, having buoyant horizontal axis type rotors connected by buoyant, elongate vertical axis type blades, helically wrapped in both directions, and a directionally compliant base. (The eighty-first embodiment is not specifically illustrated, but refers back to FIG. 105.)

80. FIG. 105 This eightieth embodiment is a combination of the seventy-seventh, and seventy-sixth embodiments, having buoyant vertical axis type blades, 42 and 43, helically wrapped in both directions, connecting the blade tips of the buoyant, horizontal axis rotors 13, altogether forming a buoyant, inflated, latticework structure, every component of which serves an aerodynamic function, contributing to the rotation of the structure as a whole.

81. Not Illustrated This eighty-first embodiment is similar to the previous embodiment, illustrated in FIG. 105, but with the inclusion of the central shaft of the upper section 9 of the tower/driveshaft. This upper section 9 of the tower/driveshaft, including all horizontal and vertical axis blades, comprises a buoyant, inflated version of tower/driveshaft of the fortieth embodiment.

It is obvious that many variations and combinations of the features disclosed in the above embodiments may prove effective, such spacing the tails further apart than one for every rotor, multiple lifting bodies spaced at intervals along the shaft, etc. Other modifications of the present invention will occur to those skilled in the art, and as such the scope of the present invention should not be limited by the details of the above disclosure, but should be interpreted from the broadest meaning of the following claims.

What is claimed is:

1. A fluid current motor for extracting energy, in the form of shaft rotation capable of driving a load, from a fluid flow relative to a surface, comprising:

a resiliently flexible tower/driveshaft having a stiffness, having a.basal end and a distal end, said tower/driveshaft projecting from substantially proximate said surface, substantially proximate said basal end, substantially away from said surface;

a cantilevered bearing means which rotatably supports said tower/driveshaft, in a cantilevered manner, substantially from said basal end;

a multiplicity of fluid reactive rotors, coaxially attached at spaced intervals to a section of said tower/driveshaft;

wherein:

said tower/driveshaft is caused by said fluid flow and gravity to bend along at least a portion of its length in a generally downstream direction;

whereby:

due to said bending, said section is caused to become sufficiently properly oriented to said fluid flow that said rotors are caused by said fluid flow to rotate, thereby causing the tower/driveshaft to rotate, along its entire length, however it may bend, so that useful power in the form of shaft rotation is drawn therefrom, proximate said basal end.

2. The fluid current motor in claim 1, wherein said rotors comprise horizontal axis type rotors.

3. The fluid current motor of claim 2, additionally comprising means for influencing the angular orientation relative to said fluid flow, of said horizontal axis type rotors.

4. The fluid current motor of claim 3, where said means for influencing the angular orientation relative to said fluid flow, of said horizontal axis type rotors comprises a downwind tail means.

5. The fluid current motor of claim 2, wherein said cantilevered bearing means comprises a substantially prior art vertical axis windmill.

6. The fluid current motor of claim 1, wherein said rotors comprise vertical axis type rotors.

7. The fluid current motor of claim 6, wherein said vertical axis type rotors comprise blades that are connected, end to end, forming elongate blades, longitudinally extending along said section of said tower/driveshaft.

8. The fluid current motor of claim 6, wherein said vertical axis type rotors comprise blades that are connected, end to end, forming elongate blades, helically extending along said section of said tower/driveshaft.

9. The fluid current motor of claim 6, wherein said section of said tower/driveshaft comprises a distal section that hangs substantially downward.

10. The fluid current motor of claim 1, wherein said rotors comprise both horizontal axis type rotors and vertical axis type rotors.

11. The fluid current motor of claim 10, wherein said horizontal axis rotors serve as armature means by which said vertical axis type rotors are attached to said tower/driveshaft.

12. The fluid current motor of claim 1, wherein said rotors serve to structurally comprise said tower/driveshaft, in addition to their fluid reactive function.

13. The fluid current motor of claim 1, wherein said rotors have positive buoyancy in the fluid of said fluid flow, with which they react, with said buoyancy acting to counter the force of gravity on said rotors, thereby helping to maintain clearance from said surface.

14. The fluid current motor of claim 1, further comprising a substantially non-rotating lifting body, attached to said tower/driveshaft, wherein said lifting body helps to elevate some portion of said tower/driveshaft.

15. The fluid current motor of claim 1, further comprising lashing means between rotors.

16. The windmill of claim 1 further comprising:

a control means;

linkage means generally attaching said control means to said rotors;

whereby the angular orientation of said rotors, relative to said fluid flow, may be influenced by said control means.

17. A floating marine wind turbine installation, comprising:

at least one horizontal axis type rotor;

a tower/driveshaft, that rotates in its entirety, as a unit, having a basal end, and an upper section;

a base, comprising; an upper end, a lower end, a floatation means, a downward force means, a base rotation resistance means, a load, and a cantilevered bearing means:

wherein:

said horizontal axis type rotor is substantially coaxially mounted to, and rotationally coupled to, said upper section of said tower/driveshaft:

said floatation means acts to push said tipper end of said base upward, and;

said downward force means acts to pull said lower end of said base downward;

whereby said base is maintained in a generally upright orientation;

said cantilevered bearing means supports said tower/driveshaft, substantially from said basal end, in a cantilevered, rotationally free manner, whereby said tower/driveshaft projects substantially upward from said base;

whereby the detent position of said upper section of said tower/driveshaft having said attached rotor is to be aimed substantially straight upward, subject to modification by the forces of the wind and gravity thereupon;

said load is rotationally coupled to said tower/driveshaft;

whereby:

said horizontal axis rotor, and said tipper section, are blown in a downwind direction;

whereby said upper section, where said horizontal axis type rotor is attached, is caused to become sufficiently parallel to the wind that said horizontal axis type rotor is caused thereby to rotate;

said rotor causing said tower/driveshaft to rotate;

said rotating tower/driveshaft driving said load;

said base rotation resistance means acting to counter the torque of the rotating tower/driveshaft, substantially preventing said base from rotating along with said tower/driveshaft.

18. The floating marine wind turbine installation of claim 17, wherein said downward force means comprises a ballast counterweight means.

19. The floating marine wind turbine installation of claim 18, wherein:

said base means comprises a section of said tower/driveshaft proximate said basal end;

said tower/driveshaft, proximate said basal end, comprises said floatation means, wherein said floatation means rotates along with said tower/driveshaft:

said tower/driveshaft, proximate said basal end, and below said floatation means, comprises said ballast counterweight means, wherein said ballast counterweight means rotates along with said tower/driveshaft;

said cantilevered bearing means comprises the liquid interface between said rotating section of said tower/driveshaft, proximate said basal end, comprising said rotating floatation and ballast counterweight means, and the surrounding water;

said load is driven by said rotating tower/driveshaft, proximate said basal end;

said base rotation resistance means is affixed to a substantially non-rotating portion of said load, acting to counter the torque of the rotating tower/driveshaft, substantially preventing said non-rotating portion of said load from rotating, to prevent said load from simply rotating in its entirety along with said tower/driveshaft.

20. The floating marine wind turbine installation of claim 17, wherein said downward force means comprises a mooring means.

21. The floating marine wind turbine installation of claim 17, wherein said base rotation resistance means comprises a mooring means.

22. The floating marine wind turbine installation of claim 17, wherein;

said base comprises a boat;

said upper end comprises the deck, or top side of the boat;

said lower end comprises the hull, or bottom side of the boat;

and said base rotation resistance means comprises the hull, as influenced by the surrounding water.

23. A new type of windmill, comprising:

a base means comprising:

a mounting means, for being supported proximate a surface;

a rigid bearing support means, attached to said mounting means;

a cantilevered bearing means, securely retained by said rigid bearing support means;

a resiliently flexible tower/driveshaft, having a basal end, said tower/driveshaft being supported, proximate said basal end, in a cantilevered, rotationally free manner, by said cantilevered bearing means, and projecting upward therefrom, the detent shape of said tower/driveshaft being substantially straight;

a fluid reactive rotor, coaxially mounted to said tower/driveshaft, at some distance from said basal end;

wherein said tower/driveshaft is caused by gravity, and the force of the wind, to bend over in a generally downwind direction;

whereby, due to said bending, said rotor is caused to become sufficiently properly aligned with the wind to be caused thereby to undergo rotation, causing said tower/driveshaft to rotate, along its entire length, however it may bend, whereby useful power, in the form of shaft rotation, is extracted from said basal end.

24. The windmill of claim 23, wherein said cantilevered bearing means comprises;

two bearings, spaced apart, one substantially above the other, rigidly mounted to said bearing support means, a rigid, substantially vertical axle, rotatably supported by said bearings;

wherein said tower/driveshaft is rotationally coupled to, and supported in a cantilevered manner by, said rigid axle, extending upward therefrom.

25. The windmill of claim 24, wherein said bearing support means comprises a substantially vertical tube.

26. The windmill of claim 23, wherein said cantilevered bearing means is located substantially below the surface.

27. The windmill of claim 23, wherein said rigid bearing support means is embedded within said mounting means.

28. The windmill of claim 23, wherein said rotor comprises a horizontal axis type rotor.

29. The windmill of claim 28, wherein said horizontal axis type rotor is substantially rigid.

30. The windmill of claim 23, wherein said rotor comprises a vertical axis type rotor, attached to a distal section of said tower/driveshaft that hangs substantially downward.

31. A windmill, comprising:

a tower/driveshaft;

a multiplicity of horizontal axis type rotors, coaxially mounted at spaced intervals to a section of said tower/driveshaft, rotationally coupled thereto;

a cantilevered bearing means, supporting said tower/driveshaft with rotational freedom, whereby said tower/driveshaft projects substantially upward from said cantilevered bearing means;

a base, to generally support said windmill;

a directionally compliant means;

wherein:

said directionally compliant means allows said section of said tower/driveshaft, and said attached rotors, to be caused by the force of the wind to be blown to a substantially downwind position, relative to said base;

whereby:

said section of said tower/driveshaft is caused to become aimed in a direction that is sufficiently parallel to the wind that said coaxially mounted horizontal axis type rotors are caused to become sufficiently properly oriented to the wind that they are caused thereby to undergo rotation;

said rotation of said rotors causing said tower/driveshaft to undergo rotation;

whereby useful power, in the form of shaft rotation, is drawn from said rotating tower/driveshaft proximate said base.

32. The windmill of claim 31, wherein a portion of said tower/driveshaft comprises resiliently flexible properties, with said portion having said resiliently flexible properties comprising said directionally compliant means.

33. The windmill of claim 31, wherein said directionally compliant means comprises a retaining interface linking said cantilevered bearing means to said base, thereby supporting said cantilevered bearing means therefrom in a substantially directionally compliant manner.

34. The windmill in claim 33, wherein said directionally compliant means comprises a resiliently flexible linkage between said base and said cantilevered bearing means.

35. The windmill of claim 33, wherein said directionally compliant means comprises a horizontally rotatable base means.

36. A fluid reactive motor, comprising:

a rotor, substantially having a longitudinal axis of rotation, said axis being oriented substantially perpendicular to the flow of a fluid;

wherein:

said rotor comprises a substantially cylindrical tube, said cylindrical tube comprised of an open latticework structure comprising a geometric pattern of interconnected struts;

those of said struts not perpendicular to said axis being aerodynamically shaped and disposed to function as fluid reactive blades, operating on the Darrieus principle, to impart rotation to said rotor, substantially about said axis of rotation.

37. The fluid reactive motor of claim 36, wherein said geometric pattern comprises a repeating pattern of polygons.

38. The fluid reactive motor of claim 37, wherein said pattern is a mesh, and said polygons comprise triangles.

39. The fluid reactive motor of claim 37, wherein said pattern is a mesh, and said polygons comprise four-sided polygons.

40. The fluid reactive motor of claim 37, wherein said pattern is a mesh, and said polygons comprise hexagons.

41. The fluid reactive motor of claim 36, further comprising horizontal axis type fluid reactive blades, shaped and disposed so as to help to impart rotation to said rotor.

42. The fluid reactive motor of claim 41, wherein said horizontal axis type blades serve as armature means connecting to said open latticework structure comprising said cylindrical tube.

43. The fluid reactive motor of claim 41, wherein said horizontal axis type blades comprise rotors, coaxially attached at spaced intervals to a resiliently flexible shaft, said shaft coaxially projecting from said cylindrical tube.

44. A fluid reactive rotor for providing a tractive force for a fluid borne vehicle, comprising:

a resiliently flexible shaft, having a basal end, and a longitudinal axis;

a multiplicity of propeller type rotors, coaxially attached, and rotationally coupled, to said shaft, at spaced intervals along said shaft;

wherein:

said spaced intervals being of sufficient distance to allow sufficient intermixture of substantially undisturbed fluid with the downstream effluent of each said rotor, before that effluent encounters the next said rotor, to sufficiently dilute said effluent, whereby each of said rotors interacts with a substantial proportion of undisturbed fluid;

said propeller type rotors being shaped and disposed to exert a pulling force, when undergoing rotation, on said shaft, in a direction substantially away from said basal end;

whereby, when said shaft is projected from proximate said vehicle into said fluid, substantially from said basal end, and caused to rotate about its own said longitudinal axis, said rotors are caused thereby to exert a sufficient force on said vehicle to influence its position relative said fluid.

45. A windmill for extracting power from wind, comprising:

a base means, said base means comprising a bearing means and a load;

an elongate torque transmission means, having a longitudinal axis of rotation and generally having two ends;

a horizontal axis type rotor, having an axis of rotation;

said rotor comprising atmospherically buoyant blades having a positive buoyancy, said buoyancy of said blades serving to elevate said rotor;

wherein:

said elongate torque transmission means is retained with rotational freedom proximate one said end by said bearing means;

said elongate torque transmission means is rotationally coupled to said load;

said horizontal axis type rotor is coaxially attached to said elongate torque transmission means at some distance from said one end;

whereby:

said elongate torque transmission means substantially extends from said base means to said rotor;

said rotor is blown downwind of said base means;

said axis of rotation of said rotor is thereby caused to become aimed sufficiently parallel to the wind that said rotor is caused thereby to rotate;

said rotation of said horizontal ax is type rotor causes said elongate torque transmission means to rotate about its own said longitudinal axis of rotation;

said load is driven by said rotation of said elongate torque transmission means.

46. The windmill of claim 45, wherein said elongate torque transmission means comprises a lashing means, connecting to the blades of said rotor.

47. The windmill of claim 45, additionally comprising vertical axis type rotor blades.

48. The windmill of claim 47, wherein said vertical axis type rotor blades are atmospherically buoyant, having a positive buoyancy, serving to elevate them.

49. The windmill of claim 47, wherein said vertical axis type rotor blades are connected to said horizontal axis type blades.

50. The windmill of claim 45, further comprising:

an adjustable yoke means proximate said base;

linkage means attaching said yoke means to said rotor;

whereby the angular orientation of said rotor, relative to said wind, may be influenced by said yoke means.

51. The windmill of claim 50, further comprising a multiplicity of horizontal ax is type rotors, said horizontal axis type rotors coaxially attached at spaced intervals to said elongate torque transmission means at some distance from said one end;

whereby the angular orientation of said rotors, relative to said wind, may be influenced by said yoke means.

52. The windmill of claim 45, further comprising:

an adjustable control means;

linkage means attaching said control means to said rotor;

whereby the angular orientation of said rotor, relative to said wind, may be influenced by said control means.

53. A windmill comprising:

a base means, said base means comprising a first bearing means and a load;

an elongate torque transmission means, having a longitudinal axis of rotation and generally having a basal end and a distal end;

a horizontal axis type rotor, having an axis of rotation;

a substantially non-rotating atmospherically buoyant lifting body having a positive buoyancy, and further having a second bearing means;

wherein:

said elongate torque transmission means is retained with rotational freedom proximate said basal end by said first bearing means;

said elongate torque transmission means is retained with rotational freedom proximate said distal end by said second bearing means, whereby said elongate torque transmission means is suspended from said lifting body, said buoyancy of said lifting body serving to elevate said rotor and at least a portion of said elongate torque transmission means;

said elongate torque transmission means is rotationally coupled to said load;

said horizontal axis type rotor is coaxially attached to said elongate torque transmission means at some distance from said basal end;

whereby:

said elongate torque transmission means substantially extends from said base means to said rotor;

said lifting body and said rotor are blown downwind of said base means;

said axis of rotation of said rotor is thereby caused to become aimed sufficiently parallel to the wind that said rotor is caused thereby to rotate;

said rotation of said horizontal axis type rotor causes said elongate torque transmission means to rotate about its own said longitudinal axis of rotation;

said load is driven by said rotation of said elongate torque transmission means.

54. The wind turbine of claim 53, further comprising a multiplicity of horizontal axis type rotors coaxially attached at spaced intervals to said elongate torque transmission means.

55. The windmill of claim 53, further comprising:

an adjustable control means;

linkage means attaching said control means to said rotor;

whereby the angular orientation of said rotor, relative to said wind, may be influenced by said control means.

56. A windmill comprising:

a base means, said base means comprising a first bearing means and a load;

an elongate torque transmission means, having a longitudinal axis of rotation and generally having a basal end and a distal end;

a horizontal axis type rotor, having an axis of rotation;

a substantially non-rotating aerodynamic lifting body having aerodynamic lift, and further having a second bearing means;

wherein:

said elongate torque transmission means is retained with rotational freedom proximate said basal end by said first bearing means;

said elongate torque transmission means is retained with rotational freedom proximate said distal end by said second bearing means, whereby said elongate torque transmission means is suspended from said lifting body, said aerodynamic lift of said lifting body serving to elevate said rotor and at least a portion of said elongate torque transmission means;

said elongate torque transmission means is rotationally coupled to said load;

said horizontal axis type rotor is coaxially attached to said elongate torque transmission means at some distance from said basal end;

whereby;

said elongate torque transmission means substantially extends from said base means to said rotor;

said lifting body and said rotor are blown downwind of said base means;

said axis of rotation of said rotor is thereby caused to become aimed sufficiently parallel to the wind that said rotor is caused thereby to rotate;

said rotation of said horizontal axis type rotor causes said elongate torque transmission means to rotate about its own said longitudinal axis of rotation;

said load is driven by said rotation of said elongate torque transmission means.

57. The windmill of claim 56, further comprising a multiplicity of horizontal axis type rotors coaxially attached at spaced intervals to said elongate torque transmission means.

58. The windmill of claim 56, where in said substantially non-rotating aerodynamic lifting body is also atmospherically buoyant, having a positive buoyancy in the air.

59. The windmill of claim 56, further comprising:

an adjustable control means;

linkage means attaching said control means to said rotor;

whereby the angular orientation of said rotor, relative to said wind, may be influenced by said control means.

60. The windmill of claim 59, further comprising a multiplicity of horizontal axis type rotors, said horizontal axis type rotors coaxially attached at spaced intervals to said elongate torque transmission means at some distance from said one end;

whereby the angular orientation of said rotors, relative to said wind, may be influenced by said yoke means.

61. The windmill of claim 55, further comprising a multiplicity of horizontal axis type rotors, said horizontal axis type rotors coaxially attached at spaced intervals to said elongate torque transmission means at some distance from said one end;

whereby the angular orientation of said rotors, relative to said wind, may be influenced by said yoke means.

62. A wind turbine comprising hollow blades filled with an atmospherically buoyant gas.

63. The wind turbine of claim 62, wherein said gas is selected from the group consisting of hydrogen and helium.

* * * * *